(12) United States Patent
Deering et al.

(10) Patent No.: US 11,638,419 B2
(45) Date of Patent: *May 2, 2023

(54) SENSOR STATION SYSTEM FOR PEST MONITORING

(71) Applicant: SERVICEPRO.NET LLC, Glendale, CA (US)

(72) Inventors: Andrew Deering, Johnstown, OH (US); Richard Deering, New Carlisle, OH (US); James Rice, Columbus, OH (US); Denis Leanos, Blacklick, OH (US); Jonathan Adam Holt, St Augustine, FL (US)

(73) Assignee: SERVICEPRO.NET LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,083

(22) Filed: Aug. 9, 2021

(65) Prior Publication Data

US 2021/0368762 A1    Dec. 2, 2021

Related U.S. Application Data

(63) Continuation of application No. 15/172,854, filed on Jun. 3, 2016, now Pat. No. 11,083,183.

(Continued)

(51) Int. Cl.
| | |
|---|---|
| *G06Q 40/00* | (2012.01) |
| *G06Q 10/08* | (2012.01) |
| *G06Q 10/00* | (2012.01) |
| *G06Q 30/00* | (2012.01) |
| *G06Q 30/04* | (2012.01) |

(Continued)

(52) U.S. Cl.
CPC .............. *A01M 1/026* (2013.01); *A01K 61/95* (2017.01); *A01K 69/06* (2013.01); *A01M 23/02* (2013.01); *G06F 16/953* (2019.01); *G06Q 10/087* (2013.01); *G06Q 10/20* (2013.01); *G06Q 30/016* (2013.01); *G06Q 30/04* (2013.01); *G06Q 40/12* (2013.12); *H04L 67/12* (2013.01)

(58) Field of Classification Search
CPC ...... G06Q 40/12; G06Q 10/087; G06Q 10/20; G06Q 30/016; G06Q 30/04; A01M 1/026; A01M 23/02; A01K 69/06; H04L 67/12
See application file for complete search history.

(56) References Cited

U.S. PATENT DOCUMENTS

| | | |
|---|---|---|
| 5,828,751 A | 10/1998 | Walker et al. |
| 5,884,224 A | 3/1999 | McNabb |

(Continued)

OTHER PUBLICATIONS

Ultrasonic and Infrared Repelling Device for Controlling the Population of Rat in Paddy Field, Authors Muhammad Assaqafi Mohd Fisol and Warsuzarina Mat Jubadi—2010 IEEE Asia Pacific Conference Dec. 6, 2010, pp. 359-361 published in ieeexplore.ieee.org. (Year: 2010).*

*Primary Examiner* — Paul Danneman
(74) *Attorney, Agent, or Firm* — BakerHostetler

(57) ABSTRACT

A system for managing and monitoring a sensor network that senses pest activity. A plurality of sensor stations may be controlled by the system, such sensor station configured for detecting the presence of pests at a baiting station, or for alerting users to the presence of a pest in a trap, as well as a related system of data collection and data management of pest activity data.

20 Claims, 48 Drawing Sheets

Related U.S. Application Data

(60) Provisional application No. 62/193,405, filed on Jul. 16, 2015, provisional application No. 62/170,365, filed on Jun. 3, 2015.

(51) Int. Cl.

| | | |
|---|---|---|
| *A01M 1/02* | (2006.01) |
| *A01M 23/02* | (2006.01) |
| *H04L 67/12* | (2022.01) |
| *A01K 69/06* | (2006.01) |
| *A01K 61/95* | (2017.01) |
| *G06Q 40/12* | (2023.01) |
| *G06Q 10/20* | (2023.01) |
| *G06Q 30/016* | (2023.01) |
| *G06F 16/953* | (2019.01) |
| *G06Q 10/087* | (2023.01) |

(56) References Cited

U.S. PATENT DOCUMENTS

| | | |
|---|---|---|
| 6,385,544 B1 | 5/2002 | Mafra-Neto |
| 6,724,312 B1 | 4/2004 | Barber et al. |
| 6,792,395 B2 | 9/2004 | Roberts |
| 6,914,529 B2 | 7/2005 | Barber et al. |
| 7,286,056 B2 | 10/2007 | Kates |
| 7,348,890 B2 | 3/2008 | Barber et al. |
| 7,504,956 B2 | 3/2009 | Kates |
| 7,656,300 B2 | 2/2010 | Rønnau |
| 7,839,764 B2 | 11/2010 | Jiang et al. |
| 8,026,822 B2 | 9/2011 | Borth et al. |
| 8,064,387 B2 | 11/2011 | Jiang et al. |
| 8,078,711 B2 | 12/2011 | Jiang et al. |
| 8,258,966 B2 | 9/2012 | Wright et al. |
| 8,433,617 B2 | 4/2013 | Goad et al. |
| 8,434,697 B1 | 5/2013 | Olt |
| 8,830,071 B2 | 9/2014 | Borth et al. |
| 9,542,835 B2 * | 1/2017 | Borth .................... G08C 17/02 |
| 11,083,183 B2 * | 8/2021 | Deering ................ G06Q 30/04 |

\* cited by examiner

FIG. 6F

Remote Monitoring Activity   7/1/2015 5:48 PM 25
25
24

Page 1 of 1

_Completed work order activity_

ACC # 254    WO # 24
Adam's Pest Bug  145 MONTE

| Invoice | Tax | Total | Time in | Time Out | Tech | Certification # | Customer Signature | Service Specialist |
|---|---|---|---|---|---|---|---|---|
| 10.80 | 1.08 | 11.88 | Jun 3 2015 6:20PM | Jun 3 2015 6:22PM | Andy | C12345 | | |

ServSuite™

Reports Criteria

For: Remote Monitoring System "Health Check" Activity Report

274 —

Start date  7/8/2015

As of date  7/8/2015

Pick Site  145 MONTE CARLO — 278

280

Generate Report

282 — Open Report

*Viewing some reports in your browser may require a very fast connection. If you experience timeouts or slowness, please use the download link.

Remote Monitoring System "Health Check" Activity Report

From 6/1/2015 to 7/8/2015 — 292
25895
25935

7/9/2015 10:22 AM
adam@servsuite.net - Adam Holt
Page 1 Of 1

FIG. 6H

ServSuite™

| Billing Account Information | | |
|---|---|---|
| Account # 25895 | | |
| Adam's Pest Bug | | |

| Account | Activity | Accounting | Letters/Forms | Close account window |
|---|---|---|---|---|

- Home — 460
- Private Acct Notes — 462
- Reports — ervsuite.net
- Eba Account — 454 / 464
- Web Portal — 466
- Barcoded Stations — 460
- Sensor List — 470
- Add Service Address — 472
- Email Account Additional Contact
Send Email To Tech   Remaining Discounts $45.00 — 474
                     Show program balances — 476

| Note | Site | Show All Sites | | | | | | |
|---|---|---|---|---|---|---|---|---|
| | | | | | | | Print Statement | E-mail Statement |
| | | 90 days | 120 days | Total | Prepay Balance | Account Balance | Pin Charge | Debit Bal | Last Statement Date | Last Email Statement Date 6/30/2015 | Last Post and Date 2/9/2015 |
| | | 588.10 | | 1,288.21 | 3,017.26 | 393.10 | 2,824.16 | 505.33 | 3,522.59 | | | |

None
1st Year
Welcome Letter Sent on 07/15/2014

Service Information   Viewing 4 site(s) out of 4 - View All - Expand All   Show Programs [All Programs]   Program Sort Order [Program Sale Date]

Add Search Criteria [▼] [Clear]

| | Business | Ph # | St # | St Name | Line2 | Prop Type | Lot # | City, State | Zip | Map | Postal Route |
|---|---|---|---|---|---|---|---|---|---|---|---|
| Site Menu Private Site Notes | George | - | 234 | - | - | - | - | Columbus, OH | 43228 | - | Lawncare 1 |
| Site Menu Private Site Notes | Adam's Pest Bug | - | 145 | - | - | - | - | Saint Augustine, FL | 32084 | - | - |
| Site Menu Private Site Notes | Milltop | - | 19 | - | - | - | - | Saint Augustine, FL | 32084 | - | - |

FIG. 12B

ServSuite™

Billing Account Information

Account # 25895
Adam's Pest Bug

| Account | Activity | Accounting | Letters/Forms | Close account window |

Home
Private Acct Notes    ervsuite.net
Reports ▲              e Transfer
Eba Account           | Note | Site | Show All Sites |
Web Portal
Barcoded Stations
Sensor List
Add Service Address
Email Account

| | 90 days | 120 days | Total | Prepay Account Balance | Account Balance | Pin Charge | Debit Bal |
|---|---|---|---|---|---|---|---|
| | 588.18 | 1,286.21 | 3,017.26 | 393.10 | 2,824.16 | 505.33 | 3,522.59 |

| Print Statement | | E-mail Statement | |
|---|---|---|---|
| Last Statement Date | | Last Email Statement Date 8/30/2015 | Last Post and Date 2/9/2015 |

Additional Contact
Send Email To Tech    Remaining Discounts $45.00
                      Show program balances
                      None 1st Year Welcome Letter Sent on 07/15/2014

Service Information  Viewing 4 site(s) out of 4 - View All - Expand All  Show Programs | All Programs  Program Sort Order | Program Sale Date Add Search Criteria  ▶  Clear

| | Business | Ph # | St # | St Name | Line2 | Prop Type | Lot # | City, State | Zip | Map | Postal route |
|---|---|---|---|---|---|---|---|---|---|---|---|
| Site Menu | Private Site Notes | George | - | 234 | - | - | - | - | Columbus, OH | 43228 | - | Lawncare 1 |
| Site Menu | Private Site Notes | Adam's Pest Bug | - | 145 | - | - | - | - | Saint Augusine, FL | 32084 | - | - |
| Site Menu | Private Site Notes | Milltop | - | 19 | - | - | - | - | Saint Augusine, FL | 32084 | - | - |

| Billing Account Information | ○ Program Infromation | Call Ahead settings | | | | Save | | |
|---|---|---|---|---|---|---|---|---|
| Account # 25895 | ⊕ Pest Control Monthly 676 | 678 | | 680 | | | | |
| 673 | Event Name | Phone Number | Email Address | Phone | Email | SMS | | |
| 674 | dragan service call | None ⇕ | None ⇕ | □ | □ | □ 0.00 | | |
| | dragan weekly | None ⇕ | None ⇕ | □ | □ | □ 0.00 | | Last Post and Date 2/9/2015 |
| | Monthly-initial | None ⇕ | None ⇕ | □ | □ | □ 0.00 | | |
| | Monthly Service | None ⇕ | None ⇕ | □ | □ | □ 0.00 | atement 2015 | |
| 682 | ⊕ Fly Control | | | | | | | |
| | ⊕ Animal Control | | | | | | | Program Sale Date ⇕ |
| | ⊕ Aleks Seasonal Program | | | | | | | |
| | ⊕ Animal Control | | | | | | | |
| | ⊕ Aleks Renewal Program | | | | | | | |
| Service Information | ⊕ Dragan Advanced Renewal Create Inv | | | | | | Map | Postal route |
| Add Search Criteria | | | | | | | | |
| Site Menu | ⊕ A Pest Program | | | | | Save | - | Lawncare 1 |
| Site Menu | ⊕ | | | | | | - | - |
| Site Menu | ⊕ ○ Lead Notifications | | | | | Save | - | - |
| Site Menu | | | | | | | | |

ServSuite™

Remote Monitoring

| Alerts | Setup Options | Notifications | Support | Sensor Health Check |

Remote Monitoring Notifications

From date: 06/22/2015  To date: 7/1/2015  [Get List]

Notification Message Setup

| Account | Name | Site | Date/Time | Type | Status | Type Details | Message Name | Alert Type |
|---|---|---|---|---|---|---|---|---|
| 25895 | John | Milltop Tavern | 2015-07-01 12:55PM | SMS Message | SMS Sent ⊕ | 135241 | | None Selected |
| 25895 | John | Milltop Tavern | 2015-07-01 12:53PM | SMS Message | SMS Sent ⊕ | 135241 | | None Selected |
| 25895 | John | Milltop Tavern | 2015-07-01 12:39PM | SMS Message | SMS Sent ⊕ | 135241 | | None Selected |
| 25895 | John | Milltop Tavern | 2015-07-01 12:38PM | SMS Message | SMS Sent ⊕ | 135241 | | None Selected |
| 25895 | John | Milltop Tavern | 2015-07-01 12:12PM | SMS Message | SMS Sent ⊕ | 135241 | | None Selected |
| 25895 | John | Milltop Tavern | 2015-07-01 12:11PM | SMS Message | SMS Sent ⊕ | 135241 | | None Selected |
| 25895 | John | Milltop Tavern | 2015-07-01 12:10PM | SMS Message | SMS Sent ⊕ | 135241 | | None Selected |
| 25895 | John | Milltop Tavern | 2015-07-01 12:09PM | SMS Message | SMS Sent ⊕ | 135241 | | None Selected |
| 25895 | John | Milltop Tavern | 2015-07-01 12:08PM | SMS Message | SMS Sent ⊕ | 135241 | | None Selected |
| 25895 | John | Milltop Tavern | 2015-07-01 12:08AM | SMS Message | SMS Sent ⊕ | 135241 | | None Selected |
| 25895 | John | Milltop Tavern | 2015-07-01 12:07PM | SMS Message | SMS Sent ⊕ | 135241 | | None Selected |
| 25895 | John | Milltop Tavern | 2015-07-01 12:03PM | SMS Message | SMS Sent ⊕ | 135241 | | None Selected |
| 25895 | John | Milltop Tavern | 2015-07-01 12:01PM | SMS Message | SMS Sent ⊕ | 135241 | | None Selected |
| 25895 | John | Milltop Tavern | 2015-07-01 11:56AM | SMS Message | SMS Sent ⊕ | 135241 | | None Selected |
| 25895 | John | Milltop Tavern | 2015-07-01 11:17AM | SMS Message | SMS Sent ⊕ | 135241 | | None Selected |
| 25895 | John | Milltop Tavern | 2015-07-01 11:15AM | SMS Message | SMS Sent ⊕ | 135241 | | None Selected |
| 25895 | John | Milltop Tavern | 2015-07-01 11:05AM | SMS Message | SMS Sent ⊕ | 135241 | | None Selected |
| 25895 | John | Milltop Tavern | 2015-07-01 10:59AM | SMS Message | SMS Sent ⊕ | 135241 | | None Selected |
| 25895 | John | Milltop Tavern | 2015-07-01 12:53PM | SMS Message | SMS Sent ⊕ | 135241 | | None Selected |

FIG. 15C

ServSuite™

Remote Monitoring

| Alerts | Setup Options | Notifications | Support | Sensor Health Check |

Repeater / Sensor Registration

Repeaters With Sites

| Repeater Name ⇅ | Repeater ID ⇅ |
|---|---|
| Serv Sensor | |
| Second Floor | |
| Milltop2 | |
| First Floor | |
| Milltop3 | |
| Test1 | |

◉ 1 - 6 / 6 (6) ◎ ◎ 20 ⇅ — 875

Edit Repeater 414222c0te00aa55
Repeater Name: Serv Sensor ← 880
Active — 878
Search: [  ] — 882

Repeater ID: 414222c0te00aa55
Account # 25892 — 888

| Account # ⇅ | First Name | Last Name | Company Name | Address | City | State | Zip # | |
|---|---|---|---|---|---|---|---|---|
| 25895 | George | - | - | - | - | - | - | Select |
| 25895 | John | - | - | - | - | - | - | Select |
| 25895 | James | - | - | - | - | - | - | Select |
| 25895 | Ken | - | - | - | - | - | - | Select |

— 886                                                                        890    Save  — 894

| Last Health Check | May 19, 2015 19:00:26 PM |
| Account | 25895 |
| Site | Serv Sensor |

Get

| Sensor Id ⇅ | Sensor Name ⇅ | Facility ⇅ | Zone ⇅ | Inspection Point ⇅ | Inspection Point Type |
|---|---|---|---|---|---|
| | | | | | |

Get — 896

414222c0te00aa55
554222c0te00aa55
37ef1fc0te00aa55
3Bef1fc0te00aa55
4Def1fc0te00aa55
45ef1fc0te00aa55

FIG. 16D

SENSOR STATION SYSTEM FOR PEST MONITORING

CROSS-REFERENCE TO RELATED APPLICATIONS

This application claims the benefit of U.S. patent application Ser. No. 15/172,854, filed Jun. 3, 2016, which claims the benefit of U.S. Provisional Application Ser. No. 62/170,365, filed Jun. 3, 2015, and U.S. Provisional Application Ser. No. 62/193,405, filed Jul. 16, 2015, the disclosures of which are hereby incorporated by reference.

STATEMENT REGARDING FEDERAL GRANTS

The subject matter of this application did not use any federal grants.

BACKGROUND OF THE INVENTION

The present disclosure relates generally to a system for managing a network, particularly a network used in the field of pest control.

Nearly all industries must take pest control into consideration in one way or another. Pests are a major concern for the agriculture, food service, business, and real estate industries, as well as others. Two of the most common varieties of pests are rodents, such as rats or mice, and insects, such as cockroaches, termites or ants. To combat infestations by rodents or other small mammals, property owners often employ pest control systems consisting of a series of lethal or non-lethal traps for the mammals. Prior to the proliferation of electronic communication between devices, each of the traps involved in a user's pest control system would have to be regularly checked and reset by hand, resulting in a time-consuming and costly process.

Recently, a variety of pest control products have been developed that employ modern technologies for data collection and electronic communication. Rodent and small mammal traps have become available that collect data on whether bait remains in the trap, whether the trap has caught a pest, and what type of pests are present on a user's property, among other things. This data can then be communicated to a user or to a remote server. When interpreted and used properly, the data collected by electronic pest sensors can be essential to the effective and efficient prevention of pest infestations.

A number of disclosures related to pest detection and related data collection are currently present in the field. U.S. Pat. No. 5,828,751 discloses a general arrangement of linking environmental sensors to an information network. U.S. Pat. No. 5,884,224 discloses the use of a sensor or series of sensors linked to a mobile network as a means of optimizing crop growth. U.S. Pat. No. 6,385,544 discloses a system of using pooled GPS localized pest data to provide notices to growers.

A series of disclosures, beginning with U.S. Pat. No. 6,724,312, relate to a system of baited pest control stations. U.S. Pat. No. 6,792,395 broadly discloses a web-based remote detection system.

U.S. Pat. No. 7,286,056 discloses a general concept of pest monitoring utilizing either photographic or LASER analysis to determine the pests present.

U.S. Pat. No. 7,348,890 discloses a wireless sensor and data collection system directed to locating termite bail stations.

The disclosure in U.S. Pat. No. 7,656,300 to Ronnau, generally suggests a pest control monitoring system, but does not describe or enable how such a system could be effectively implemented. Ronnau claims "software modules incorporating self-learning" that require automatic updating of algorithms by the system to better identify pest types present. The enablement of such algorithms is unclear.

U.S. Pat. No. 8,026,822 discloses a communications network using pest sensors within a cluster network. The disclosure provides limited detail into the operations of the disclosed sensors, as well as limited detail into the use of information received from the sensors. U.S. Pat. No. 8,258,966 discloses a system for detecting termites using a photonic detector incorporating light pipes. The disclosure does not describe any software to be used with the system.

Existing systems, such as that of Jiang, et aI., disclosed in U.S. Pat. No. 8,064,387 do not adequately allow for control and monitoring of pest sensors. The disclosure only generally discloses a top-level architecture of a monitoring system that has a sensor linked to a local compiling gateway, linked to a remote server/database.

BRIEF DESCRIPTION OF THE DRAWINGS

For a fuller understanding of the nature and advantages of the present invention, reference should be had to the following detailed description taken in connection with the accompanying drawings, in which: Aspects of the present disclosure are illustrated by way of example and are not limited by the accompanying figures, with like references indicating like elements;

FIG. 6F illustrates an element of a method that may be performed by a pest sensor data monitor;

FIG. 6G illustrates an element of a method that may be performed by a pest sensor data monitor;

FIG. 6H illustrates an element of a method that may be performed by a pest sensor data monitor;

FIG. 12B shows an initial page of an embodiment of the user private account interface within the system;

FIG. 13A shows an embodiment of a homepage of the private user account interface;

FIG. 13B shows an embodiment of a page illustrating information related to barcoded stations;

FIG. 14B depicts an embodiment of the Billings submodule of the system;

FIG. 14C depicts an embodiment of the Billings submodule of the system;

FIG. 14D depicts an embodiment of the Billings submodule of the system;

FIG. 15C depicts an embodiment of the Notifications submodule of the system;

FIG. 16D depicts an embodiment of the Support submodule of the system;

SUMMARY OF THE INVENTION

Figure 1:
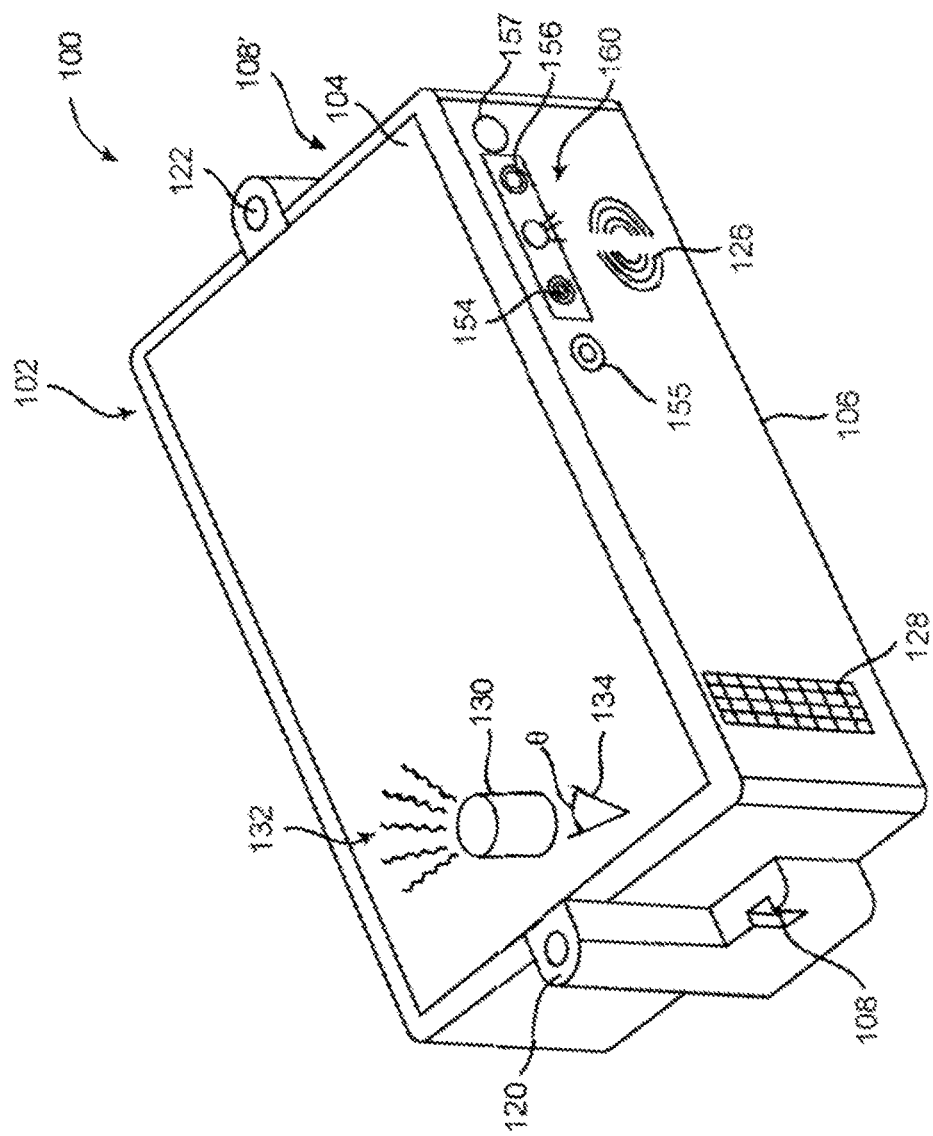
FIG. 1 shows perspective views of a sensor station.

The various implementations of the present invention are provided as a computer-based system and method for detecting the presence of pests, for optionally monitoring pests that have been detected, for alerting the computer-based system when a pest in a trap has been detected, and, in some embodiments, for alerting a user of the computer-based system. Typically, the pests are animals such as rodents, raccoons, opossums, or insects.

One embodiment provided is a system for implementing pest control comprising a detector polling command issued through the inventory system, said polling command invoking the detector to indicate power availability status, signal reception strength, and data repository status; after receiving an indication of data present in the data repository, said inventory system issuing a command for power application to a data transmitter module, said data transmitter module thereupon transmitting stored data to the inventory system receiver, and the inventory receiver transferring the transmitted stored data to the database compiler system of the database; an accounting coordination module for creating a scheduled accounting comprising a database query system for querying the inventory database and determining the number of installed detector stations, the active detector stations, the location of detector stations having activity detection since the last preceding scheduled accounting, and the location of inactive detector stations; a billing module for generating billing statements, said billing module calculating an incremental fee for installed detector stations and one or more of active detector stations, activity detection at detector stations, and negative activity detection at detector stations. A maintenance module for generating a maintenance statement said maintenance module providing a schedule of detector stations which have provided a maintenance indication of power availability status, an indication of signal reception strength maintenance status, or a pest status detection maintenance indication. This system can be configured for activating or deactivating sensor stations based on a payment indication from the billing module.

Another embodiment is a system where each sensor station has a database entry indicating a maintenance code, an availability code and a registration code for said sensor station. The system may further comprise a billing operation that calculates a visit frequency, an active station number and a base rate, and bills a customer account based on whether the visit frequency is within target parameters, the active station number, and the base rate.

Yet another embodiment is a processor-implemented method for determining the status of a number of pest trap, the method comprising: receiving, on a communication network, a number of event data from a number of sensor apparatuses, the number of event data indicating the status of the number of sensor apparatuses; using a processor to analyze the number of event data for the purpose of identifying an action to be taken for a trap client using a processor to identify an action to be taken for a trap client; and, initiating the action to be taken for the trap client. This method provides for the action to be taken is sending a message describing the event. The method may also include where the message is sent to a customer service representative assisting the trap client, or where the message is sent to the trap client, or the the event data exceeds a threshold.

In yet another embodiment, the method may comprise the step of using a processor to identify the type of the number of pest as one or more selected from a group consisting of a number of warm-blooded animal, a number of mammal, a number of bird, a number of arthropod, and a number of fish. Further the method can include the step of receiving, on a communication network, a number of event data from a number of sensor apparatuses further comprises the step of receiving, on a communication network, a number of event data from a number of sensor apparatuses, wherein the sensor apparatuses comprises one or more selected from a group consisting of a number of temperature sensor, a number of voltage sensor, a number of motion sensor, a number of load sensor, a number of camera, or a number of video camera.

Another embodiment of the disclosure is a kit for providing trap status monitoring comprising a weatherproof case for enclosing a sensor station, a sensor station with a communication module, a status recording module, and a sensor, said sensor being one or more of a temperature monitor a voltage monitor, a motion detector, a trigger switch, and a camera; a power supply; and a fastener system for attaching the case to a pest station.

Still yet another embodiment is a method of determining trap occupancy comprising a) providing an automated motion detecting apparatus, said apparatus further comprising a local computer capable of determining whether the apparatus is sensing motion, and messaging when a confirmed occupancy exists; b) providing a interval state during which confirmation of occupancy meets a predetermined notification criteria of number of occupancy signals per predetermined time period; c) the occupancy signal further comprising the apparatus sensing motion by identifying when a body moves in the detection zone of a component for sensing motion; d) the messaging component further comprising a communication modality for transmitting a message to a connectable communication recipient, and a message queuing component for collating a message for delivery to the communication recipient, with said messaging component messaging by delivering a queued message to the communication recipient when a confirmed occupancy state exists; e) setting the notification criteria for number of occupancy signals per predetermined time period, allowing the apparatus to detect occupancy, and determining when the notification criteria is met; and f) preparing the queued message of confirmed occupancy for transmission by the communication modality, and attempting delivery of the message to the communication recipient, where the communication recipient can receive notification of the confirmed occupancy when the apparatus for sensing motion detects sufficient occupancy signals to meet the notification criteria during the interval state.

The described method can further comprise a body that is one or more of an animal body, an inanimate body, a warm blooded animal, a mammal, a bird, an arthropod, an insect and a fish; an a interval state that is one or more of a default, thirty minutes, an hour, more than an hour, and a day; delivering an initial confirmation of occupancy message to a message recipient when the predetermined criteria is met during the interval state; delivering a reminder confirmation of occupancy message after expiration of a trap check interval; or resetting the automated motion detecting apparatus by one or more of a button push, a reset message, and a power loss indication.

Finally, the described method may further comprise a fault mode message when the automated motion detecting apparatus enters a fault mode.

DETAILED DESCRIPTION OF THE INVENTION

The invention relates to a new pest control system that allows for remote monitoring and management of a network of pest control stations. Collectively, the pest control system and the network of sensor stations, alternatively, pest control stations, may be referred to as the pest control system with a network of sensor stations. The pest monitoring system includes one or more modules. The modules refer to a combination of hardware and program instructions to perform a designated function. Each of the modules may include a processor and memory. The program instructions may be stored in the memory and cause the processor to execute the designated functions of the module. The various implementations are provided as part of a computer-based system and method for detecting the presence of pests, for optionally monitoring pests that have been detected, for alerting the system when a pest in a trap has been detected, and, in some embodiments, for alerting a user of the computer-based system. The system can be optimized for a range of pests to be monitored. These pests can include can be of essentially any pest, including animals such as rodents, raccoons, opossums, or insects.

FIG. 1 shows a perspective view of the exterior of a sensor station 100 as constructed according to the disclosure. The exterior case 102 contains electronic components of the sensor station, and is shown in FIG. 1 as water-proof, resisting the entry of liquids even upon submersion. Case 102 is comprised of an upper case cup 104 and a lower bottom plate 106. Plate 106 latches to upper case cup 104, for instance by latch 108 and 108'. (Case bottom plate 106 is provided in FIG. 1 with protruding latches, and a gasketed seal, as described in relation to FIG. 2). As shown, the sensor station is provided as a generally rhomboid in shape. Those skilled in the art will recognize that the particular shape of the case is adaptable to a variety of applications. Holes in hold down bosses 120 and 122 are provided to allow screw type fasteners to be used in attaching the sensor station to a trap or bait station. The exterior will typically be marked with an informational logo, such as logo 126, and also be provided with an identification marking, such as by way of example bar code 128. Such identification marking could be electronic as an RFID, a UPC or a QR code.

Protruding from the upper case cup 104 is sensor 130. One preferred sensor is an infrared detector, detecting infrared emissions 132 from a warm-blooded animal such as a mouse. Such detectors can be readily configured to detect radiation in a field predictable by the angle (theta) 134, and the distance of the detector from the radiation source. Control switch buttons 154 and 156, on the side surface of the case allow activation of control switches useful for low-level programming and activation of the sensor station controls. For instance, switch button 154 may function as a "wake" or "power up" control, as indicated by symbol 155. Button 156 can activate a status LED, as indicated by symbol 157. Status indicator 160 is preferably provided as a visible light spectrum LED.

Figure 2:
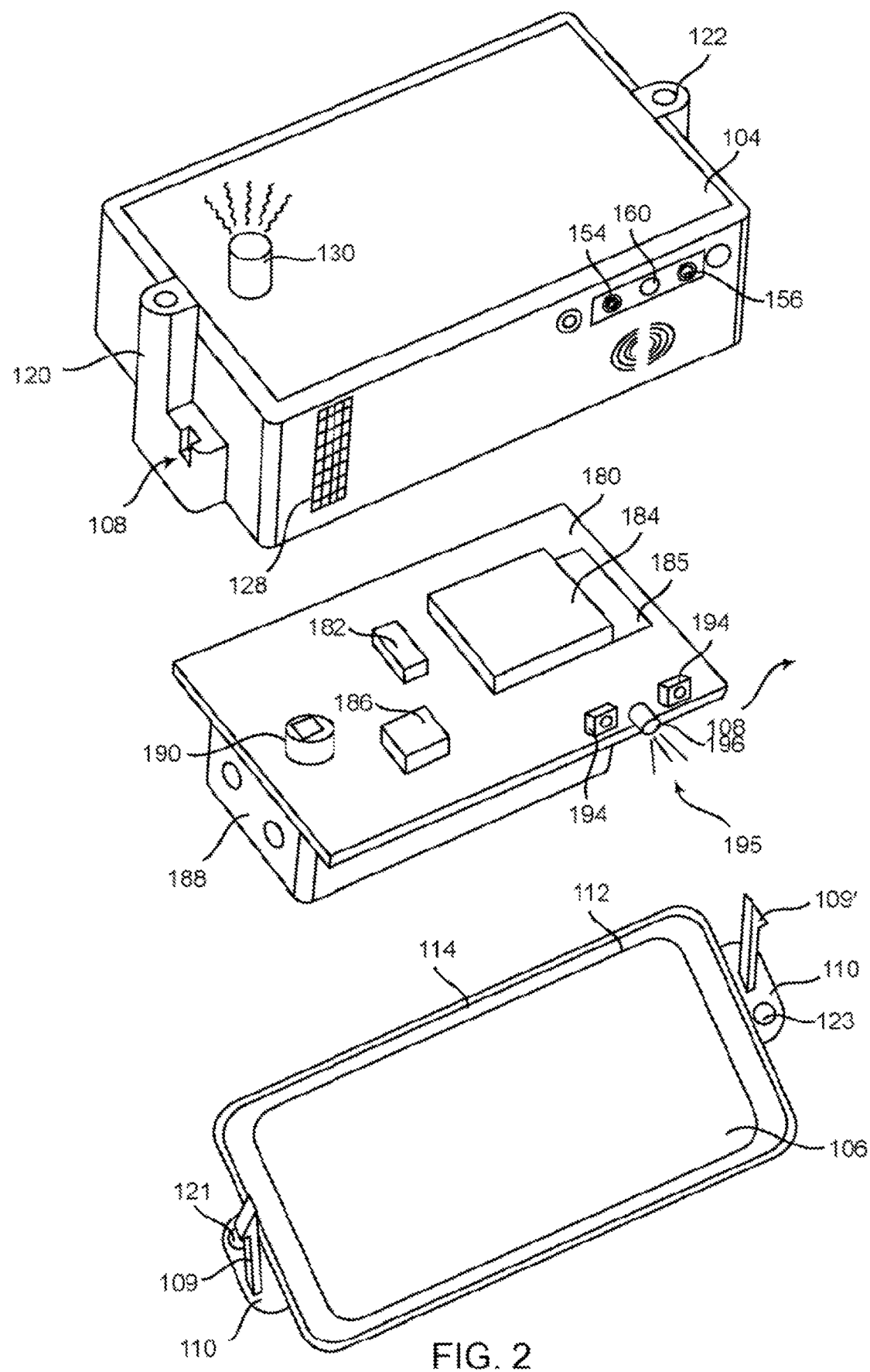
FIG. 2 shows an exploded perspective view of a sensor station.

FIG. 2 shows an exploded perspective view of the sensor station 100 disclosed in relation to FIG. 1. Shown are upper case cup 104 with hold down bosses 120 and 122, logo 126, and identification marking 128. Projecting from the upper case cup 104 is sensor port 130. Control switch buttons 154 and 156, along with the window for LED 160 are visible on the side surface of the case.

Control board 180 supports electronic operating components of the sensor station, and is preferably embodied as a printed circuit board for the necessary components. Revealed on the top surface of control board 180 is a programming connector, such as a connection plug at 182, communication module 184, antenna 185 and controller 186. As shown in FIG. 2 the sensor 190 is an infrared sensor that aligns with the sensor port 130 on the upper case cup. Also on the control board are switches, 194 and 196, and lamp, 195 aligning with complementary ports in upper case 104. A power supply is provided by battery holder 188 and batteries.

Lower bottom plate 106 latches (when assembled) to upper case cup 104 by latches 108 and 108'. Inner lip 112 secures gasket 114, so that when latched to the upper case cup 104, a gasketed seal is formed. When fully assembled, the sensor station provides a case that environmentally contains the active control board and is prepared for mounting to a bait station or trap, as described in FIG. 4.

For purposes of this application, the most typical pests are one or more species of mammals, birds, insects and other arthropods. With respect to the mammal family, most pest rodents are considered small mammals, having a weight of two pounds or less, including by way of example such pests as mouse, e.g., *Mus* p., rat, *Rattus* sp., bat, ground squirrels, chipmunks, squirrels, voles and moles. In certain situations, larger mammals may be detected by the sensor stations disclosed herein, such large pest mammals, for example, as raccoon, skunk, opossum, house cats, fox, coyote, kangaroo, beaver, muskrat and nutria. Less frequently, but in special situations, birds may be the target pest for a sensor station, including such species groups as sparrows, starling, seagulls, grackles, finches and woodpeckers. Many types of insects may be targeted for detection by pest sensor stations, including, but not limited to, orthopteran insects, e.g., cockroach, coleopteran insects, e.g., Emerald Ash Borer, hymenopterans, dipteran, e.g., Mediterranean fruit fly, and lepidopteran insects, e.g., Gypsy moth.

To develop an effective pest management strategy, the management of the data after it is received as well as the collection of the data should both be factors of a pest control system. The data collected from pest sensors may have many applications outside of simply indicating the presence of pests, if managed properly. The data may be used to trigger the management and maintenance of traps; it can be used to automatically create billing and servicing requests, and it can be used as a predictive tool to help a user adapt his or her pest management program.

A network of sensor stations can be comprised of a number of sensor stations configured to provide information useful in performing pest control services. In a preferred embodiment the sensors are in electronic communication with a sensor station hub, delivering detector data to a communication portal, with the portal then connecting with an internet or similar dedicated communication connection to a controller station. The controller station interacts with the administrators of the system, and with the customers utilizing the sensor stations to gather data.

In a typical installation, the sensor stations communicate wirelessly with the sensor station hub, which can be configured to act as a data compiler, and the sensor station hub is in communication with a wireless internet connection, such as through Bluetooth protocols or WiFi protocols such as 802.11 b protocols compliant with IEEE standard 802.11 b or the like. In some installations, a WiFi connection is extended by a WiFi extender socket with the extender socket communicating with the WiFi connection. In a preferred embodiment, the wireless internet connection communications with a remote web portal to interface with the system. For purposes of this disclosure a hub is "a device that accepts a signal from one point and redistributes it to one or more points." (See ATIS Telecom Glossary 2016).

Figure 3:
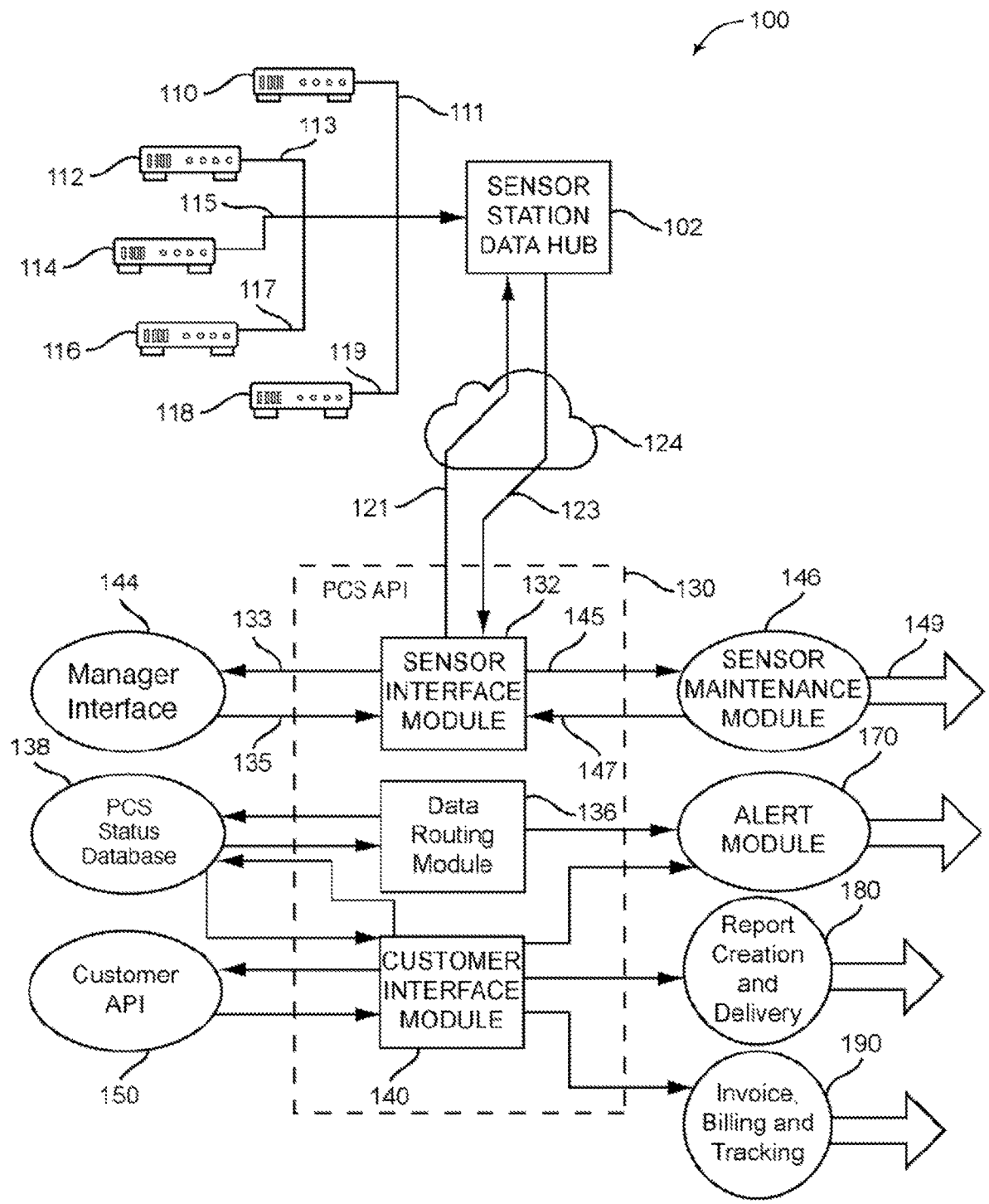
FIG. 3 shows an overview of the system architecture of a pest control system.

FIG. 3 shows a diagram outlining alternative embodiments of the architecture of the hardware and resident software components of the system when in operation in conjunction with an administrative operating system. FIG. 3 may be viewed in conjunction with FIG. 9 and FIG. 10. In FIG. 3, computer-based system 100 shows a sensor station hub 102 functioning as a sensor station data hub in a network with a plurality of sensor stations, 110-118, as shown by arrows 111-119. Network communication 120 represents any suitable computer communication link or similar communication mechanism, including some combination of a hardwired connection, an internal or external bus, a connection via an optical communication, fiber optic communication, modem, standard co-axial cable lines, high-speed T1 line, radio, infrared or other wireless communication methodologies (e.g., "Bluetooth," infrared (IR), etc.), private or proprietary local area networks (LANs) and wide area networks (WANs), as well as standard computer network communications over Internet 195 or an internal network (e.g. "intranet") via a wired or wireless connection, or any other suitable connection between computers and computer components or sensor stations and sensor station hubs known to those skilled in the art, whether currently known or developed in the future. Such network communication will typically be wireless communication, but alternatively could be through hardwired installations, optical, fiber optic or infrared communication. The sensor station hub has a network communication 184 with an internet socket 182 to allow access through network communication 121 and network communication 123 to the internet, as represented in the figure as Internet cloud 124. Internet socket may be a configured router, modem, or other socket connection, as known to those skilled in the art, connecting the sensor station hub 102 to the internet. The Pest Control System Application Programming Interface (PCS-API) 130 may be connected to the Internet allowing administrators of the system to operate and monitor the network of sensor stations. The PCS-API comprises a variety of modules, including a sensor interface module 132, a data routing module 136 and a customer interface module 140.

The sensor interface module 132 may be connected by network communication 133, 135, as shown by arrows in FIG. 3, with a separate administrative interface 144. One example of administrative interface 144 is the Servsuite Manager Interface operated by ServicePro.net, Inc. Sensor interface module 132 may allow for managing the activity of a number of the sensor stations 110-119 through the operation of the administrative interface 144, and the configuration of sensor interface module 132 may allow for coupling to a separately configured sensor maintenance module 146, in communication with the sensor interface module 132, as shown by arrows 145 and 147. Sensor maintenance module 146 may track the activity or operational status of the array of sensor stations. Notices or messages indicating or scheduling sensor maintenance may be generated by the sensor maintenance module 146, as shown by arrow 149. A number of the components of the PCS-API 130 are hardware components; a number of the PCS-API 130 are software components, and a number of the PCS-API 130 include both software and hardware components. The diagram in FIG. 3 should not be construed to mandate that the particular components shown are physically separable, but that they represent logically separable functions and modalities.

Referring to FIG. 3, data routing module 136 directs data to the one or more database files resident on the Pest Control System (PCS) status database 138 as the system may require for operation. The PCS status database may be accessible and communicatively connected to the PCS-API. Administrative access through administrative interface 144 may be generally kept separate from operations that may be conducted by the customers using the sensor stations part of the PCS system, and a separate portal, the customer interface module 140 is provided. Customers may access the system through the Customer API 150, and the pest control system enter data such as requests for installation, communication with customer service representatives, or to generate or analyze reports concerning the activities monitored by the sensor stations installed at particular locations. In addition, the customer can set preferences for when particular alerts are generated by alert module 170.

Alert module 170, alternatively, the notification module, may operate as a message generating system to generate or direct delivery of messages from the PCS system. Notifications or alerts can be messages regarding pest activity, at the parameters determined by the administrators, or by the customers, for instance. Messages concerning activation or deactivation of system components similarly can be generated. In some embodiments, parameters of alert module 170 are preconfigured with factory settings that are active when the customer is given access to the system. In other embodiments, customers may access the system through the Customer API 150 and set preferences by setting parameters that determine when alerts may be sent to them.

Report Creation and Delivery module 180 may direct the generation and delivery of appropriate reports concerning the system.

Invoicing, Billing and Tracking module 190 may allow the administrators to bill for services based on pest activity, lack of activity or sensor station installation. Invoicing, Billing and Tracking Module 190 also allows customers to review activity and billing status.

Alternative embodiment of the system architecture may be implemented. In some embodiments, a data routing module may be interposed between the customer database and a separate sensor activity database. The pest control system of this disclosure may allow a customer to access a customer database while at the same time suppressing access to the sensor station network by administrative controls. The administrative interface may interact with the data routing module and may be comprised of a number of activity modules (which may not necessarily be configured as separate physical embodiments, but may be represented as different activities performed by the administrative API. The individual activity modules include sensor maintenance, alerts and notifications, reporting, invoice and billing, scheduling, end user self-service/bill payment, account management, for instance.

Figure 4:
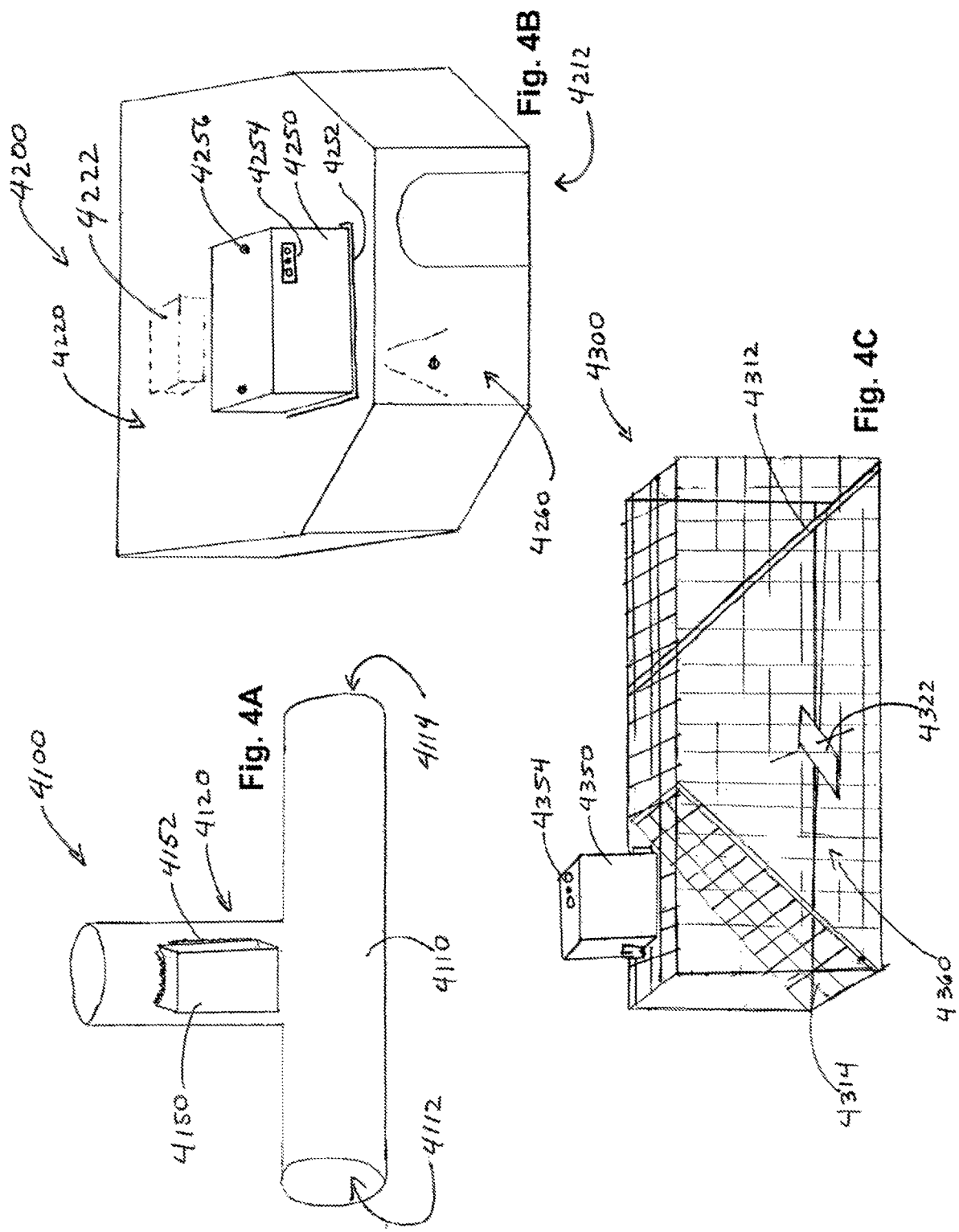
FIG. 4A shows the installation of a sensor station on a bait station or trap.
FIG. 4B shows the installation of a sensor station on a bait station or trap.
FIG. 4C shows the installation of a sensor station on a bait station or trap.

As previously described in FIG. 1, the disclosed sensor station is adaptable for use on a variety of traps, bait stations, monitoring stations, or a combination of those devices. FIG. 4 shows three examples of typical installations for the sensor stations. It should be recognized that existing bait stations or traps are readily upgradeable with the sensor station. The sensor stations also are adaptable for improved bait stations that improve sensitivity and reliability. In FIG. 4A is shown a common example of a bait station 4100, with animal passage 4110 and two animal entries 4112 and 4114. Bait station 4100 is provided with an upright tube 4120, from which animal bait hangs, within reach of animals in passage 4110. Applied to the side of bait stations 4100 is sensor station 4150, similar to that shown in FIG. 1. A hole in the wall of the bait station is formed to allow the field of view of a motion detector to monitor the bait station. As shown in FIG. 4A, an adhesive layer, such as adhesive 4152 may be used to secure the sensor station 4150 to the bait station. The position of the sensor station on the bait station may be varied to adapt to the incidents being monitored. As shown in FIG. 4A, in some embodiments an animal that rises into upright tube 4120 may be detected by an IR signal, or the sensor station could simple function as a switch to detect bait disturbance, or usage.

A box type bait station or trap is shown in FIG. 4B. Animal entry is through door 4212, and a mouse or rat for instance may need to navigate a series of baffles to enter the bait zone. The station 4200 could be fitted with a trap and bait, or simply bait 4222 in baiting zone 4220. Applied to the top of stations 4200 is sensor station 4250. The sensor station could be affixed by hook-loop fasteners 4252, for instance, by screw fasteners 4256, both or other alternatives. Control switches and status LED are provided outside the station. A hole in the cover of station 4200 allows for a motion-detecting signal within the field of view 4260.

A wire live animal trap, as is commonly available to technicians and the public is shown in FIG. 4C. Trap 4300 is provided with one or more doors 4312 and 4314, along with a trigger, as shown by trip 4322. A trap of the type 4300 is usually baited to encourage entry into trap area 4360. Other alternatives may simply be placed in an area where animals may pass. Humane treatment and often time laws require frequent monitoring of animal traps. Sensor station 4350 is positioned to place animals trapped within trap 4300 in the field of view of a motion detector to monitor the trap occupancy. The networked aspect of this disclosure allows for a technician to manually periodically monitor a live trap for occupancy, or to have alerts sent to an electronic device to announce when there has been a trap status change. Those skilled in the art will recognize that the sensor station and method of use disclosed are readily adaptable to a range of apparatus and animal situations that may be encountered.

Figure 5:
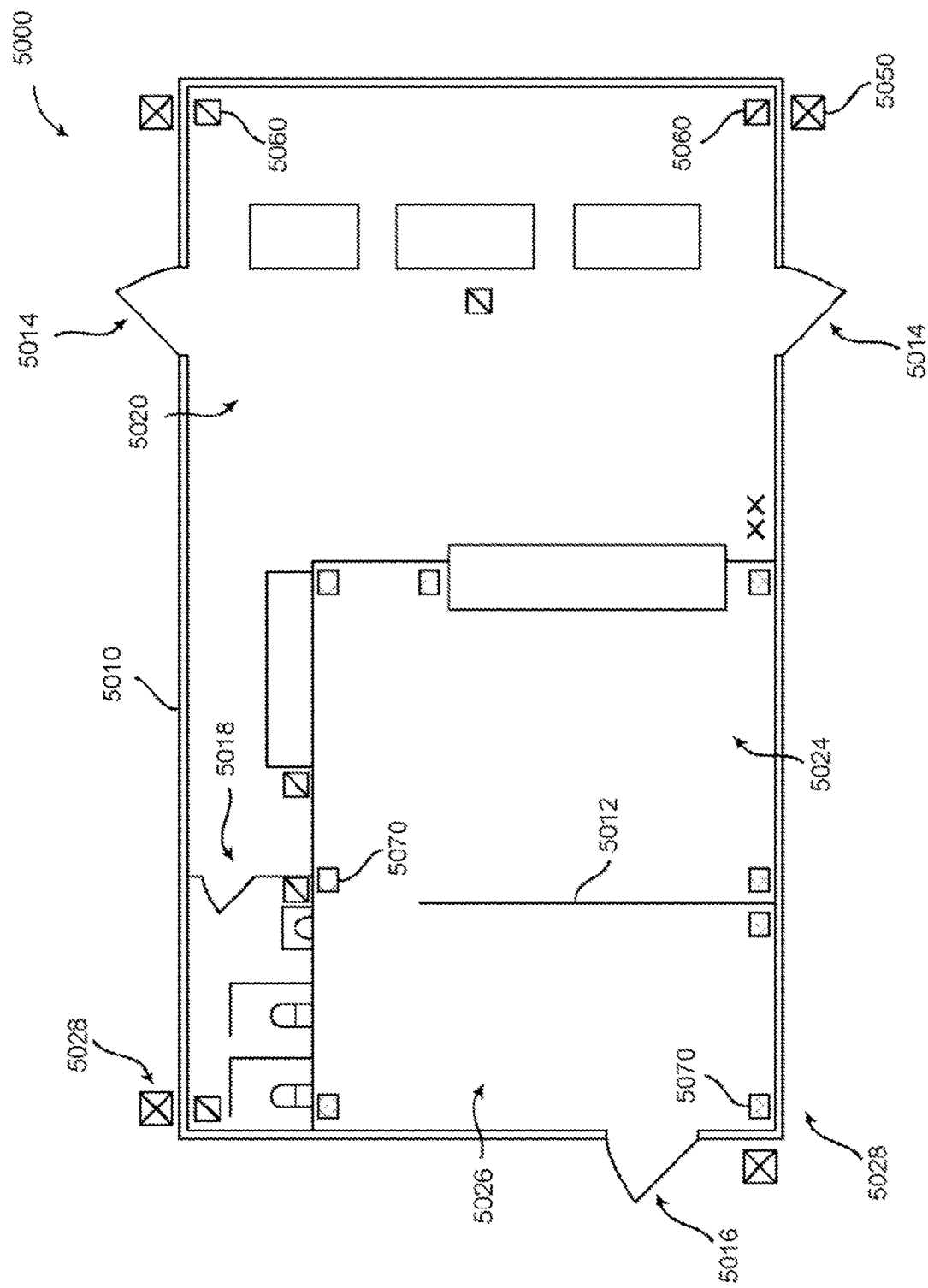
FIG. 5 shows a map of the location of installed networked sensor stations.

Referring to FIG. 5, FIG. 5 shows a map of the location of installation of networked sensor stations (e.g. at location 5050). It is expected that sensor stations will be installed at baiting stations or traps at a variety of locations, such as food service facilities, restaurants, commissaries, warehouses, residences or other locations where pest management is important. FIG. 5 shows a hypothetical floor plan 5000 of a typical fast food restaurant, with exterior walls 5010. A number of doors allow passage between areas, such as entry doors 5014, service door 5016 and restroom door 5018. The restaurant may be divided into serving and eating area 5020, restrooms, preparation area 5024, food storage area 5026 and building exterior areas 5028. While these areas may be physically separated, there also may be limited pest barriers between them.

Different types of sensor stations may be either required or desired in different areas. In the exterior areas, simple monitoring with a sensor equipped bait station may be desired, and such locations are shown on the site map 5000 as X-filled squares (e.g., 5050). By way of example, the most crucial monitoring zone may be the locations where food is stored (5026) or prepared (5024). A trap type station with notification links and video capability may be needed at such locations, as indicated by filled squares (e.g., 5070). A trap type station with notification links only may be needed in eating and restroom areas, as indicated by hatched squares (e.g., 5060). The sensor stations may also provide for location services to allow technicians to readily identify the location, either by a GPS based map, by audio feedback, by WiFi, by radio-frequency and triangulation, or by photography.

Referring to FIG. 6, FIG. 6 depicts various user interfaces of web pages which a user typically encounters while utilizing embodiments of a computer-based pest control system. With respect to FIG. 6-FIG. 8, the customer is a pest control management company that has individual users of the system. FIG. 6A depicts the initial user interface of a page that a user may see as he or she initially accesses computer-based system. 100. When the user has been authenticated and logged into computer-based system 100, the user is directed to the welcome page 1000 that typically displays a personalized greeting 105. Welcome page 1000 allows the user to select a parameter from the search dropdown list, which may include parameters such as "account number", and then enter a search query of keywords or phrases into search box and request that search module of computerbased system query database using the search query. Welcome page 100 allows the user to search among users via the search parameters listed in the search table 120, or via a "Quick Search" feature that is accessed by selecting Quick Search internal link 118. In some embodiments, when a user selects Quick Search internal link 118, pest control system 100 may direct the user to a quick search page or quick search drop-down menu displaying one or more fields for performing a search of a search table. In some embodiments the number of fields displayed in a quick search page is less than the number of fields displayed in search table 120. Search table 120 may include data fields such as first name, last name, company name, street number, street name, city, ZIP code, builder, lot number, or subdivision. Welcome page 1000 may also include filters which when selected, instruct search module to limit the search to active accounts only, inactive and active accounts, sites, or any other filter useful for limiting the search. Header 125 of welcome page 1000 may include a plurality of header icons. When a user selects home icon, the computer-based system will then display a home page configured to the user; when a user selects a setup icon, the computer-based system will then display a setup page to a user; when a user selects the reports icon, the pest control system 100 may then display a reports page to the user; when a user selects "add new account" icon, pest control system 100 may then display a page for adding new accounts to database; when a user selects icon module pest control system 100 may return the user to the home page; when a user selects the setup icon, pest control system 100 may return the user to the setup page; when the user selects the office icon pest control system 100 may return the user to the icon page; when the user selects the reports icon, pest control system 100 may return the user to the ion page; when the user selects the "add new account icon", pest control system 100 may return the user to the add new account wizard. When a user selects one of header options, computer-based system 100 may direct the system to display to the user a page that corresponds with the selected header option.

Figure 6A:
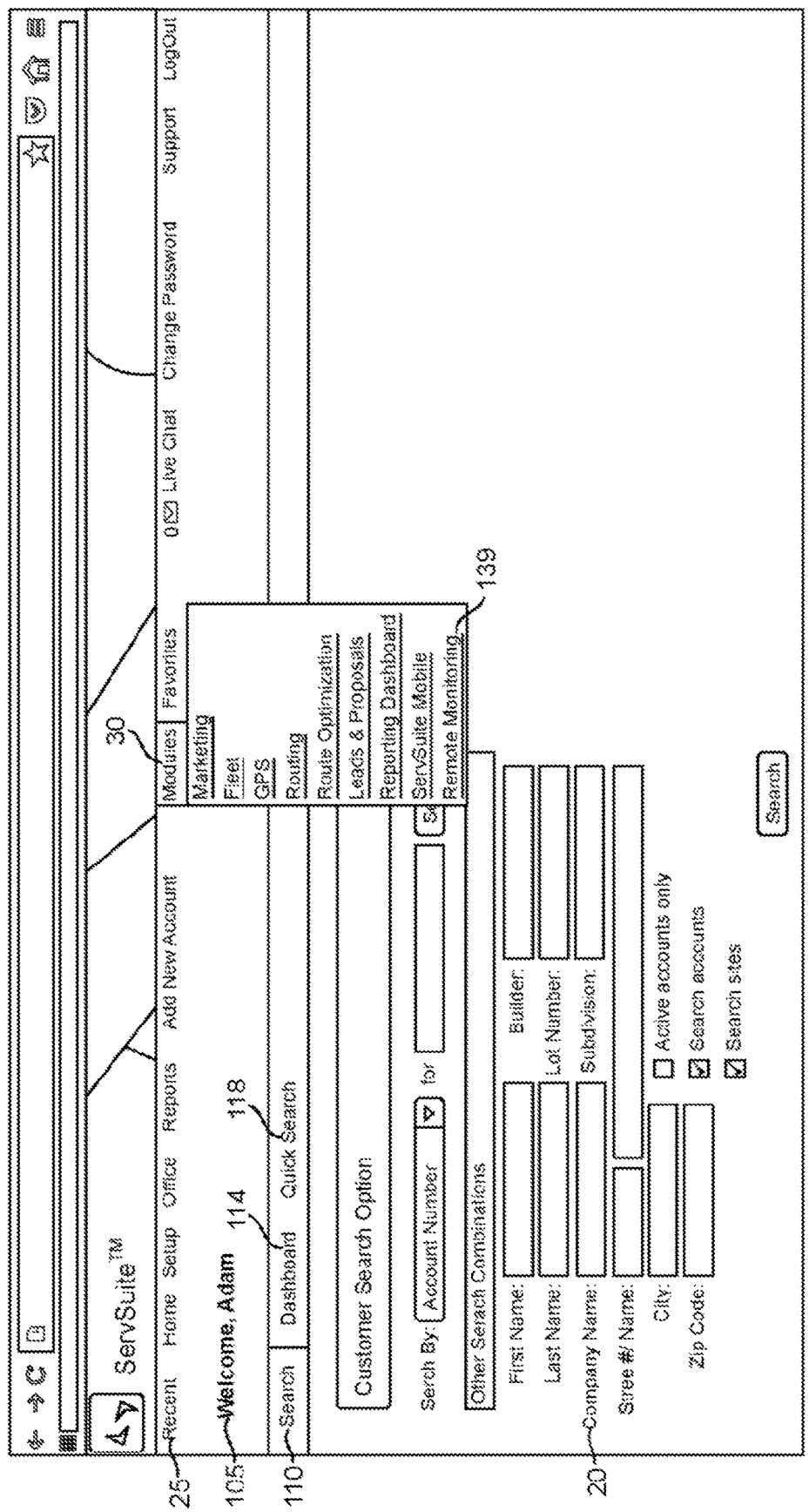
FIG. 6A illustrates an element of a method that may be performed by a pest sensor data monitor.
Figure 6B:
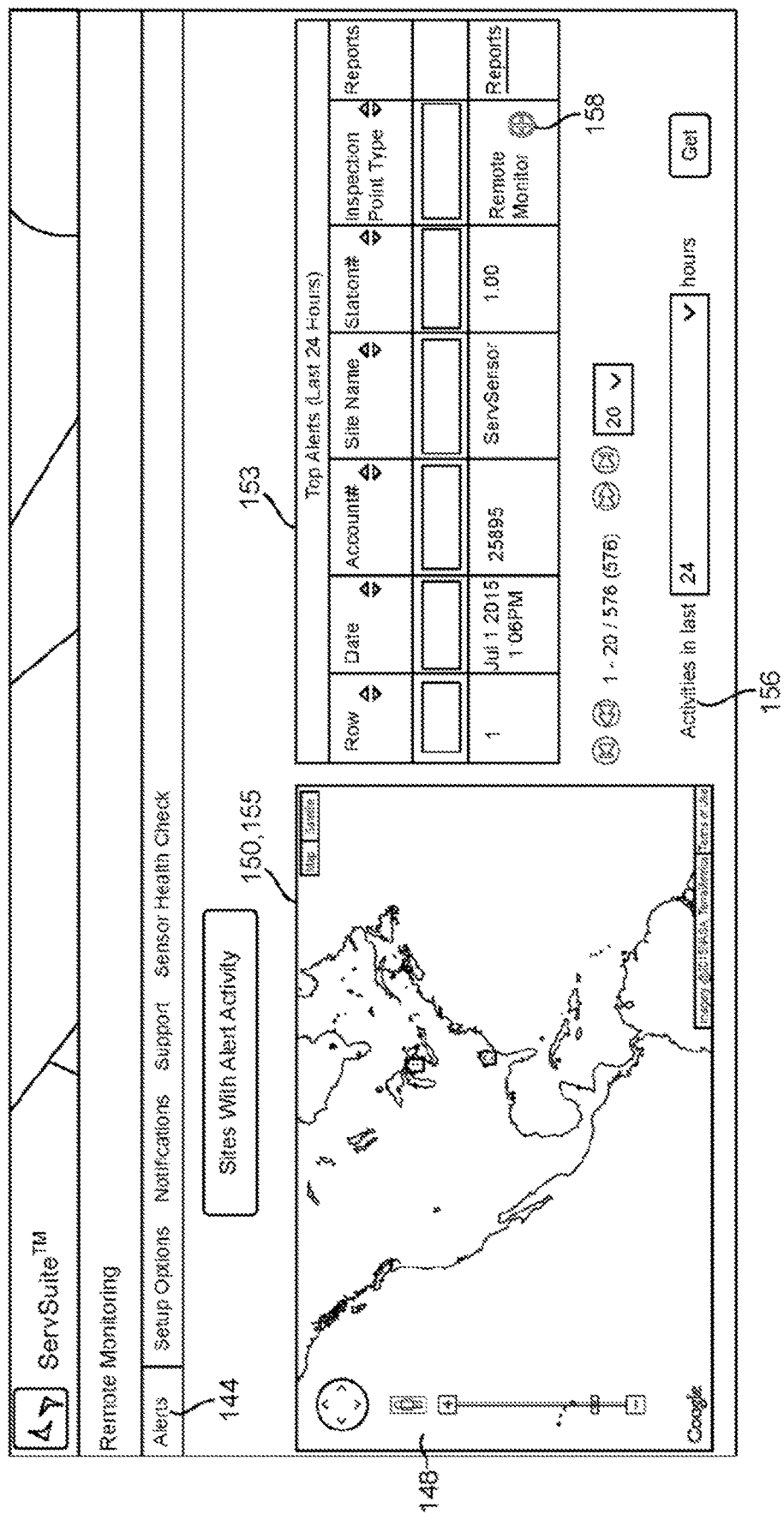
FIG. 6B illustrates an element of a method that may be performed by a pest sensor data monitor.
Figure 6C:
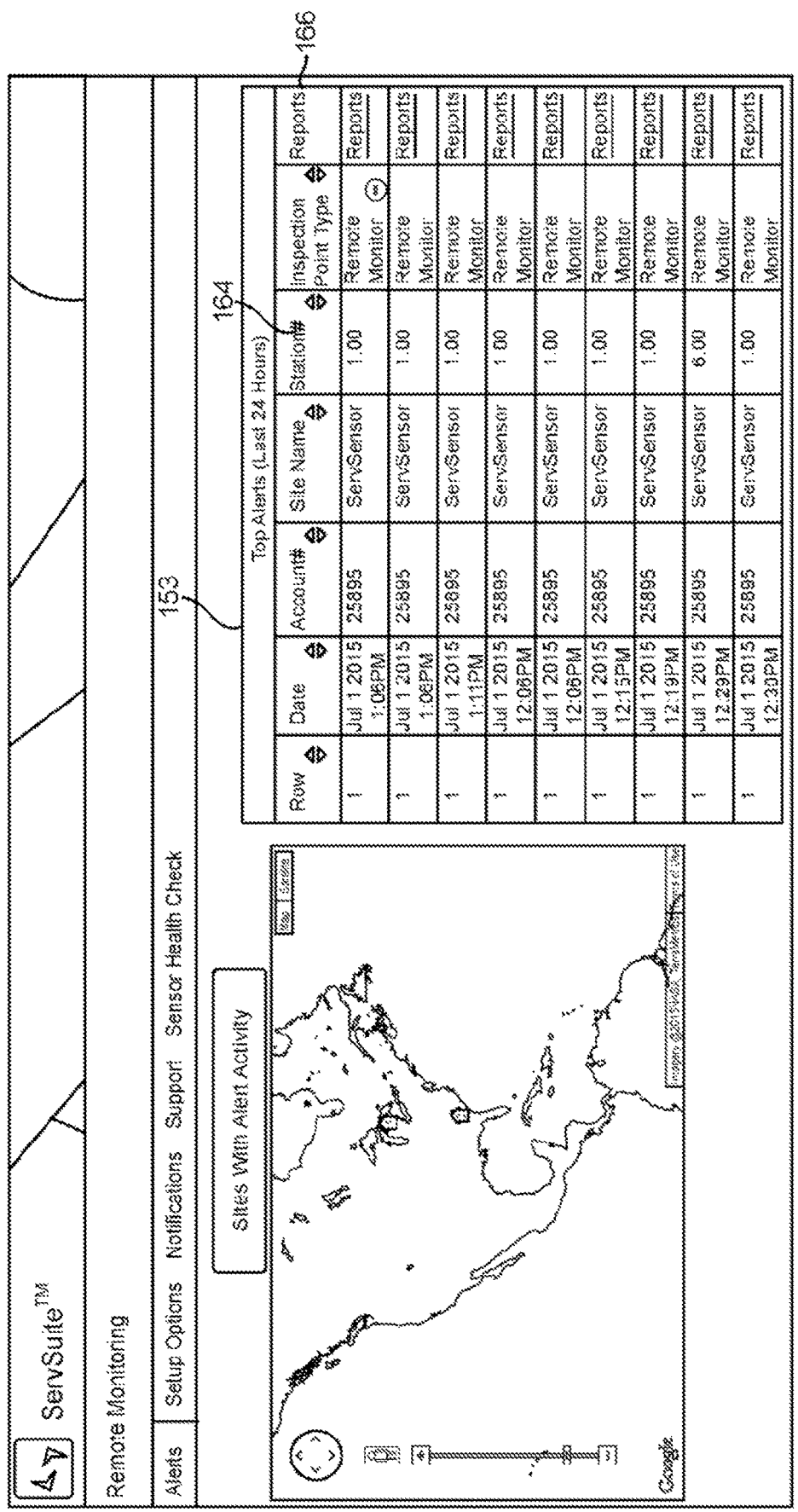
FIG. 6C illustrates an element of a method that may be performed by a pest sensor data monitor.
Figure 6D:
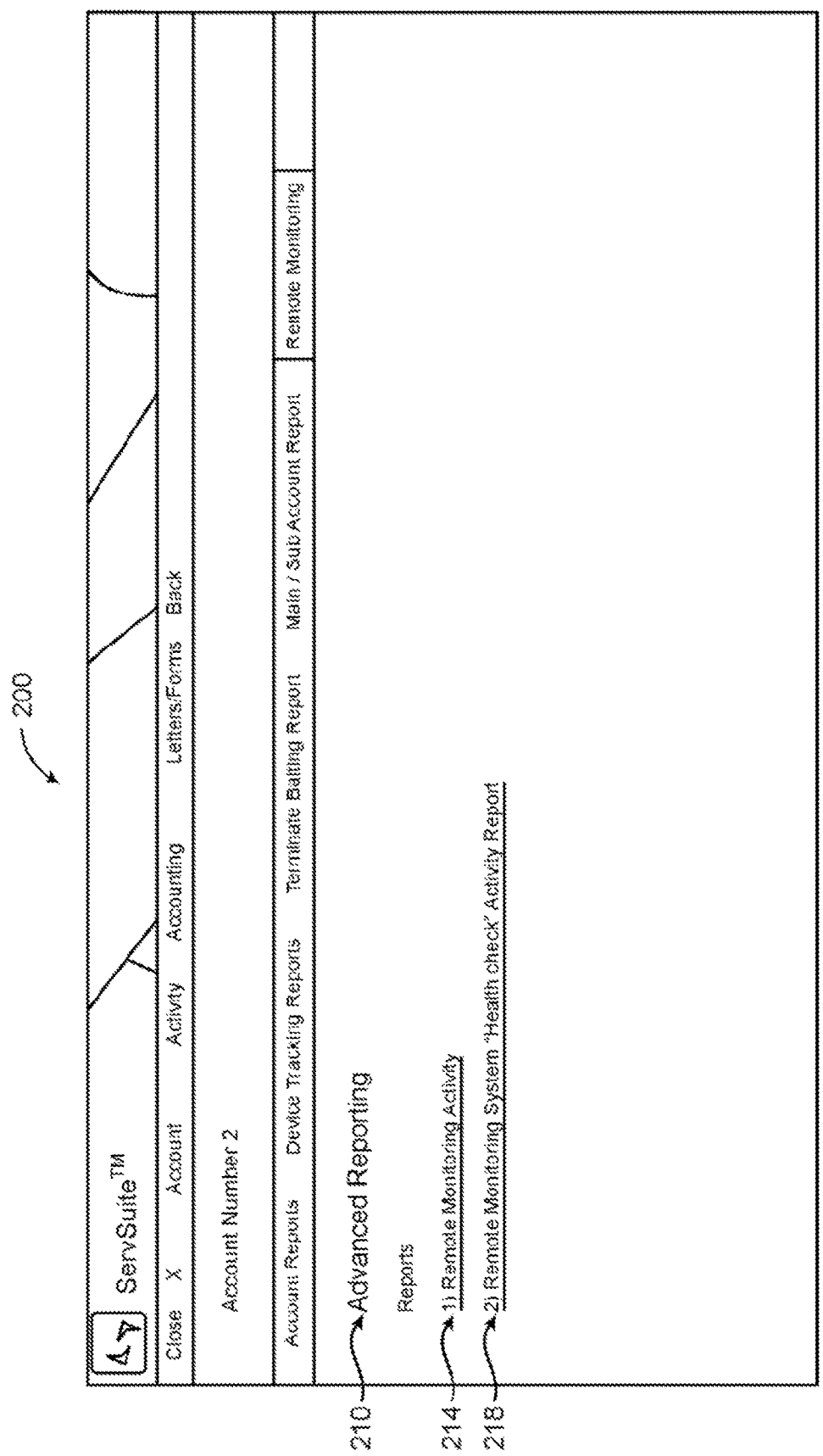
FIG. 6D illustrates an element of a method that may be performed by a pest sensor data monitor.

FIG. 68 shows the opening page of the "Remote Monitoring" module of the user interface 140, which is the "Alerts" submodule of the "Remote Monitoring" module. Along the header of the page 144, in some embodiments, are links to other submodules within the "Remote Monitoring" module. Examples of submodule links are "Setup Options," "Notifications," "Support," and "Sensor Health Check." The body of the "Alerts" submodule may depict a map labeled "Sites with Alert Activity" 148. The map may display all sites of the user's account that have displayed recent alert activity. In the figure, these sites are shown at 150 and 155. To the right of the map may be a table 153 labeled "Top Alerts (Last 24 Hours)". This table may initially show the most recent alert within the user's sites; display the date of the alert, the account number of user, the site name associated with the alert, the station number for the alert, the generation point of the alert; and may provide a link to the report for the alert. Utilizing the plus icon 158 in the "Inspection Point Type, pest control system 100 may expand the column width of the table to show all alerts within the previous 24 hours, as shown in FIG. 6C. The user may also extend the amount of alerts displayed to all those within 36 or 48 hours using the dropdown menu 156.

When the "Top Alerts" table 153 is expanded, as in FIG. 6C, all alerts within the time period selected are displayed. Each alert is displayed according to the time at which the alert was received 160. The "Station #" column 164 may display the respective sensor station for which the alert was received, based on the number value of the particular station. The "Reports" column may allow the user to select the report 168 for each specific alert. Selection of an individual report may direct the user to the "Advanced Reporting" submodule shown in FIG. 60.

FIG. 60 describes an "Advanced Reporting" submodule 210 which may be included in pest control system 100. When a user selects a "Reports" icon from the "Alerts" submodule 144 shown in FIG. 2B, the user may be directed to the page shown in FIG. 60. On the first page of the "Advanced Reporting" submodule 210, the user may select from two different varieties of reports by selecting one of two internal links: 1) internal link 214, which instructs pest control system 100 to direct the user to a Remote Monitoring Activity Report, or 2) internal ink 218, which instructs computer-based system 100 to direct the Remote Monitoring System "Health Check" Activity report 218.

Figure 6E:
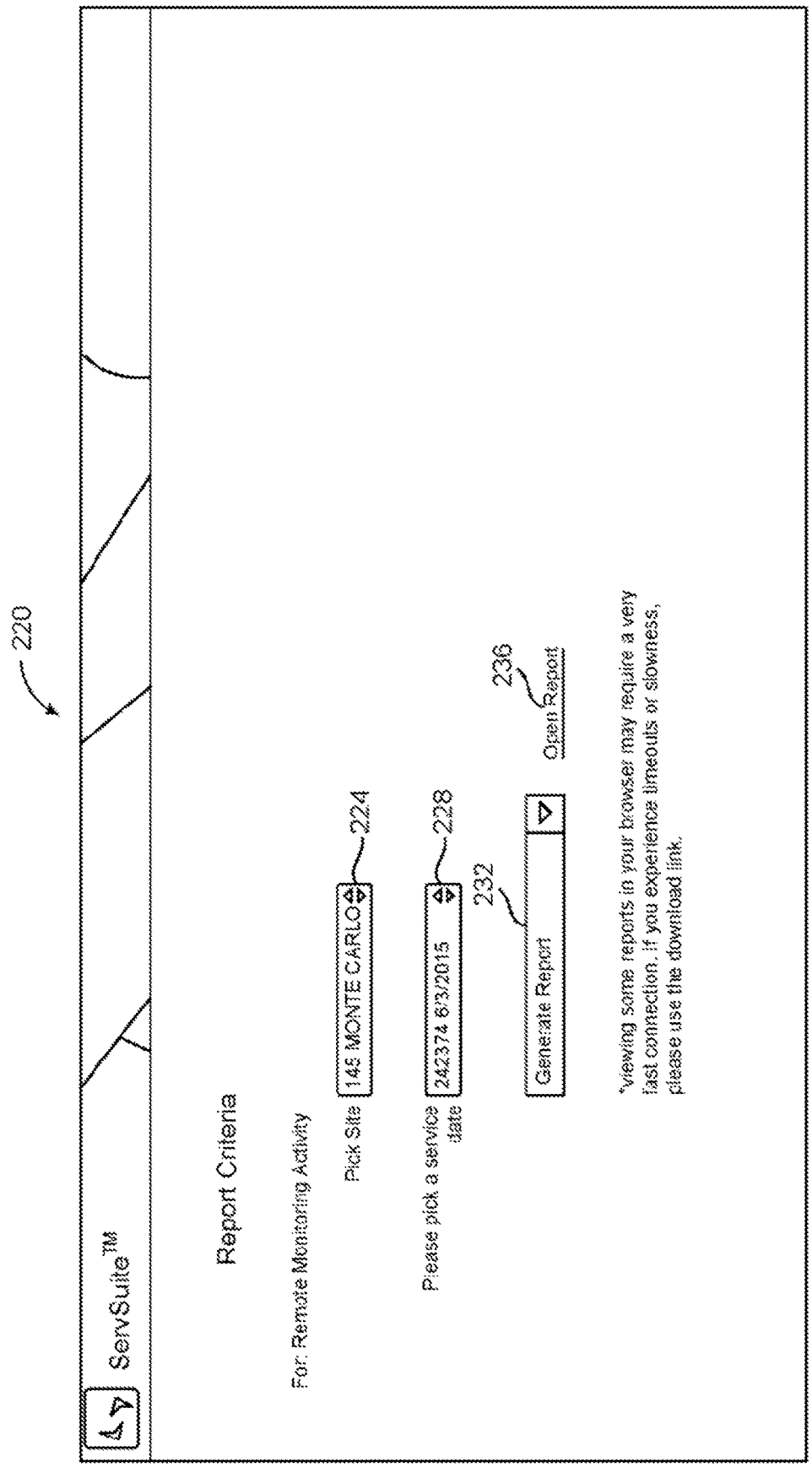
FIG. 6E illustrates an element of a method that may be performed by a pest sensor data monitor.

FIG. 6E depicts an exemplary report criteria page to which a user is directed with a pick site wizard 224, a pick service data selector 228, and report action selector 232, which includes a drop down menu for actions related to a report such as "Generate Report", which when selected requests that the pest control system generate a report. A link may be used to instruct the system to "open a report" 236 and display the report to a user.

FIG. 6F displays an exemplary report monitoring activity page to which a user may be directed. Various data may be presented at 244, such as the station that is being monitored, the number of activations for a station or other information about sensor stations, sensor station hubs, technicians, pests, or other information related to a pest control system. Billing information, technician information, date stamps and other information may be presented.

FIG. 6G shows an exemplary reports criteria page to which the user is directed if he or she selects the remote monitoring system health check activity report 218 in FIG. 60. As with FIG. 6B, the user is directed to a reports criteria page 270, where the user can input the specific criteria to be generated as part of the report. The user inputs a start date, selects a start date, selects an "as of date" which instructs pest control system 100, which may be computer-based, to create a report based on the data that was current as of the as of date using date selector 274, which instructs computerbased system 100 to generate an activity report for that time period, as well as choosing a site 278 for the report. Again, the user may also choose to have the report generated as a PDF or in another form 280. When the user selects "Open Report" 282, the report is generated.

FIG. 6H shows an example of an activity report 290 generated from FIG. 6G. The report shows the date range for the report 292, and the time the report was generated 294. The customer account number is shown at 296, with the customer name at 294. Any activity that meets the date and site criteria requested will be displayed at 298, though none is present in the report as shown.

One embodiment of the present disclosure is providing a sensor station kit for implementing the system on nearly any trap, bait station, or monitoring station. In relation to use of the sensor station kit, any installation of a sensor station on an animal control point is defined as a "station." Stations in which the described system is implemented could also be termed a sensor station, a bait station, or a trap station.

Figure 7A:
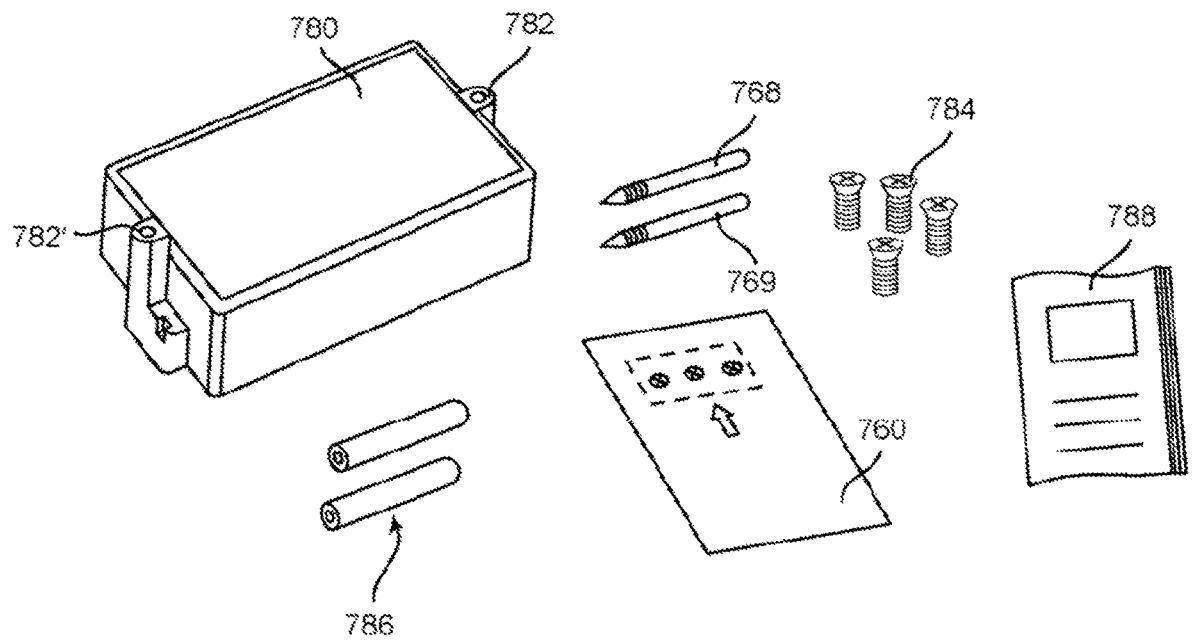
FIG. 7A shows the contents of an embodiment of a sensor station kit.

Referring now to FIG. 7, kit for providing trap status monitoring is described. In FIG. 7A kit 750 is typically supplied with the necessary components for retrofitting or fitting a station for monitoring. The contents would include a weatherproof case for enclosing a sensor station. a sensor station some variety of communication module, a status recording module, and a sensor; necessary tools for installing the sensor station; a fastener system for attaching the case to a pest station; a power supply, and an implementation manual for linking the sensor station to a network. Also provided in the kit is one or more templates for locating the sensor station effectively on a station of some kind, whether a bait station or a trap. For purposes of the kit, a variety of different kits would be available, primarily differing in the type of sensor provided, with the sensor typically being one or more of a temperature monitor, a voltage monitor, a motion detector, a trigger switch, and a camera.

Kit 750 provides a typical motion detecting sensor station, as described in relation to FIGS. 1 and 2, contained within case 780, and providing mounting lugs 782 and 782'. One or more appropriately drill bits, 768, 769, for instance, sized to open a hole for the motion detector port, and for fasteners screws 784. Drilling template 760 is provided to assist the installing technician in locating the sensor station on a bait station. Finally an installation manual 788 provides information necessary to install the sensor station and operate it effectively. Batteries 786 serve as a power supply.

Figure 7B:
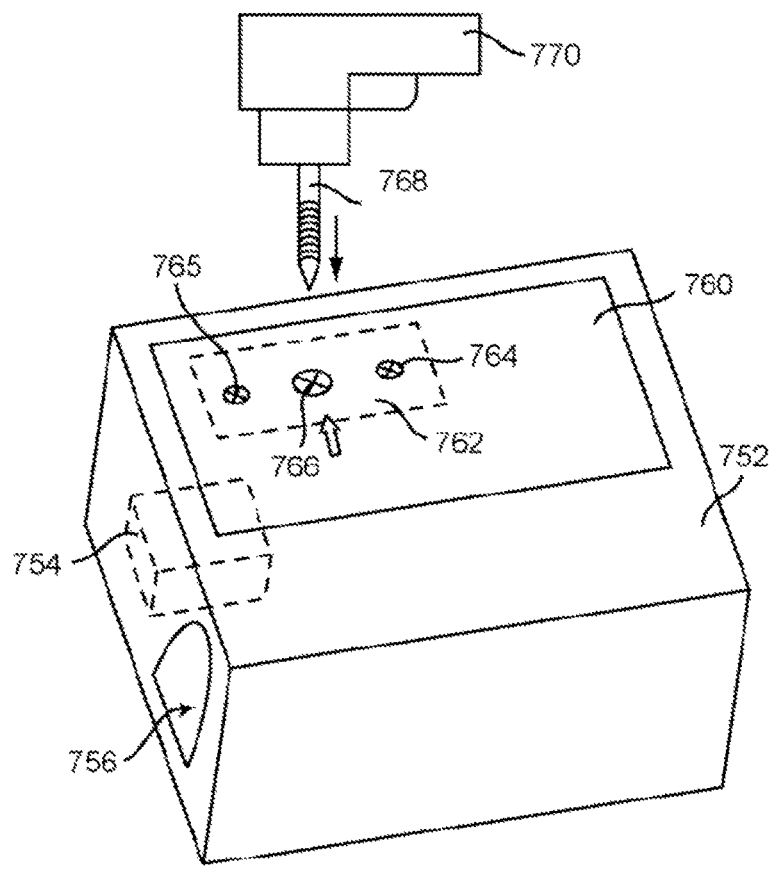
FIG. 7B shows the installation of an embodiment of a sensor station kit on a bait station.

Turning to FIG. 7B, a bait station 752 provides bait 754 and an animal opening 756. Template 760 is placed on the bait station, and holes are drilled to mount a sensor station at location 762. Hole 765 is for mounting fasteners and hole 766 is for a motion detector port, for example. A customer provided drill uses the appropriate drill bits 768 to open the holes.

Figure 7C:
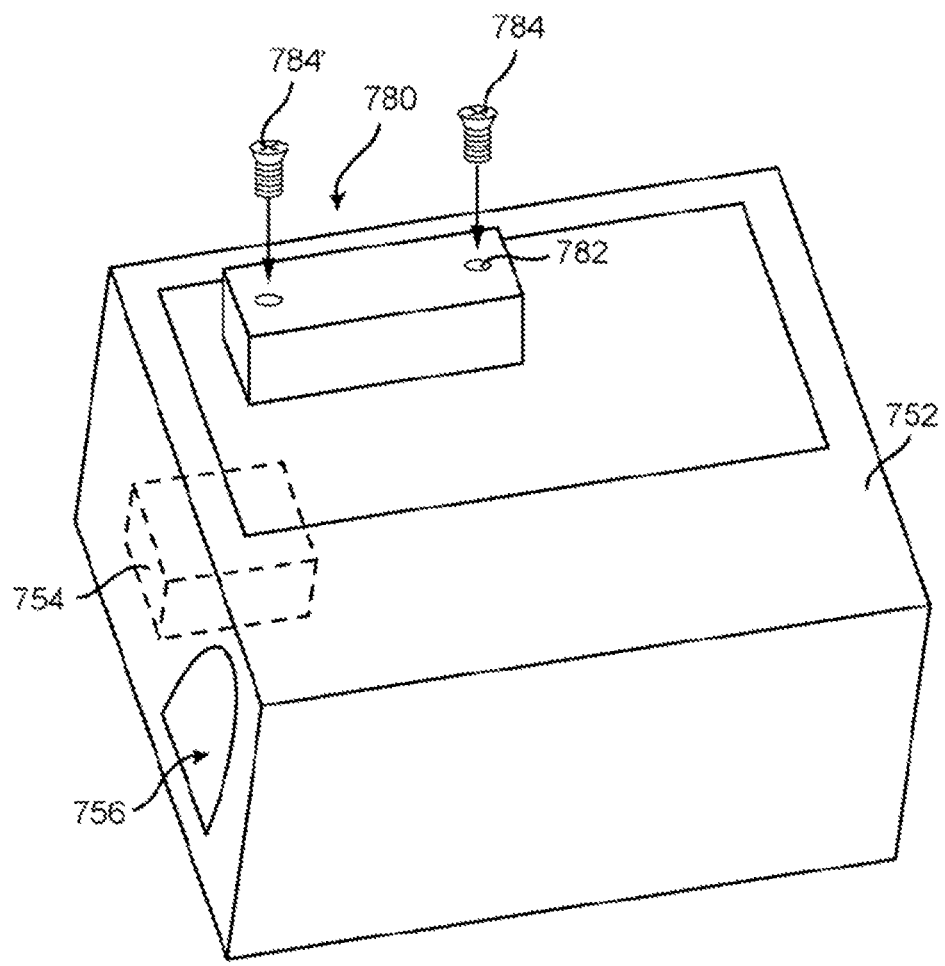
FIG. 7C shows the installation of an embodiment of a sensor station kit on a bait station.

In FIG. 7C the final steps for mounting a sensor station are shown. Sensor station 780 is placed on the bait station, and fasteners 784 are driven through lug holes 782 to affix the sensor to the bait station. The steps necessary to link the sensor station to a monitoring system of some type are followed to operate the station. Those skilled in the art will recognize that the kit contents will vary based on the chosen fastening method, the type of sensor station used, and the capabilities of a particular target audience.

Figure 8:
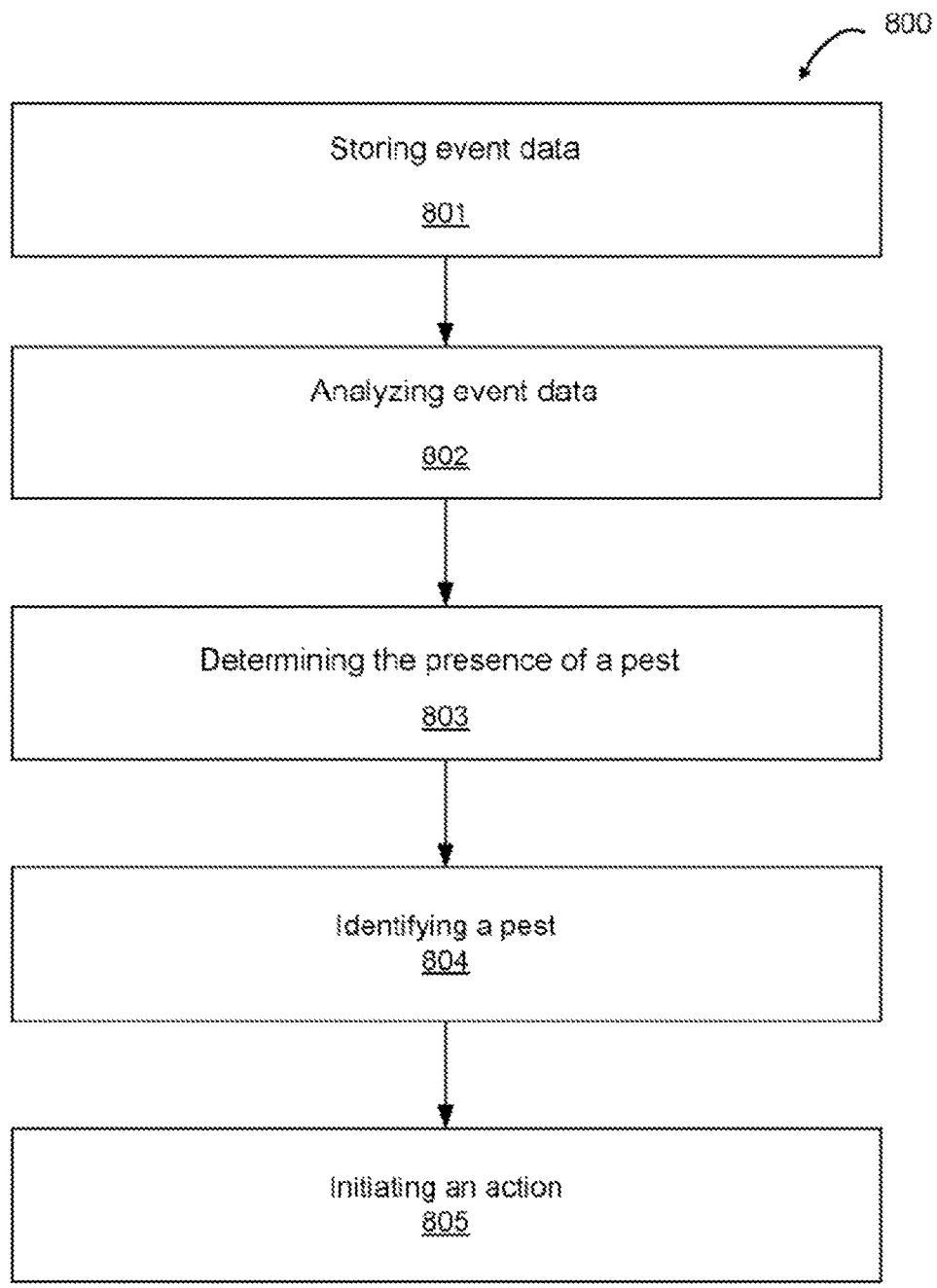
FIG. 8 illustrates a flow chart of a method implemented by pest presence determiner, according to one example of the principles described herein.

Referring to FIG. 8, an overall process and method 800 for determining the presence or the type of pest in accordance with a preferred embodiment is shown. In the most preferred embodiments, method 800 is a computer-implemented method using in conjunction with the hardware and software described in the other figures, including FIGS. 3 and 5.

Generally in the first step "storing event data" 801 of method 800, an event data storage module receives, and stores on a storage medium, data from sensor stations, whether directly or indirectly, which the sensor modules of sensor stations have recorded from a number of pest. Event data may be sensor data recorded by a sensor module of a sensor station; event data may be raw data or it may be processed data such as a number 3 representing three activations of a motion-detector module. Next, a step 802 "analyzing event data" may be performed where an analysis module of a pest control system performs an analysis of event data, which may include organizing event data, collating event data, or comparing event data to thresholds or standards. The module may use various algorithms and thresholds; the module may collate data from a plurality of sensor stations. The module may receive data in a collated form directly from a sensor station hub. The analyzing step of the method may include comparing the data to thresholds, comparing the data to historical data that has been stored for a number of sensor stations, determining where hot spots of pest activity are occurring, comparing the data of a number of sensor stations to the data for the same sensor stations during a predefined time interval such as one month or one week earlier.

Next, the method 800 includes the step 803 of "determining the presence of a pest" which may be performed by a pest determining module of a pest control system. A pest determining module may make a decision based on the results of step 802 "analyzing event data", which may include a) comparing the event data to the event data that has been measured in the past by actual pests which have been caught in a similar trap and are not false positives created by debris or a pest which has entered and then exited the trap, and b) forming a determination of whether a threshold has been met at which the pest control system may determine, and in some embodiments report to a human user, that a sensor station has detected a pest and that the pest is physically trapped within a trap associated with the sensor station. The threshold may vary depending on factors such as whether the traps are designed to kill or injure a pest and thus may result in a corresponding sensor station detecting activity followed by activity, body temperature versus a lowered body temperature in a dead animal, or some other change in the measurable state of a pest. Various parameters may be configured by users which vary the likelihood that false positives of trap occupancy may be reported; and, the type of parameters or threshold may be selected by the pest control system or by humans, depending on the customer's tolerance for having a technician check an empty trap versus having a trap that is occupied by a pest remain occupied because the threshold relatively high.

Next, method 800 follows the step 804 of identifying a pest. Various modules and processes that are described in this application may be used by a pest control system to determine from sensor station data the type of pest that has activated a sensor, and in the most preferred embodiments, the pest control system stores that identity in a data store.

Next, method 800 follows the step of initiating an action such as sending a message to a message recipient, suppressing any action until a threshold has been met, sending an urgent message, or other type of action.

Figure 9:
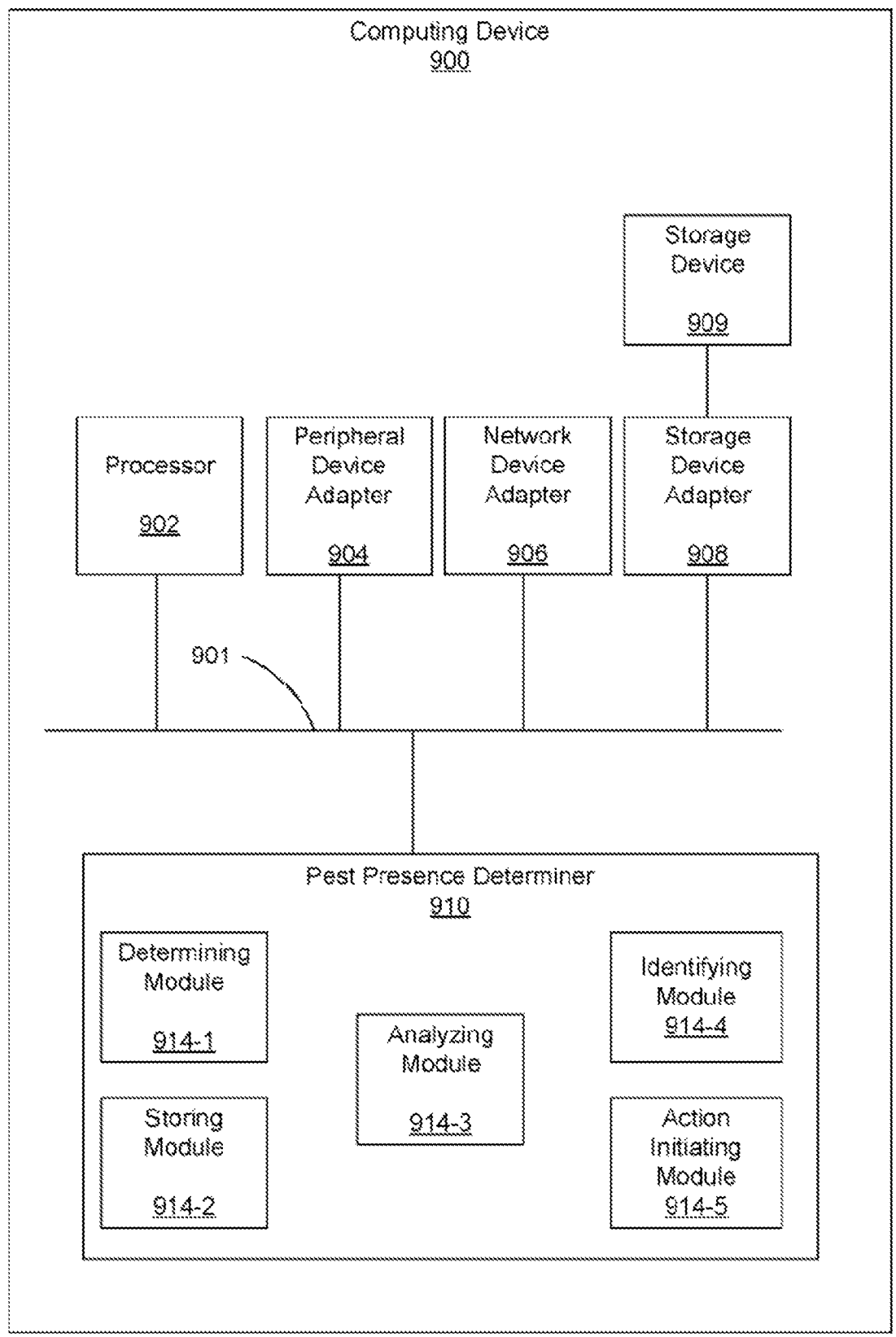
FIG. 9 illustrates a computing device for operating a pest detection sensor monitor, according to one example of the principles described herein.

Referring to FIG. 9, a computing device, alternatively an embodiment of a pest control system, for operating a pest detection sensor monitor, according to one example of the principles described herein, is illustrated.

Aspects of the computer-based system for enhanced communication and event management are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Aspects of the computer-based system for enhanced communication and event management are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which inclement the function/act specified in tile flowchart and/or block diagram block or blocks.

The computer program instructions may also be loaded onto a computer, other programmable data processing apparatus, or other devices to cause a series of operational steps to be performed on ttle computer, other programmable apparatus or other devices to produce a computer implemented process such that the instructions which execute on the computer, or other programmable apparatus provide processes for implementing the functions/acts specified in the flowchart and/or block diagram block or blocks.

Computing device 900 may be a server or a plurality of linked servers. Computing device may perform method 800. Storage device 909 may be configured to store computer program code, which when executed by the processor 902 may initiate requests and actions. Some examples of storage devices may be a memory device, a hard disk drive (HOD), a random-access memory (RAM) device, a read-only memory (ROM) device, a flash memory device, and any other volatile or non-volatile memory devices. Storage devices may serve to store, at least temporarily, computer program code for later reference and use by their respective processors.

Storage device adapter 908 may be a device that allows the storage device 909 to connect to other components of computer-based pest control system. An example of a storage device adapter is an auxiliary storage interface which allows a data server to store and retrieve information from auxiliary storage devices, such as external storage mechanism, magnetic disk drives (e.g., hard disks or floppy diskettes) or optical storage devices (e.g., CD-ROM). One suitable storage device is a direct access storage device (DASD) such as a DVD or CD-ROM drive that may read programs and data from a DVD or CD disk.

Network device adapter 906 may be a device that is configured to connect a computer-based pest control system to a network including an intranet or internet, which includes forming a wireless connection with another device.

Peripheral device adapter 904 may be a device that is configured to allow connections between the computing device and peripheral devices, such as a mouse or monitor, or between components of the computing device and peripheral devices.

Processor 902 performs computation and control functions of the computing device, and most preferably comprises a suitable central processing unit (CPU). Processor 902 may comprise a single integrated circuit, such as a microprocessor, or may comprise any suitable number of integrated circuit devices and/or circuit boards working in cooperation to accomplish the functions of a processor or CPU. Processor 902 is configured to execute one or more software programs contained within storage device 909. This disclosure pertains to data servers containing only a single main processor and a single system bus, as well as to computer systems having multiple processors and multiple system buses.

Although system bus 901 of the preferred embodiment is a typical hardwired, multi-drop bus, any connection means that supports bi-directional communication in a computer-related environment could be used.

Pest Presence Determiner 910 may be a module or a device that uses processor and memory resources, as well as executable program code, to determine the presence of a pest in a sensor station by analyzing data recorded by a sensor module of a sensor station. Pest Presence Determiner 910 may coordinate communication between different submodules, which are identified as modules in box shapes that are circumscribed by the larger Pest Presence Determiner box in the figure, is also configured in the most preferred embodiments to analyzes the data from a plurality of sensor stations and determine the existence of one or more pest in a single sensor trap station or one or more pest in a plurality of sensor station trap.

Identifying module 914-4 may use some of the parameters and algorithms described for Action initiating module 914-5, and may be a module for identifying the type of a pest, whether it be a rat, a bird, a raccoon, a cockroach or some other identifiable pest. In some embodiments, as described in this specification, the identifying module may perform analysis similar to the analyzing module 914-3; in other embodiments the identifying module 914-4 may apply algorithms to the results of the data analysis from analyzing module 914-4 and make a pest identification, and in some instances record the pest identification to a data storage device, based on one or more data points from one or more sensor stations which geographically near a pest, such as within the range of 0.001 inches to 100 feet.

Figure 10:
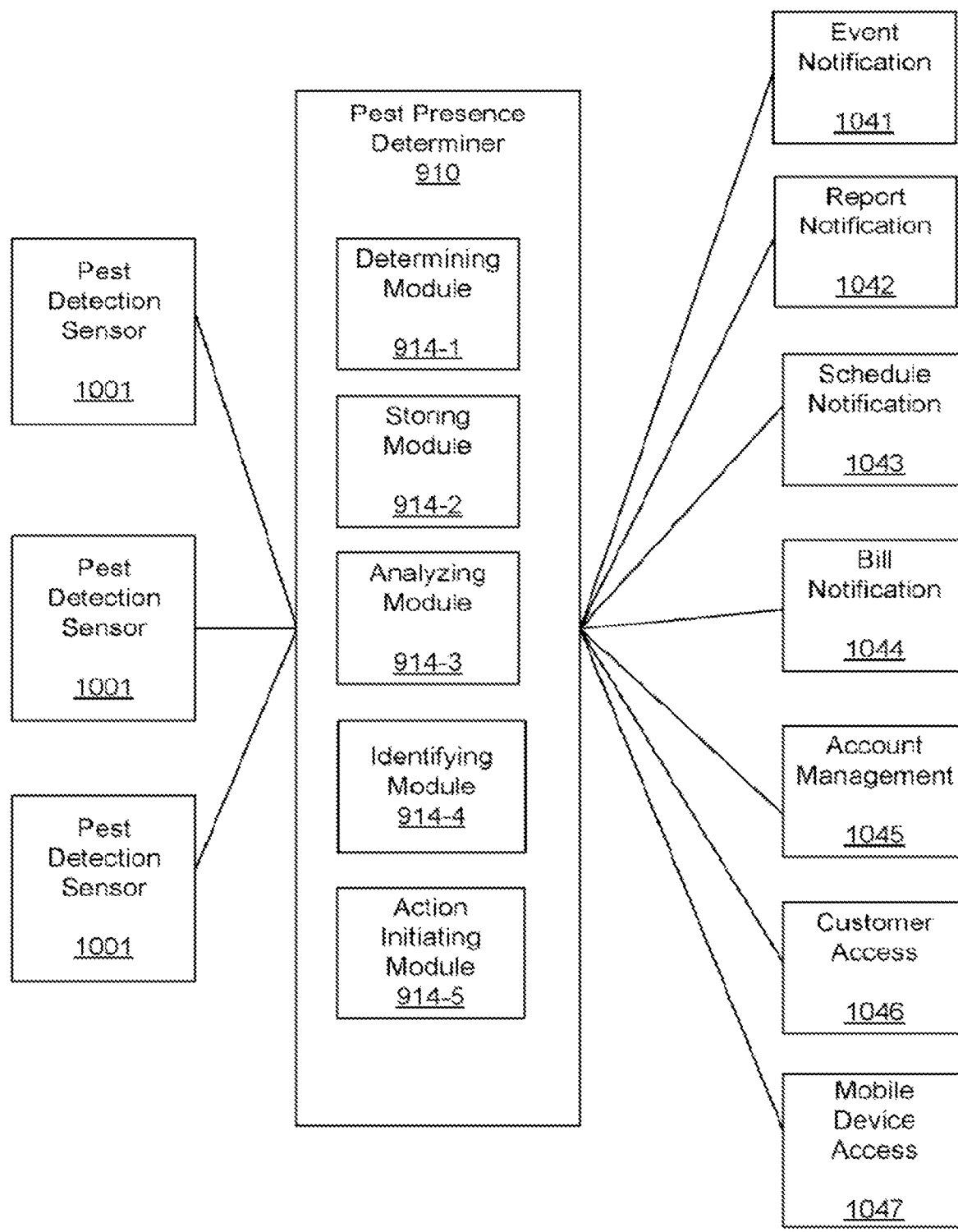
FIG. 10 illustrates the flow of information from a pest detection sensor to a user through a pest detection sensor monitor, according to one example of the principles described herein.

Action initiating module 914-5 is a module for preparing, selecting, or initiating an action, such as sending a message, sending a bill, sending a maintenance, turning off a sensor station, toggling a sensor station between dark mode and light mode, sending an emergency message, or such as the actions described in FIG. 10 as actions 1041-1047. In some embodiments an algorithm is used that takes into account the parameters and recommends or initiates a course of action based on the output that results from using the data and its parameters to process data.

Some parameters that may be used in the algorithm are: the type of sensor which has been activated, the type of pest which is predicted to have activated the sensor, the expected number of a particular type of pest which are predicted to have activated the sensor, whether the sensor has located a pest that has been captured in a trap or whether the sensor has located a pest that has not been captured in a trap, the number of times that the sensor has been activated within a configurable time period, whether the sensor is located in a specific, critical location, which zone or route the sensor is located in, the number of other sensors in the same zone or route which have been activated by a pest, the amount of time since a customer representative has checked the station, whether a certain threshold number has been reached for which the sensors belonging to the same category have also been activated, whether a series of sensors have been activated which verifies the presence of the pest inside a trap (such as a motion sensor has been activated as well as a corresponding thermal sensor or a camera sensor which is located within a distance range, such as between 6 inches and 5 feet, have also been activated), whether a certain type of pest has been captured by a trap as verified by sending video data to a pest recognition module and receiving identification of the pest or identification of the category to which the pest belongs from the pest recognition module, and the confidence level for which the which has also sent the data to a "facial" recognition module (or other form recognition) and has received verification that a raccoon has been identified by the facial recognition module, or a confidence level for the pest identification value which has been generated by a pest identification module.

The algorithm may then use some or all of the parameters, such as in some settings, a user may configure the system to send an alert to the customer when a particular type of pest has activated the sensor, such as a raccoon. In other embodiments, the customer may configure the settings such that the system will only send an alert if a certain type of pest has been detected (such as a mammal that is not a rat) inside a trap. In other embodiments, the algorithm is such that a certain threshold of pests must be detected, such as three different pests of any type have been detected inside a trap with in a zone. In other embodiments, the parameters may be configured by the customer or an administrator such that if a certain type of pest has been detected in a critical location, then an alert is immediately sent to a customer representative. In other embodiments, the alert module may be configured such that a particular sensor must be activated a certain number of times, such as three times, within a predefined time interval, such as 8 minutes, and the manner in which the sensor or groups of sensors have been activated is correlated with a confidence level of 75% and above that the pest is a mammal such as a rat or raccoon. In some embodiments, multiple sensors are located in a single trap and some traps are designed to kill the pest such that a sensor may be activated or a group of sensors may be activated which signals that a pest that is of a certain category has been captured by the trap and also likely killed by the trap. In some embodiments, these type of scenarios may be configured by an administrator a customer such that this scenario immediately sends an alert or sends an alert after a certain period of time or sends an alert to a customer representative that is within a certain vicinity of the trap, or if this scenario has been detected as well as a similar scenario in a nearby vicinity.

Analyzing module 914-3 may use some of the parameters and algorithms described for Action initiating module 914-5, and may compare data acquired by one or more sensor stations to predetermined data that is indicative of false positives. In some embodiments, as described in this specification, the analyzing module 914-3 may perform analysis on data from a number of sensor stations, may compare the data for analysis to predetermined thresholds, known sets of data patterns, or historical data and make a pest identification. Some factors that may be considered by the identifying module include the number of activations by a single sensor station within a predetermined interval, such as two activations of a motion detector within an eight second interval, and a pattern of data representing activation of a plurality of sensors that are geographically near each other.

Determining module 914-1 may use some of the parameters and algorithms described for Action initiating module 914-5, and may be a module for determining the presence of one or more pests based on the analysis of the data from a number of sensor stations and may compare data or collated data to thresholds, standards, or predetermined data sets. Determining module 914-1 may have programmed code, which may be configurable, or mechanisms for determining when a data set from a sensor station most likely indicates a false positive or indicates that the number of sensor station may be producing sub-optimal data to a potential need for sensor station maintenance.

Storing module 914-2 is a module for storing data that may be used by modules of the computing device of FIG. 9; various types of data may be stored via the storing module; nonlimiting examples of data that may be stored via storing module 914-2 include raw data from sensor stations, processed data from sensor stations, data received from a sensor station hub, collated data from a plurality of sensor stations, program code for comparing collected data from thresholds or ranges associated with a specific type of pest such as cockroach, rat, or raccoon.

In general, the communication between devices associated with the computing device of FIG. 9 will be data associated with the tracking of sensor station data that may indicate the presence of a number of pests.

Referring to FIG. 10 is a diagram depicting a plurality of sensor stations (located in the left column) which are communicatively connected to Pest Presence Determiner 910. One may refer to FIG. 9 and the description for FIG. 9 for a description of some embodiments of Pest Presence Determiner 910. In some embodiments, Pest Presence Determiner 910 is configured to also determine the type of a number of tests that have been determined to be occupying or temporarily residing in a trap that is associated with a number of sensor station.

The various modules that have been described, as well as the figures depicting screenshots of a computer-based system for providing information, receiving information from users, or performing analysis, may be used to perform the actions which are initiated by action initiating module 914-5. Based on the decisions made by the identifying module 914-4 as well as the action initiating module 914-5, the Pest Presence Determiner 910 may initiate or perform an action, or request that a separate module perform an action, such as an event notification 1041 which may be performed by an event notification module, which may include sending a text message, an in-app message, a phone call, a message within the pest control system, or other notification to a technician, a customer, a manager, or other interested party. Report notification 1042, which may be performed by a report notification module, and entail a report or summary of action which have been performed, data from data sensors, notification logs, or other information that is provided by the pest control system. Schedule notification 1043, which may be performed by a schedule notification module, and may entail providing information about a schedule for a technician, such as a map showing which locations need to be visited and also a detailed map showing information, which may include photographs of sensor station and their location, about the location of traps and sensor stations. Bill notification 1044, which may be performed by a bill notification module, and may entail information about a bill for a customer, and also may include custom billing information based on the usage of sensor stations, which may be determined by the number of activations of sensor modules in sensor stations which have been recorded or the number of activations which have not been recorded, which may be effectively paying for the volume of pests which have been caught by traps or detected by sensor stations on customer property. Account management 1045, which may be performed by an account management module, and entail updating account information for a customer so that a customer can access the account information or an account representative can access updated account information. Customer access 1046, which may be performed by a customer access module, and may entail providing access to a customer to the pest control system so that the customer can view the status of billing, sensor stations on customer property, work orders, technician progress at visiting the customer's traps, etc. Mobile device access 1047, which may be performed by a mobile device access module, may entail sending information in a format that is useable by a data server in communication with a smartphone app. Smartphone apps and portable devices may run software using modules which may allow for technicians or customers to interact of communicate with wires or wirelessly with the pest control system, sensor stations, sensor station hubs, or other components described herein.

Figure 11:
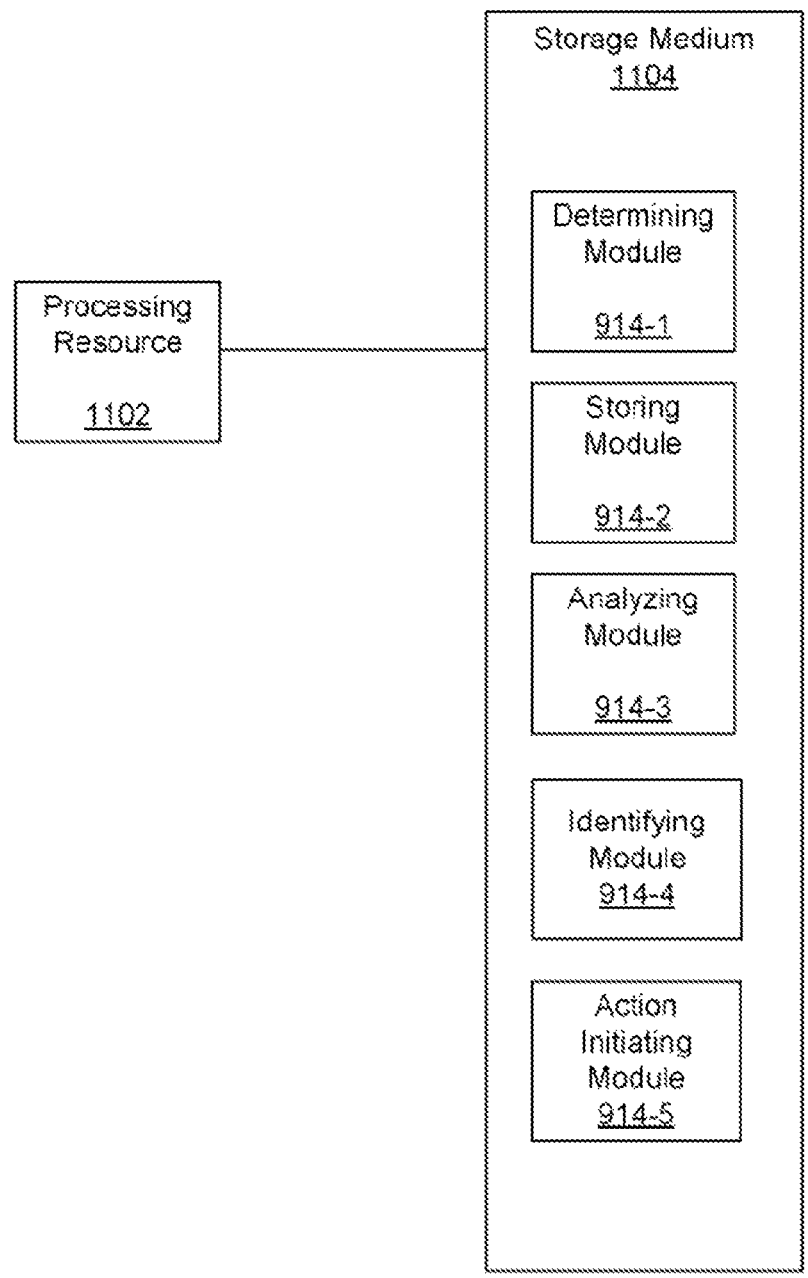
FIG. 11 illustrates a computer program product for a pest detection sensor monitor, according to one example of the principles described herein.

FIG. 11 depicts a processing resource 1102 accessing a storage medium, such as a USB drive, an external hard drive, a DVD, a CD, a storage medium connected to a device that is streaming data over the internet, or other storage medium which contains programmed instructions, described in FIG. 9, for a determine module 914-1, a storing module 914-2, an analyzing module 914-3, an identifying module 914-4, and an action initiating module 914-5. It is important to note that while the present invention has been (and will continue to be) described in the context of a fully functional computer system with certain application software, those skilled in the art will appreciate that the various software mechanisms of the present invention are capable of being distributed as a program product in conjunction with an article of manufacture comprising software stored on a computer readable storage medium in a variety of forms, and that the various preferred embodiments of tile present invention applies equally regardless of the particular type or storage medium used to actually carry out the distribution. Examples of computer readable storage media include: non-transitory recordable type media such as DVD and CD ROMS disks (e.g., disk 290), and transmission type media such as digital and analog communication links, including wireless communication links.

Figure 12A:
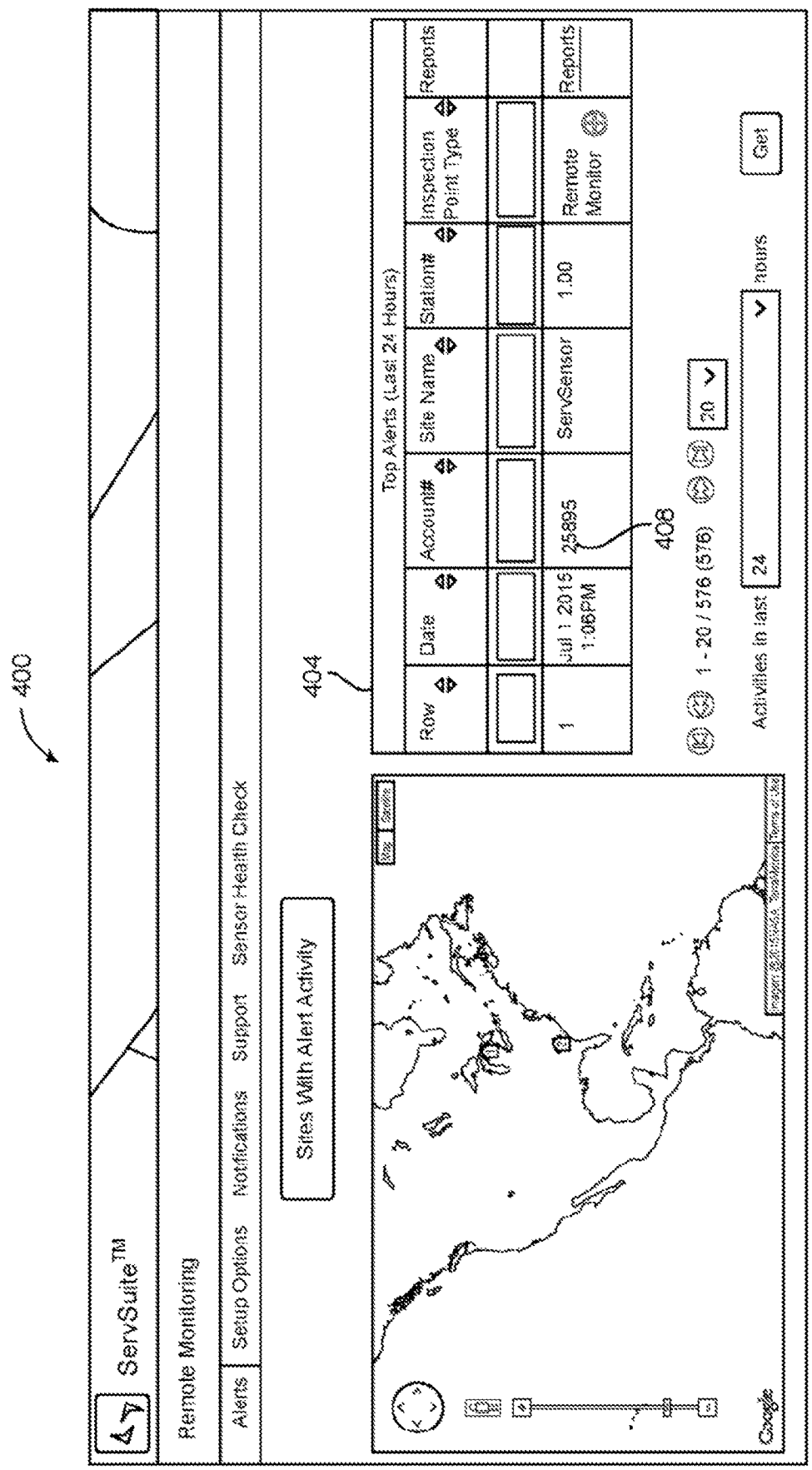
FIG. 12A shows an embodiment of the user private account interface and alerts submodule within the system.

FIG. 12 shows some of the capabilities of the user private account interface within some embodiments of pest control system. FIG. 12A depicts the "Alerts" submodule 400, which is generally the first page users view when engaging with the system. As described above, the "Top Alerts" table 404 appears in the submodule. The Account #column of the table shows the user account number 408 associated with the user's account. The account number appears as a selectable icon, which directs the user to his or her private account interface.

FIG. 12B depicts the initial page of the user private account interface 410. In the top left hand corner of the page, the user's account information is displayed 414, including client name, business name, address, and other contact information. Along the top of the interface page is a series of icons 418, all serving as dropdown menus that reveal different capabilities of the system. The icons are titled "Account," "Activity," "Accounting," "Letters/Forms," and "Close Account window." Under the icons is a table 420 showing the current account status. The account's billing information 422 is displayed, showing the current balance, as well as the historical balance. A dialog box 424 showing any account notes sits above the account debt table.

Below the account status information is a table 430 showing all of the installations associated with the account. The rows of the table are organized based on each separate installation 434 within the account. The rows list the contact information for each installation 438, including the business name, phone number, and street address. On the left side of each row is a dropdown menu titled "Site Menu" 440, which provides links to several other system capabilities.

Figure 12C:
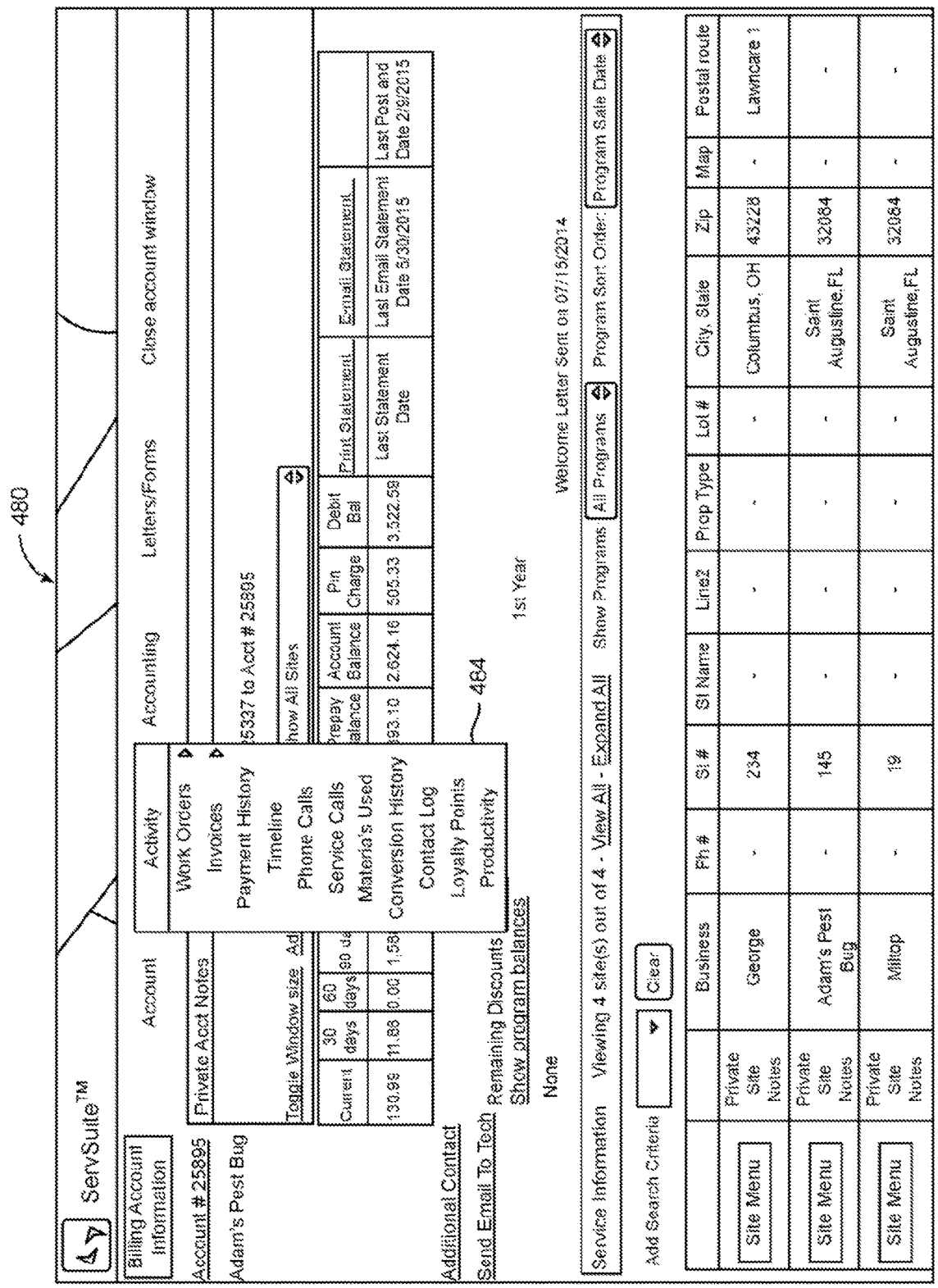
FIG. 12C shows an embodiment of the user private account interface and dropdown menu within the system.

FIG. 12C depicts a page that may be displayed to a user of the pest control system which may include a browser window 480 and a drop down menu 484.

Figure 13B:
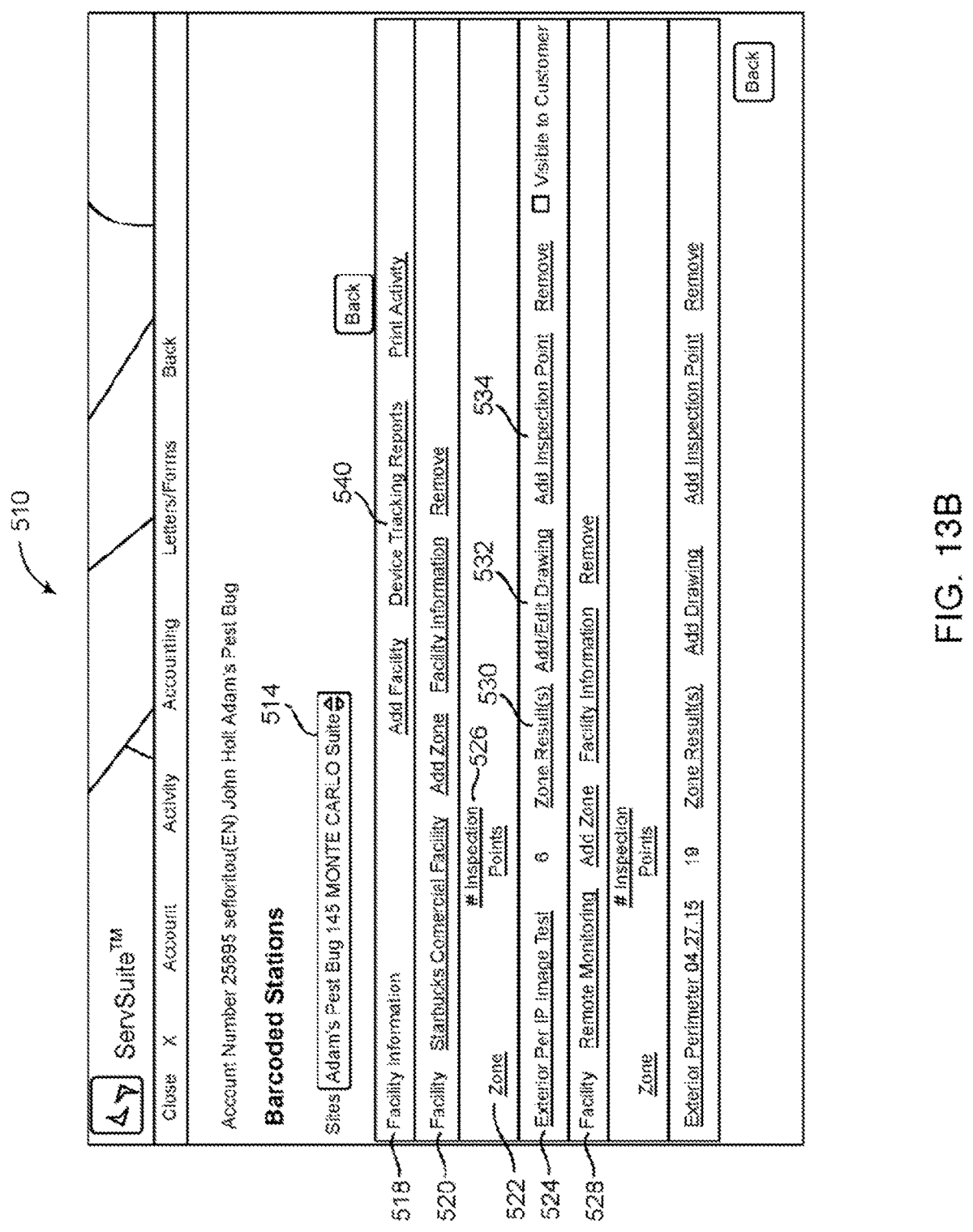

FIG. 13 depicts a method through which a user can investigate the status of all the barcoded stations associated with the user's account via the system. FIG. 13A shows the home page 500 of the private user account interface. By selecting the "Account" icon 502 on the page, a dropdown menu 505 is generated, with "Barcoded Stations" 509 being one of the menu selections. Selecting the Barcoded Stations icon directs the user to the page titled "Barcoded Stations," depicted in FIG. 13B. Within the system, a "barcoded station" can actually be any inspection point that has been assigned a database identification number. Some of the inspection points (generally sensor stations connected to a pest trapping device) may utilize barcodes as a means to allow technicians to confirm a service at the sensor stations, but not all the points will use barcodes. The system is equally effective using technology similar to bar codes, such as QR codes, or other methods, such as a button on the sensor station that is selected by the technician to signify that service has been completed.

The Barcoded Stations page 510 begins with a dropdown menu 514 where a user can select for which of the account sites it is seeking information. Once a site is selected, a table 518 is generated that shows each zone for the site, with information about each respective zone. The facility name 520 is listed at the top of the table, with each zone within the facility 522 listed below. In the figure, only one zone is depicted at 524. The table lists the number of inspection points 526 within each zone. Six inspection points 528 are present in the zone depicted. The customer can then select "Zone Result(s)" 530 to submit an entry listing the result of one or more work orders for the zone; "Add/Edit Drawing" 532 to add a graphic to associated with the zone, such as a floor plan or diagram of inspection points; or "Add Inspection Point" 534 to add an additional inspection point to the zone. Selecting "Device Tracking Reports" 540 directs the user to a menu that allows the user to select from a number of reports for the facility, including monitoring history reports or trend analysis reports. Selecting the zone name icon 522 for a certain zone directs the user to the page depicted in FIG. 13C.

Figure 13C:
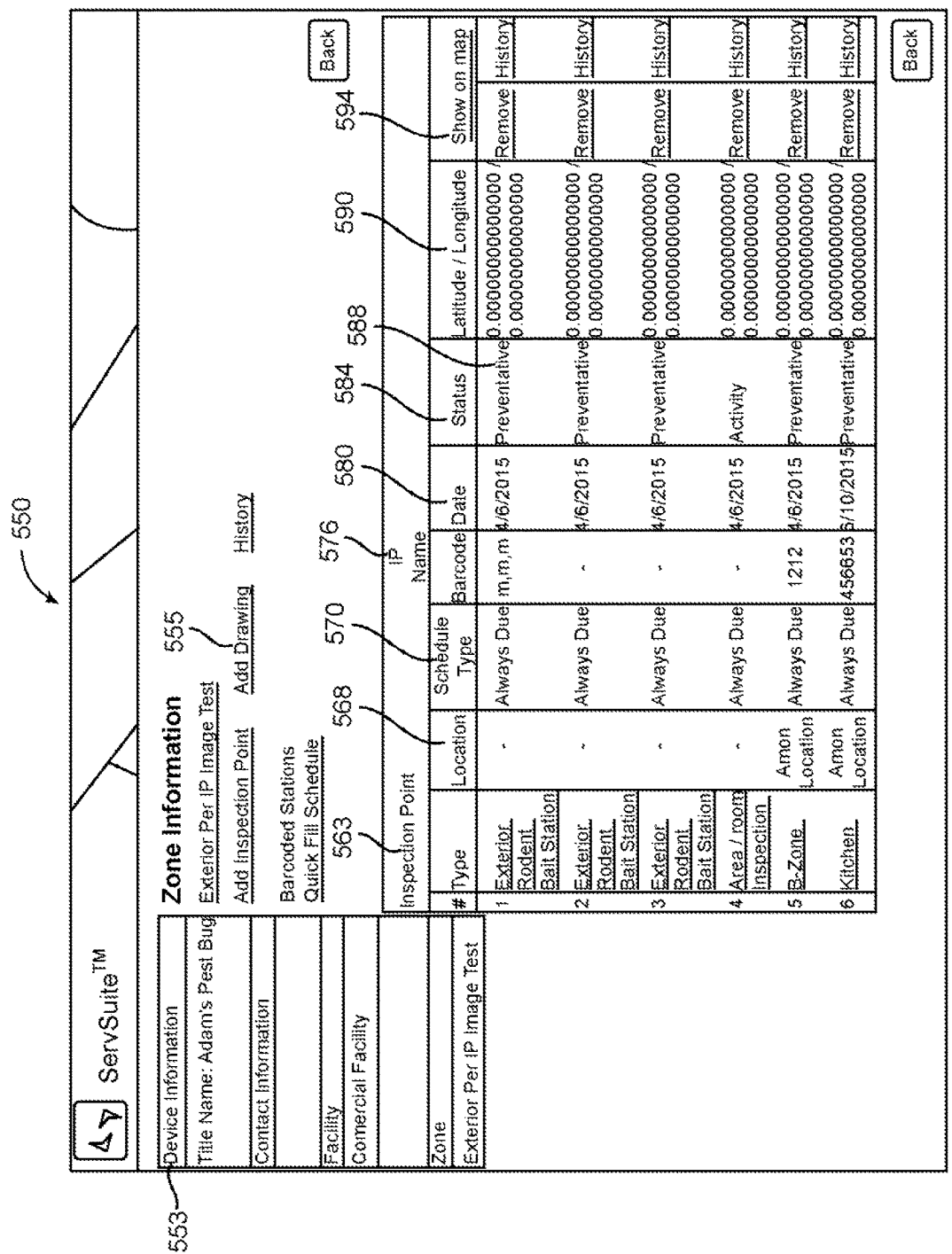
FIG. 13C shows an embodiment of a page illustrating information related to assigned zones.

FIG. 13C depicts the "Zone information" page 550. The page shows the identification information for the account 553, and allows the user to add an inspection point or drawing 555 as in the page shown in FIG. 13B. The zone information table 560 is depicted. Zone information table 560 lists each of the inspection points 563, by name of each particular inspection point 566. The table lists the location 568 of each inspection point. The schedule type 570 for each point is listed. "Schedule type" 570 represents the inspection schedule for that particular inspection point. Commonly, the schedule type 570 will be "Always Due", 572, meaning that the inspection point is to be checked by a technician during each inspection of a site. However, certain facilities may not need all points checked during each inspection, and will only inspect certain points certain times. When that is the case, the Schedule Type column for that point will list the relevant inspection schedule information for that point. Barcode number 576 for each inspection point is listed. Date 580 associated with each inspection point is listed. Generally, date 580 listed in the table will be the date of the last status change for the inspection point. Status 584 of the inspection point is shown. The possible statuses for an inspection point are: Preventative, Activity, Damaged, Replace, Service, No Activity, and Inaccessible. The exact coordinates 590 of each inspection point are listed and based on longitude and latitude. A user may also select to have all the inspection points depicted on a map by selecting "Show on map" link 594.

The system provides the user with the ability to regulate the notifications that they receive from the system. For example, users could select to only receive notifications between 6 a.m. and 9 p.m., so that they are not awoken by notifications overnight. In this situation, all pending notifications would be pushed to the user at the start of the next notification period. Additionally, a user could set a notification threshold, which would halt certain notifications for a certain period of time. This feature is useful in situations where a pest or group of pests is continually triggering a certain sensor. The user will not want to receive continuous notifications regarding the sensor, so when the notification amount passes the threshold, the system will limit notifications from that site for a selected period of time.

Figure 14A:
FIG. 14A depicts an embodiment of the Billings submodule of the system.
Figure 14B:
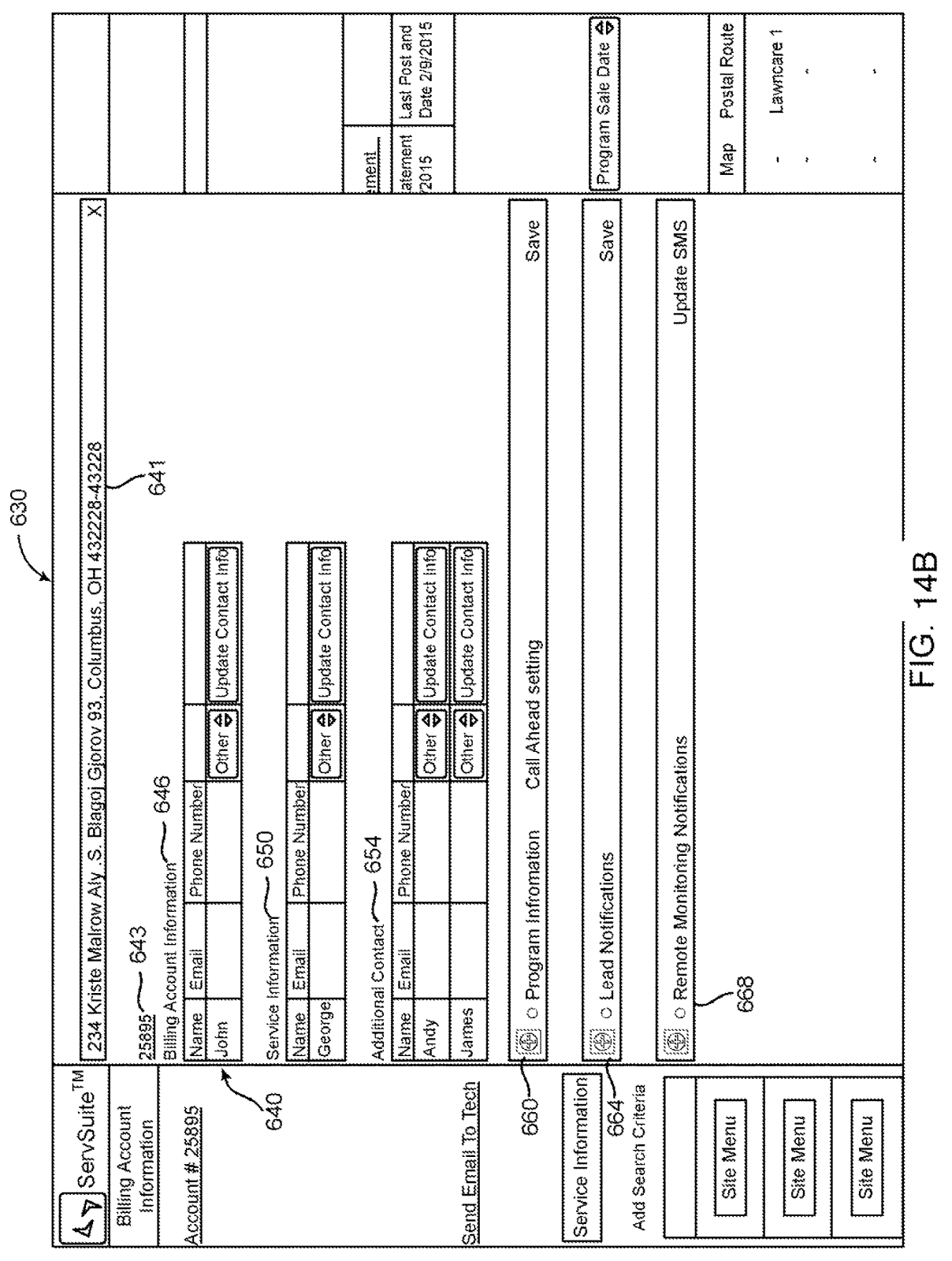
Figure 14D:
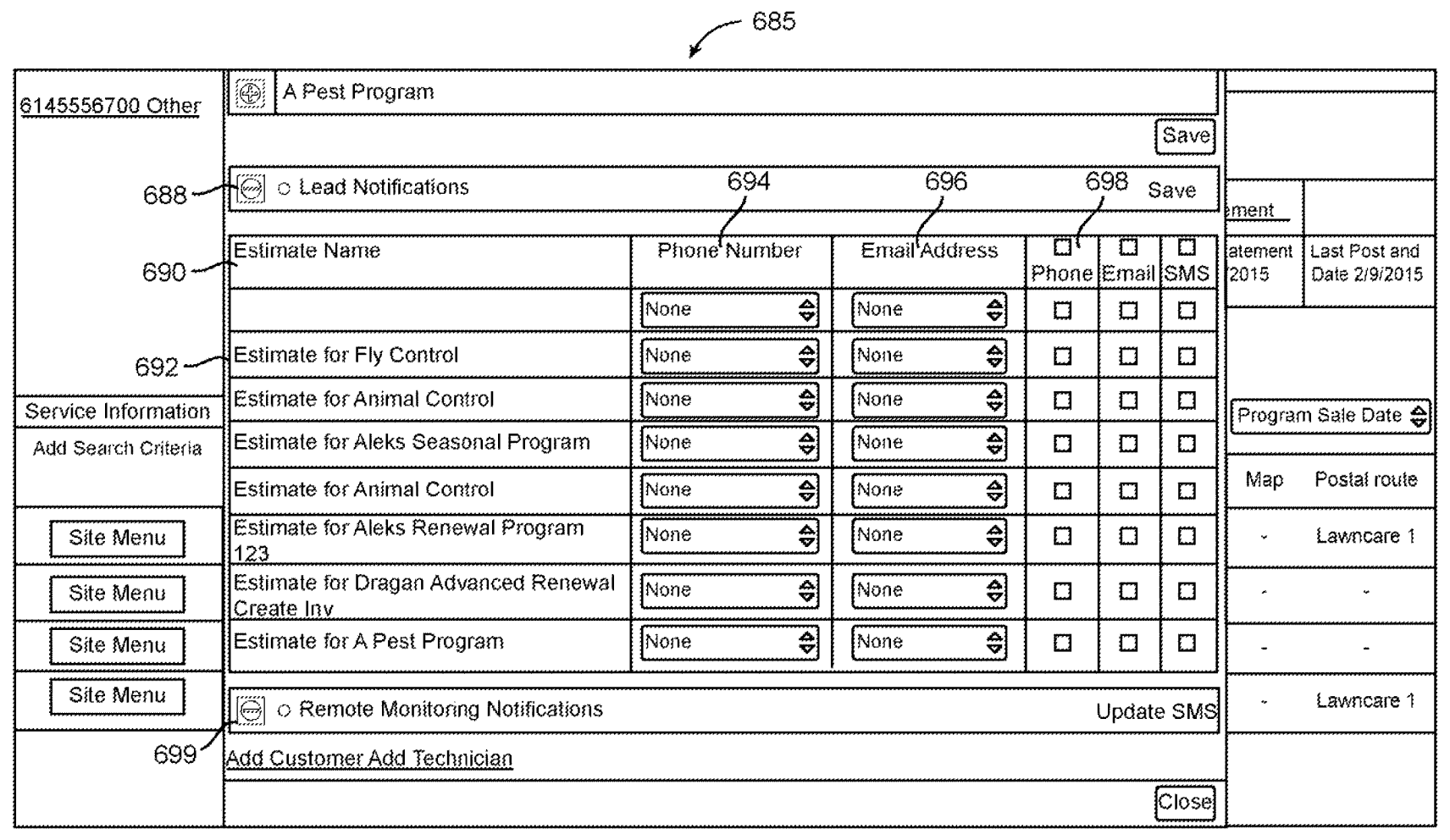

FIG. 14 depicts the Billings submodule of the system.

Figure 15A:
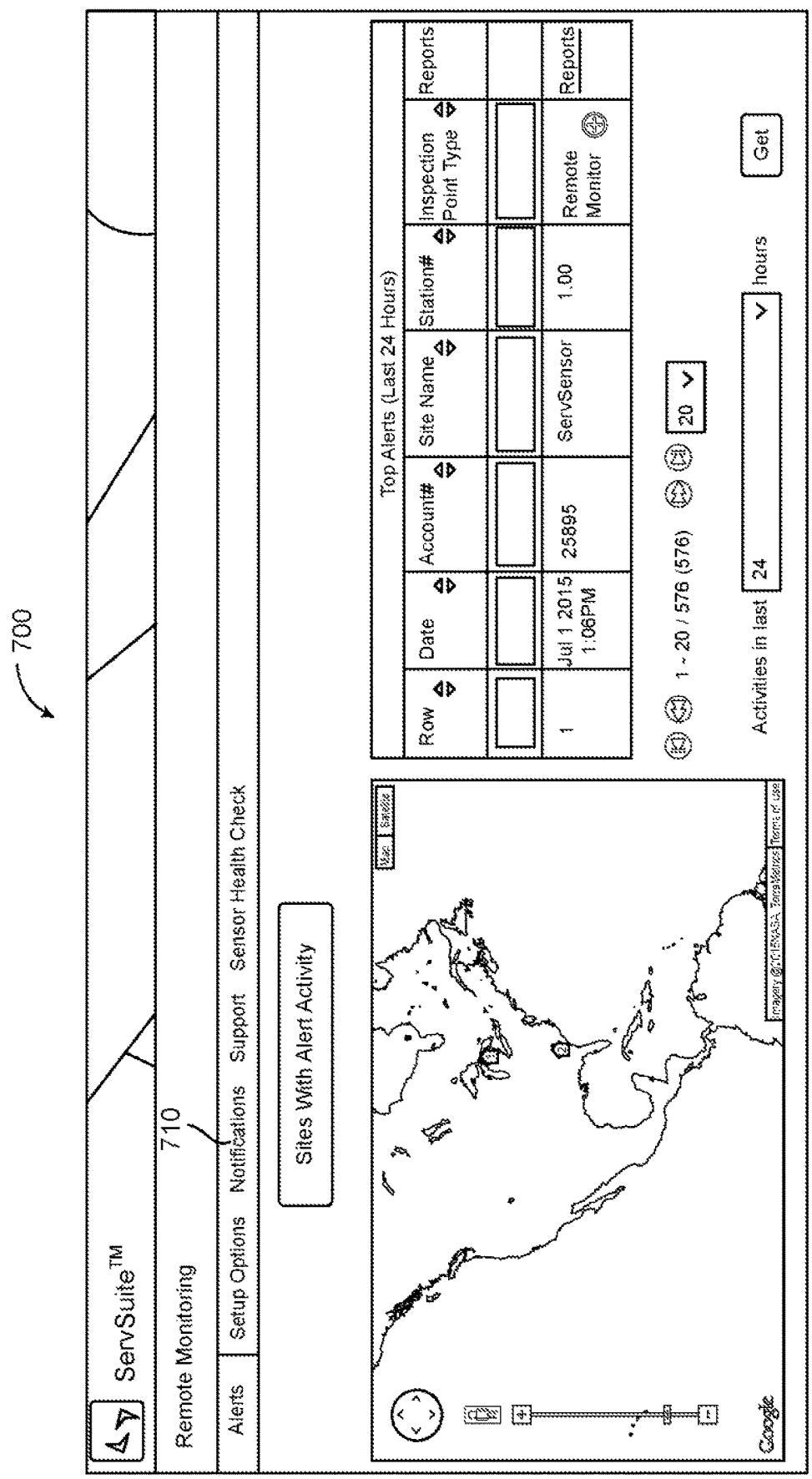
FIG. 15A depicts an embodiment of the Notifications submodule of the system.
Figure 15B:
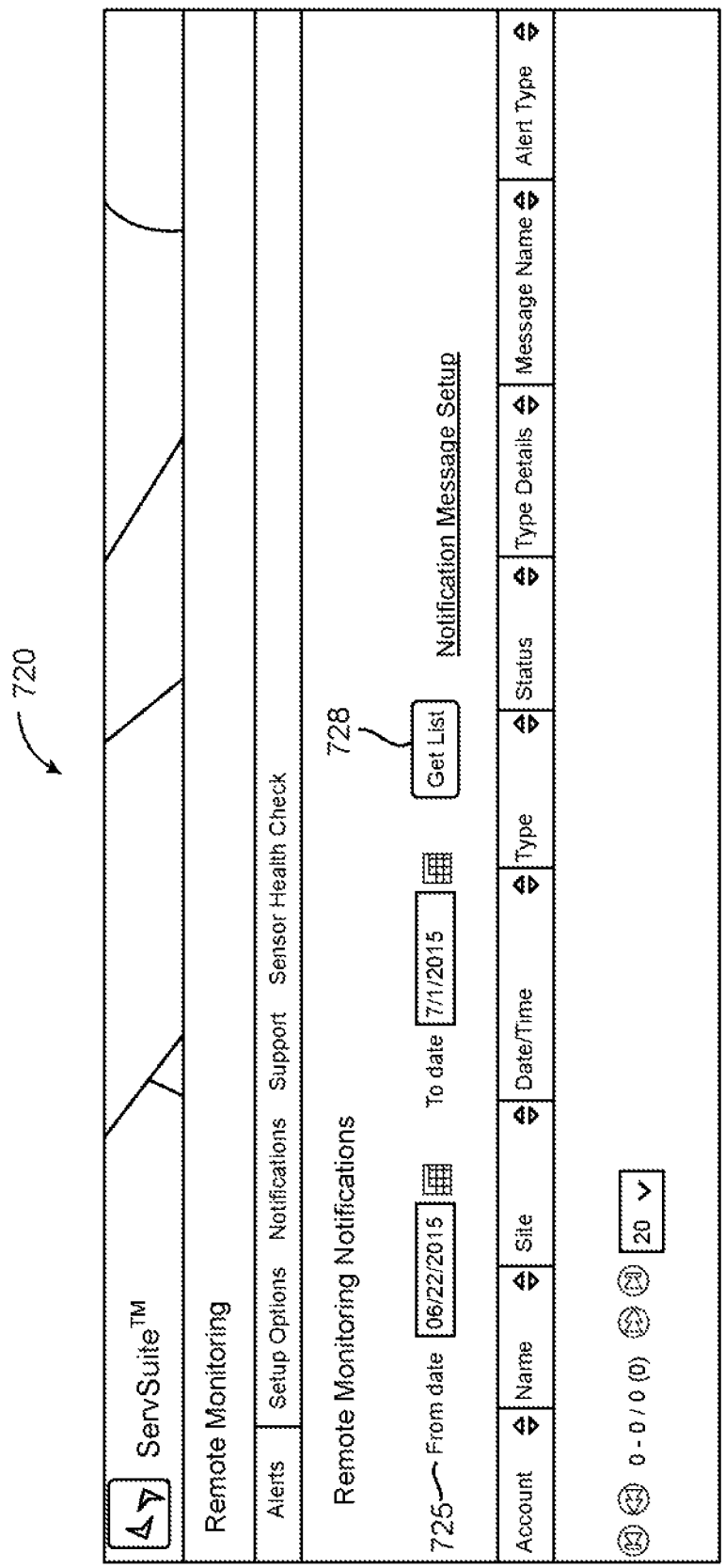
FIG. 15B depicts an embodiment of the Notifications submodule of the system.

FIG. 15 depicts the Notifications submodule of the system.

Figure 16A:
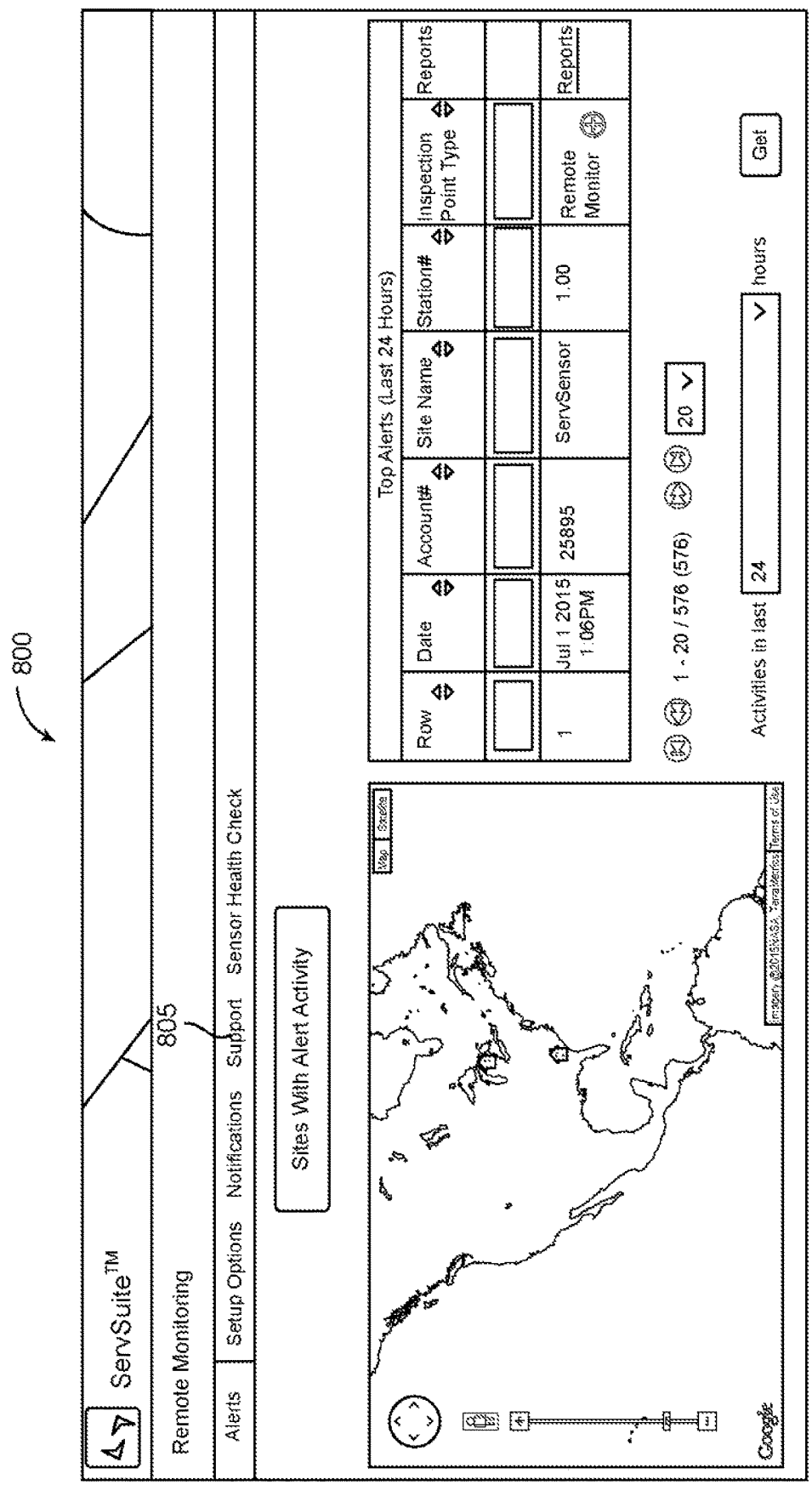
FIG. 16A depicts an embodiment of the Support submodule of the system.
Figure 16B:
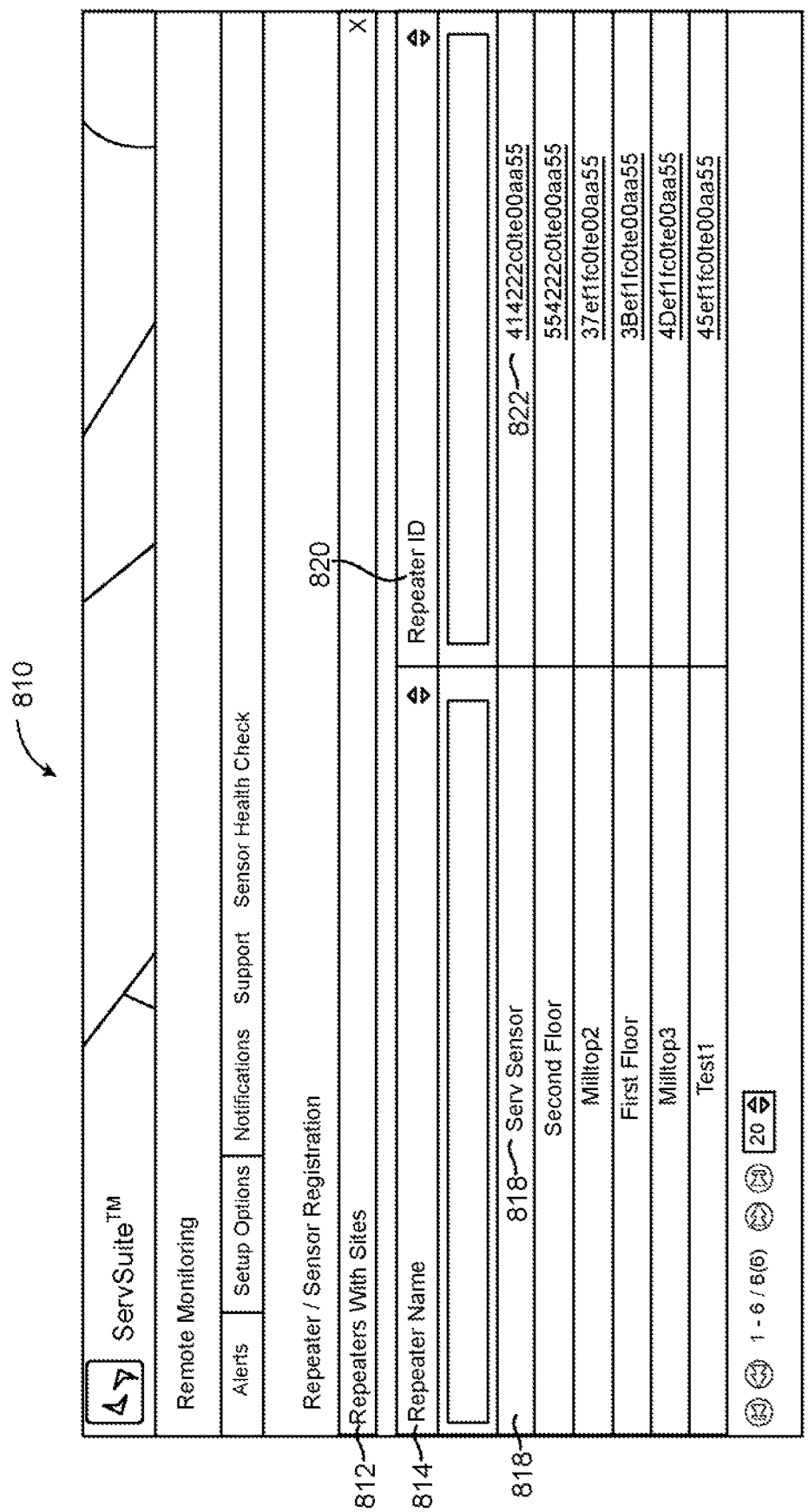
FIG. 16B depicts an embodiment of the Support submodule of the system.
Figure 16C:
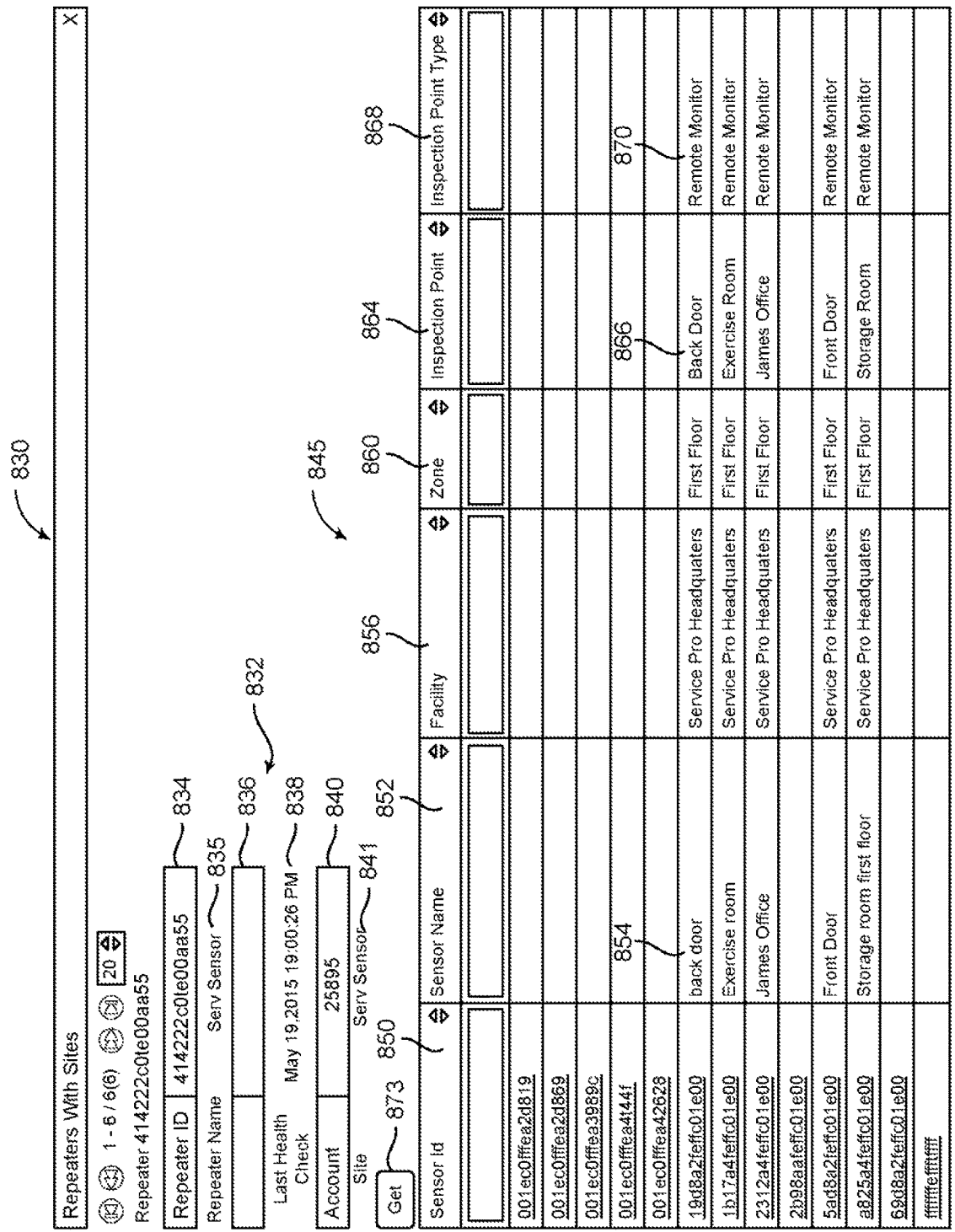
FIG. 16C depicts an embodiment of the Support submodule of the system.

FIG. 16 depicts the Support submodule of the system.

A more detailed description of FIG. 14-16 is available in U.S. Provisional Application Ser. No. 62/170,365, filed Jun. 3, 2015, and U.S. Provisional Application Ser. No. 62/193, 405, filed Jul. 16, 2015.

Figure 17A:
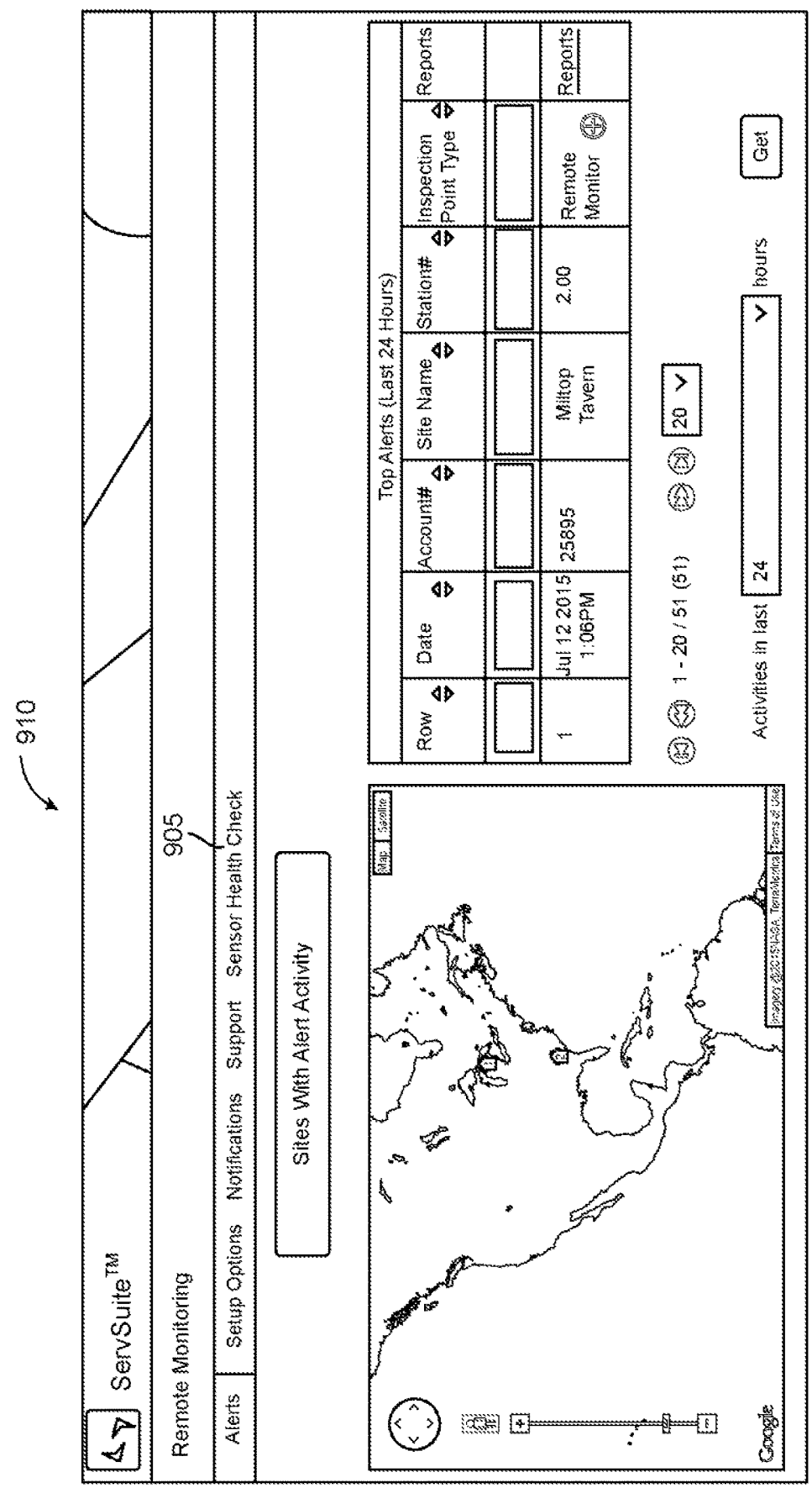
FIG. 17A depicts an embodiment of the "Sensor Health Check" submodule of the system.
Figure 17B:
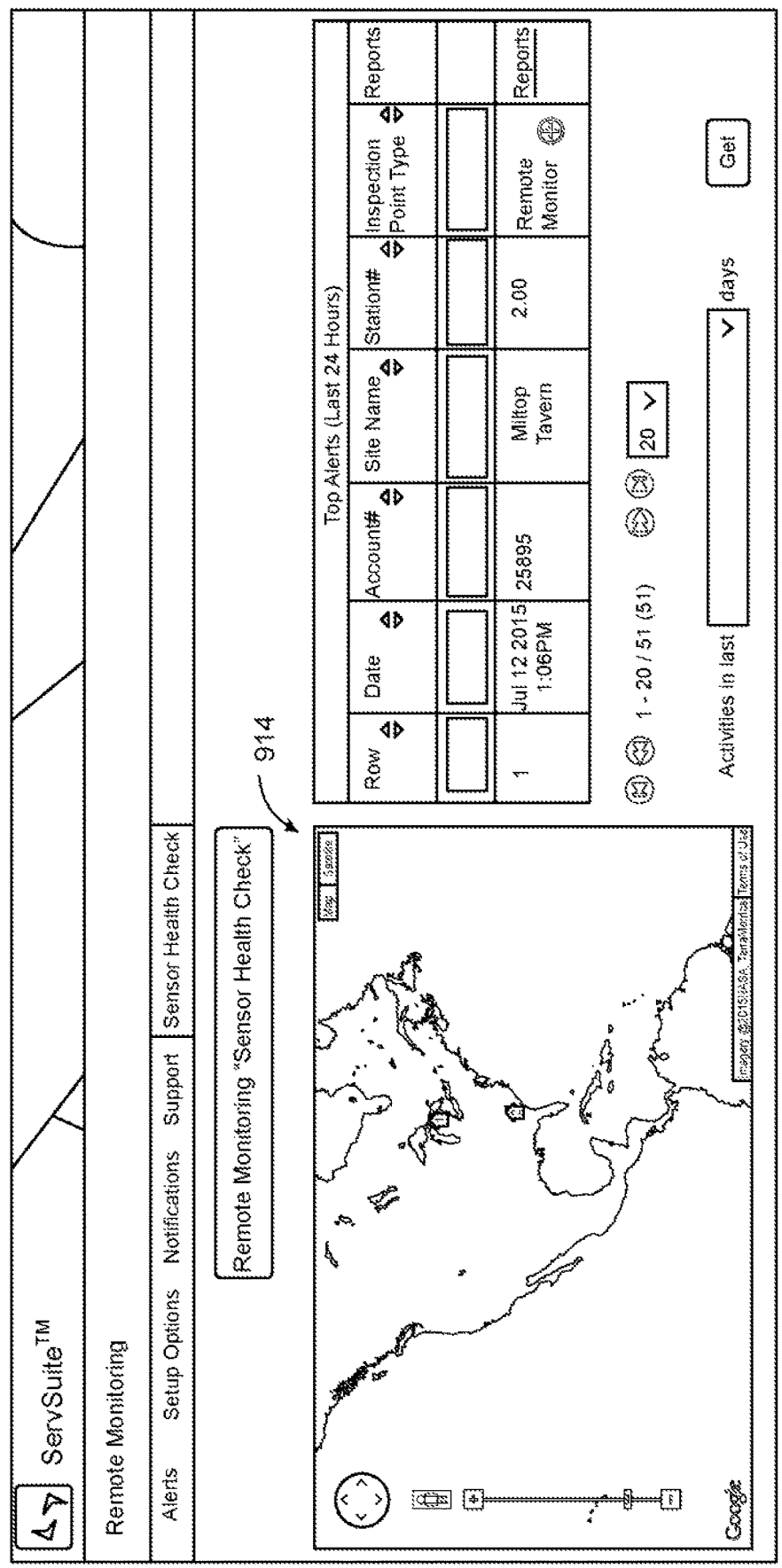
FIG. 17B depicts an embodiment of the "Sensor Health Check" submodule of the system.

FIG. 17 depicts the "Sensor Health Check" submodule of the system. The submodule can be accessed from the initial page of the Remote Monitoring module, as shown in FIG. 17A. From the first page 900, the user selects the "Sensor Health Check" icon 905 to be directed to the module, shown in FIG. 17B. Once the module has been initiated 910, the page shows a map 914 similar to that shown in the Alerts submodule. The map shows all locations for which a remote monitoring sensor health check is available. Selecting one of the available map icons 918 directs the user to a page showing information regarding the sensor zone.

Figure 17C:
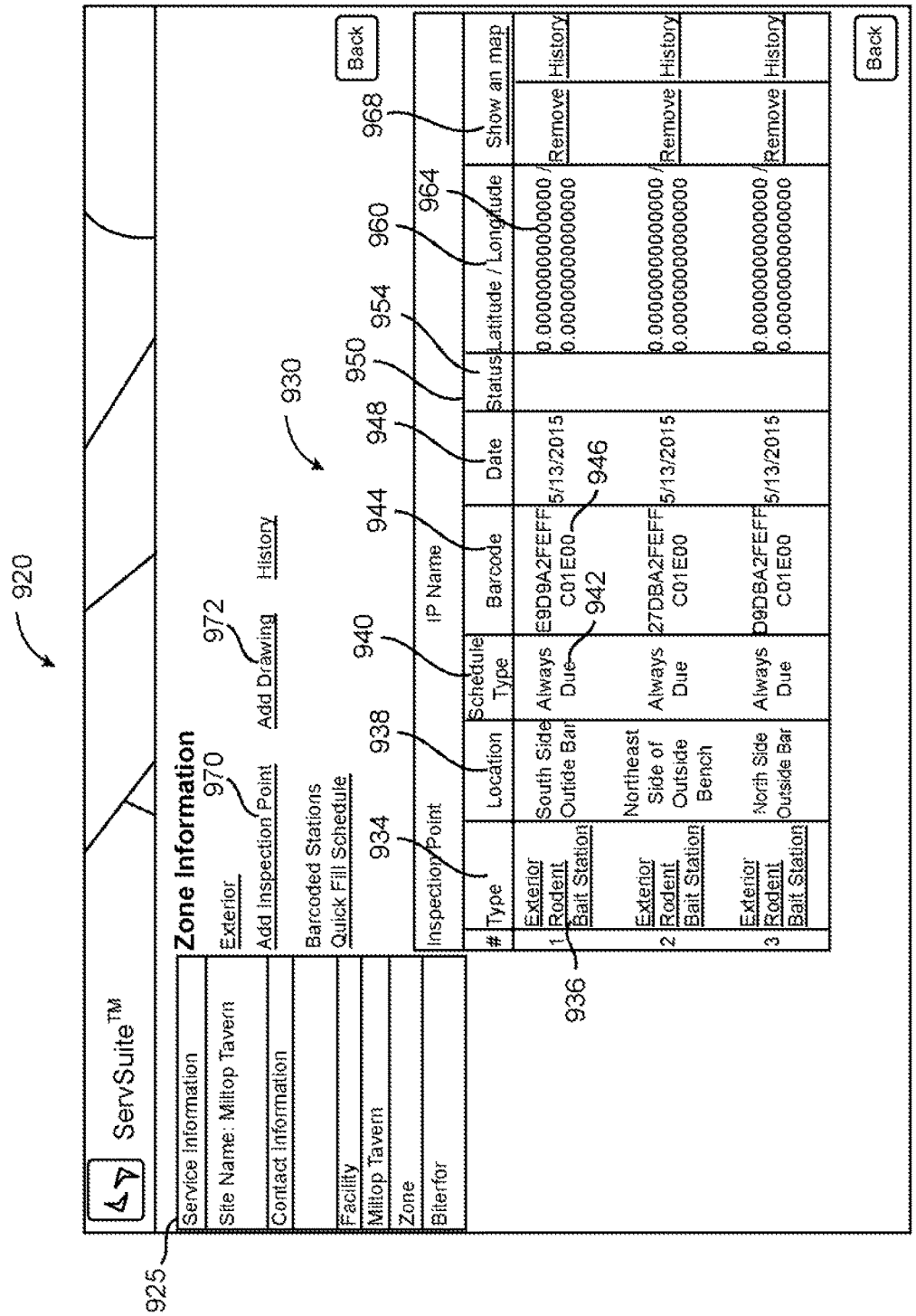
FIG. 17C depicts an embodiment of the "Sensor Health Check" submodule of the system.

Selection of an installation on the Sensor Health Check map directs the user to a Zone Information page 920, shown in FIG. 17C. This page is similar to the page shown in FIG. 13C. The top left corner of the page contains a table 925 showing installation and sensor station site information. The main body of the page shows a table 930 listing information on all the inspection points within the zone. The first column lists the type of inspection point 934, type 936 of station such as whether it is a bait station, or another type of station. The table next lists the location 938 of each of the sensor stations. The Schedule Type column 940 shows the inspection schedule information 942 for the point. The Barcode column 944 lists the typographical code 946 associated with each of the bar codes contained on the sensor stations. The table next lists the date 948 on which each of the stations last updated their status. The next column 960 shows the exact coordinates 964 for each of the sensor stations, based on latitude and longitude, as measured by a global positioning system. The user may view all the sensor points on a map by selecting the "Show on map" icon 968. As described in FIG. 13, the user may also add inspection points 970, or add drawings associated with the zone 972 through icons on the Zone Information page.

Figure 18:
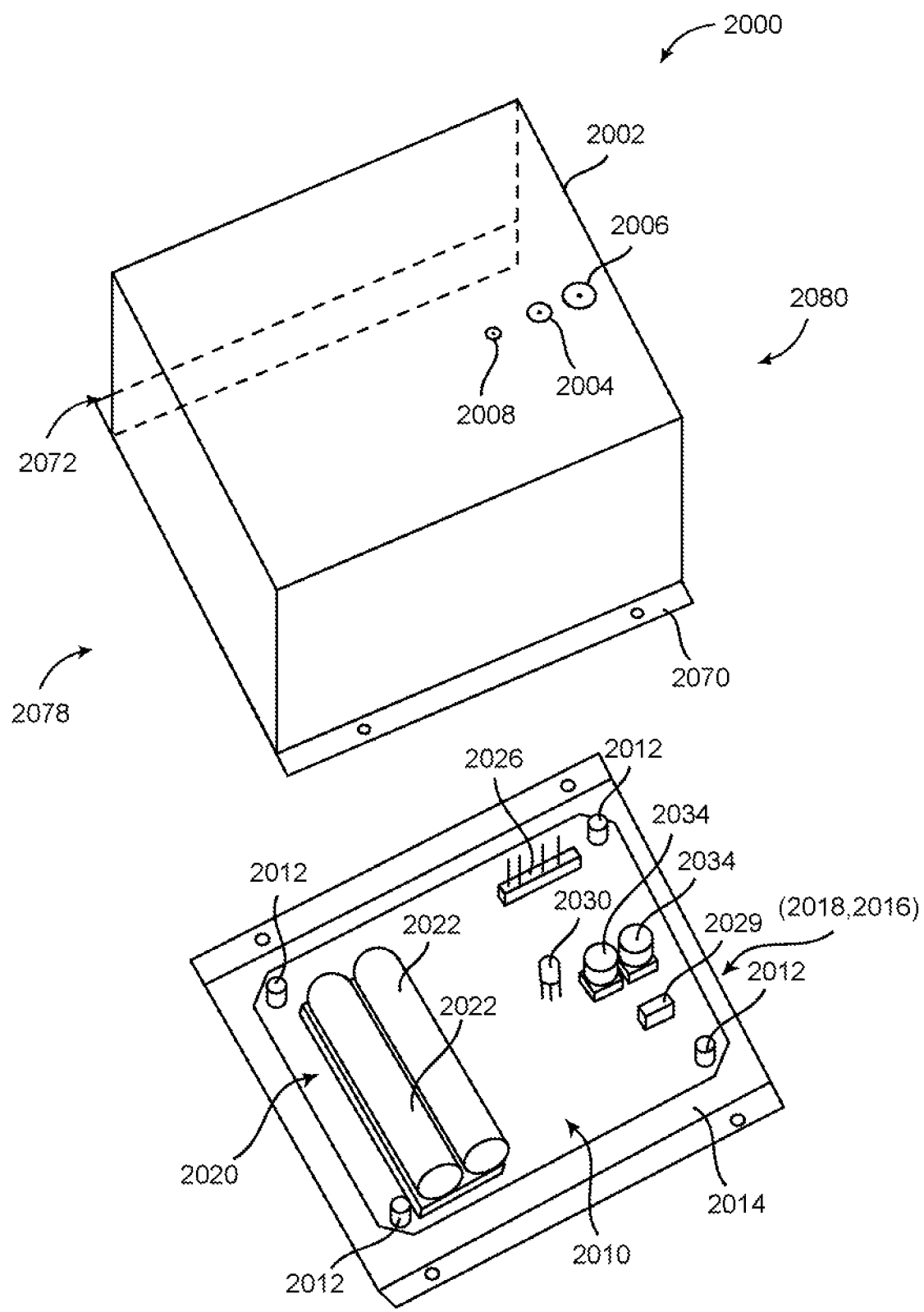
FIG. 18 shows an alternative embodiment of a sensor station.

FIG. 18 shows an exploded perspective view of the exterior of an embodiment of a sensor station 2000 as provided. In the preferred embodiments the exterior case 2002 is typically formed of plastic, metal, or machined metal for instance. The exterior case contains and protects the electronic components of the sensor station, and may be waterproof, and be constructed from a material that resists or prevents the entry of liquids even upon submersion into a liquid. Control switch port openings 2004, 2006, on the upper surface of the case allow access to control switches 2034, 2036, useful for low-level programming and activation of the sensor station controls. Status indicator port 2008 provides access to one or more status indicators, such as an LED, non-LED lightbulb, laser, or sound emitting device. An embodiment of one of the status indicators is shown at 2030. In some embodiments the sensor station may include one or more processors and one or more memory storage devices. In some embodiments, one or more status indicator LEDs 2030 may be communicatively connected via one or more communication mechanisms to a computer that may be a) a computer with memory storage and be configured to directly communicate with another computer or a repeater; b) a circuit board; c) or a computer that has memory storage and capability of indirectly communicating with another computer or a repeater. In the preferred embodiments, the one or more communication mechanisms, such as wires or cables, which communicatively connect the one or more status indicators include at least one communication mechanism that communicatively connects the status indicator with the computer so that the status indicator may send signals to the computer and at least one communication mechanism that communicatively connects the computer with the status indicator so that the computer may send signals to the computer. In some embodiments, the communication mechanism connecting the status indicator with the computer associated with the status indicator is configured to allow two-way communication between the sensor indicator and the computer associated with the status indicator.

Sensor stations as shown by way of example in FIG. 18 can be configured in a great variety of formats. It should be recognized that the data and customer management system disclosed herein relies on the communication between the control system shown in FIG. 3 and one or more sensor stations, such as that shown in FIG. 18.

Control board 2010 supports electronic operating components of the sensor station, and is preferably embodied as a printed circuit board for said components. Standoffs 2012 allow for fastening the control board to the case 2002 and to cover plate 2014. The board, and cover plate can be secured by fasteners or adhesives to the upper exterior case 2002. In a preferred embodiment, the cover plate 2012 is formed of metal, and can serve as an accessory heat sink for components attached to it. Hidden from view in FIG. 18 is the underside of control board 2010, where a port, 2016, in the cover plate is aligned with the input/output of a motion detector 2018.

Revealed on the top surface of control board 2010 is battery holder 2020 and batteries 2022. A programming connector, such as a connection plug at 2026, can be provided if wireless programming is not solely relied upon. Likewise, other connections can be made, such as by way of a communication connector 2029. Protruding from the board are a pair of push-button switches, 2034 and 2036, and a status lamp, 2030, such as an LED lamp, with the components 2030-2036 configured to align with complementary ports or windows in upper case 2002, shown as ports 2004-2008 in FIG. 18.

In a preferred embodiment, sensor stations are in communication with the system administrative control by way of a wireless connection, such as a WiFi connection, or a wired Ethernet connection, for instance. The communicative connection may be used to transmit information gathered by sensor stations. Information gathered by sensor stations includes such environmental information as ambient temperature, temperature extremes, relative humidity, light levels, and the like. Importantly, when the sensor stations are configured in conjunction with a baiting station, the sensor stations can provide data as to the type and frequency of visits by a range of pests. Information gathered by sensor stations relating to pest activity, for instance, include information from motion detectors, photographic detectors, video detectors, infrared, or body temperature detectors, and other indicators of pest presence.

Sensor stations can be configured with additional sensor types as the situation may warrant. One type of additional sensor is a camera for photography or videography. Such a camera can be linked to a pest recognition algorithm to register the type of pest that has triggered the sensor station. In particular, mammalian pests, such as rodents will provide a different heat signature than poikilothermic animals such as insects.

The following section will describe how a sensor station responds when a trap may be occupied as well as how the system may respond when a trap may be occupied. A pest may be lured into a baiting station, or alternatively a trap. In a preferred embodiment, as described herein, the sensor station is attached to a baiting station, forming a sensor-baiting station, or the sensor station may be physically integrated with the baiting station such that the sensor station and the baiting station form a sensor-baiting station. In the alternative, a sensor station may be attached or integrated with a trap, to form a sensor-trap station.

Those skilled in the art recognize that a baiting station is typically configured to lure a pest to the station, and provide an attractive edible poison. The pest may depart the baiting station and die at some distance away. Alternatively, a baiting station may simply allow monitoring of the presence of a pest, by detecting visits to the station, by consumption of bait, or when used in conjunction with the sensor station herein described, by detection.

In the pest control field, traps are typically configured to attract entry of a target pest, and then detain or destroy the pest following entry. By way of analogy, the proverbial cheese can serve as bait for a mouse. A sensor-baiting station is preferably embodied to monitor the approach of the target pest, a mouse, and then respond as herein described. The same proverbial cheese, or other bait, such as peanut butter, can be used in a sensor-trap station as described in the application, and then monitor when a target mouse pest triggers the trap or disturbs the bait requiring service.

A pest may be lured into a baiting station, to which a sensor station is attached or to a location in relatively close proximity to a sensor station. When the sensor station detects the pest, the sensor station in the most preferred embodiments will store data, from the sensor module of the sensor station, in the sensor station, a sensor station hub, or a pest detector monitor. Data may indicate the number of activations of a sensor during a certain interval, the intensity of the activation, the relative location of the suspected pest or other types of data useful for determining that a trap is occupied by a pest.

In some embodiments, the sensor station directly or indirectly sends the data to the pest detection monitor 110 immediately upon receiving the data indicates the presence of a pest or after a predetermined interval, such as a time interval or a count interval. In other embodiments, the pest detection monitor polls the sensor station at a configurable threshold, which may be a certain date or time, a predetermined time interval, or a predetermined count interval.

In some embodiments, the data from the sensor station is directly sent to the pest detection monitor; in other embodiments the sensor station sends the data to a repeater, a baiting station, or a station data hub which then sends the data individually or in combination with data from other sensor stations to the pest detection monitor. In some embodiments, the repeater, sensor station hub, or other device may have entered a power saving mode, such as a sleep mode, an off mode, a hibernation mode, or a hybrid mode, to save battery power or conserve energy and then at a certain threshold the repeater, sensor station hub, or other device which has received data from a sensor station will be activated into an active mode and transmit the data directly or indirectly via a communicative link to the pest detection monitor. When the pest detection monitor receives the data, it may then transmit the information to a sensor interface module 132. In other embodiments the pest detection monitor stores or processes the data; in other embodiments the sensor interface module may store or process the data. In some embodiments the sensor station hub or the pest detection monitor may send a request to the sensor station requesting additional data or for the sensor station to resend the data.

When a certain threshold has been met, then the pest detection monitors sends a notification or request that a notification be sent by a communication module to a technician or manager of a technician. In some embodiments the pest detection module may use the data to update the sensor interface module and the sensor interface module may then display the updated data to a user via a computer-based application.

In some embodiments, thresholds are used to avoid overwhelming a technician with false alarms or to increase the efficiency so that technicians are able to check a plurality of traps that are in the same vicinity. As stated in this disclosure, sensor stations may be paired with a location, and that location may then be stored and presented to a technician via an application that receives information from a pest section detector. In some embodiments the user may then view a visual map that shows where the sensor station that is occupied or is suspected of being occupied is located at a site. Various thresholds may be that a certain type of data needs to be collected for a specific sensor station trap, such as a rat-like object or rat having activated a motion sensor at least 3 times during a ten minute period. Any examples given here are only exemplary and are suggestive of other types of intervals or thresholds that may be implemented.

In some embodiments the sensor station, the sensor station hub, or the pest detection monitor may use an algorithm to estimate the type of pest which has been caught, such as using data from a weight sensor or data from a load sensor, performing animal recognition analysis on the data using an animal recognition algorithm, or other type of method, and then presenting the information to a technician who is scheduled to service the trap. For example, certain types of data may indicate a rat based on load data that falls within a range of load data for rats.

Various components of the computer-based system are preferably registered as sensor stations with the system. Following initial registration, a technician may scan a bar code of a component such as a sensor station, a bait station, or a repeater, press a button, or some other action, and the component's status may be updated in the computer based system. When configuring the system and the component, a technician may place a component such as a sensor station in a specific physical location. In some embodiments a technician may manually update the database of the computer-based system by logging information via a device. In other embodiments, a technician may use a mobile application that is installed or accessed by a mobile device such as a smartphone or portable device unit. In some embodiments the mobile device may have hardware that determines the location of the mobile device via GPS or other technology. In some embodiments, a sensor station may have been assigned a barcode with a unique identifier, an RFID chip, or other physical object that may be used to identify the sensor station. Any reference to GPS locations is not limited to GPS location but may also include other mechanisms for determining and identifying a location, including Wifi, radio frequency, triangulation, and Bluetooth®. The physical location of the user may also be reported to the computer based system when the user uses a smartphone or other device to determine the GPS coordinates of the smartphone or other device and the proximity between the component, such as a sensor station, and the smartphone, is sufficient, such as less than 30 feet or even less than 3 feet, such that the location of the component may be assigned the GPS coordinates or other data for identifying a location based on the GPS coordinates or other location identifying information of the smartphone or a device. In some embodiments the registration process includes the computer-based system prompting a user to use a device such as smartphone to photograph a component such as a sensor station. Once a photograph has been taken, the computer-based system may then prompt the device to upload or send the photograph to the computer-based system and the photograph may then be paired with the component such as the sensor station and the photograph may be stored in the database and later retrieved and sent to a technician, auditor, or other human who is searching for the component.

In other embodiments, instead of scanning a barcode, the technician presses a button on the sensor station, and the sensor station then sends information directly or indirectly via a computer to the computer-based system. In some embodiments, when a computer-based system determines that a specific mobile device is near a component, then the computer based system can then list that device and its location on an application that is being run on the specific mobile device. The user may be prompted to confirm the pairing of a component with a specific location. In some embodiments a user may use a mobile device to scan a barcode or to recognize an identifying object such as a RFID chip. Since the computer-based system can determine the location of the mobile device at the time that the mobile device scans a bar code associated with a component or recognizes an identifying object of a component such as an RFID chip, then the computer-based system is then able to pair the identifier associated with the specific component, such as a 10 digit combination of letters and numbers, with the location of the mobile device at the time of the pairing, effectively assigning a location to the component. In still more embodiments, a technician may activate the sensor station and cause the sensor station to send identifying data of the sensor station to the computer-based system by pressing a button on the sensor station, or performing another identifiable action such as waving a unique object in front of the sensor of the sensor station, and then also pressing a button, or performing other identifiable action, in a user interface of an application smartphone; pressing a button on an actual device; or performing another action to a device such as shaking a device which then allows the computer-based system to the pair the component, such as the sensor station, with the location of the device. In other embodiments, the sensor station is configured with hardware that may be used to determine the location of the sensor station, such as GPS coordinates, and the activation of the sensor station, such as by pressing a certain button, will then send identifying information about the sensor station which includes a unique identifier for the sensor station as well as GPS coordinates or other information that may be used to describe the location of a technician.

Figure 19A:
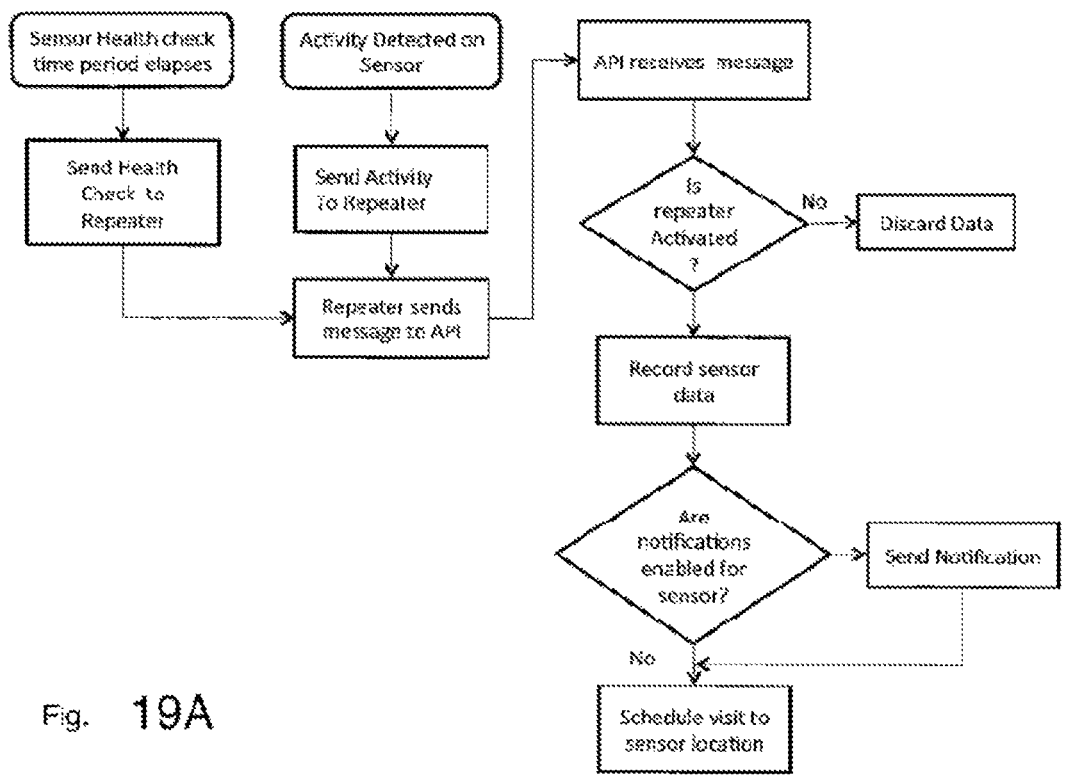
FIG. 19A shows a portion of a block diagram describing an embodiment of a method of using the polling system of the system controller.

The process through which the sensor stations disclosed herein are monitored and integrated with a pest monitoring system is disclosed in relation to FIG. 19. FIG. 19 shows a flow chart of how the sensor stations deliver data to the station control module. In keeping with the disclosure, a number of similar or related processes can be implemented. In FIG. 19A a general flow chart is shown demonstrating data flow in relation to system health checks, activity detection, data recording and notification delivery. After a preconfigured time period for performing a Sensor Health has elapsed, a sensor station sends a Health Check to a repeater. A health check may include information about the battery status or health of the sensor station, and that information may be sent directory to a computer-based system such as a pest control system, or alternatively, it may be sent to a repeater or sensor station hub. In the second column of the flow chart in FIG. 19, activity is detected by a sensor station, and the sensor station then sends data representing that activity to a repeater, or in some embodiments bypasses the repeater and sends the data to a sensor station hub or to a pest control system that is computer-based. When activity is sent to a repeater, then a repeater sends a message to an module with an application program interface; the module of the application program interface receives the message and then a decision tree is performed; if the repeater is activated or has been activated, such as by a technician or computing device activating a button or communicating with the repeater when the technician is onsite nearby the repeater or even offsite but communicating with the repeater, then the next step is record sensor data from sensor stations; in some embodiments if the repeater has not been activated then any data received from a repeater is discarded After sensor data has been recorded, then the pest control system determines whether notifications have been enabled for a sensor, such as whether a technician or customer has physically enabled or remotely enabled notifications, and if so, then the pest control system sends a notification to a technician, user, customer, manager, or other interested party. If notifications have not been enabled, then the system schedules or sends a notification to schedule to a technician, a manager, a representative, scheduling person, or scheduling module, so that an appointment will be scheduled for maintenance or review of a sensor station, a location site with sensor stations, the pest control system or other components.

Figure 19B:
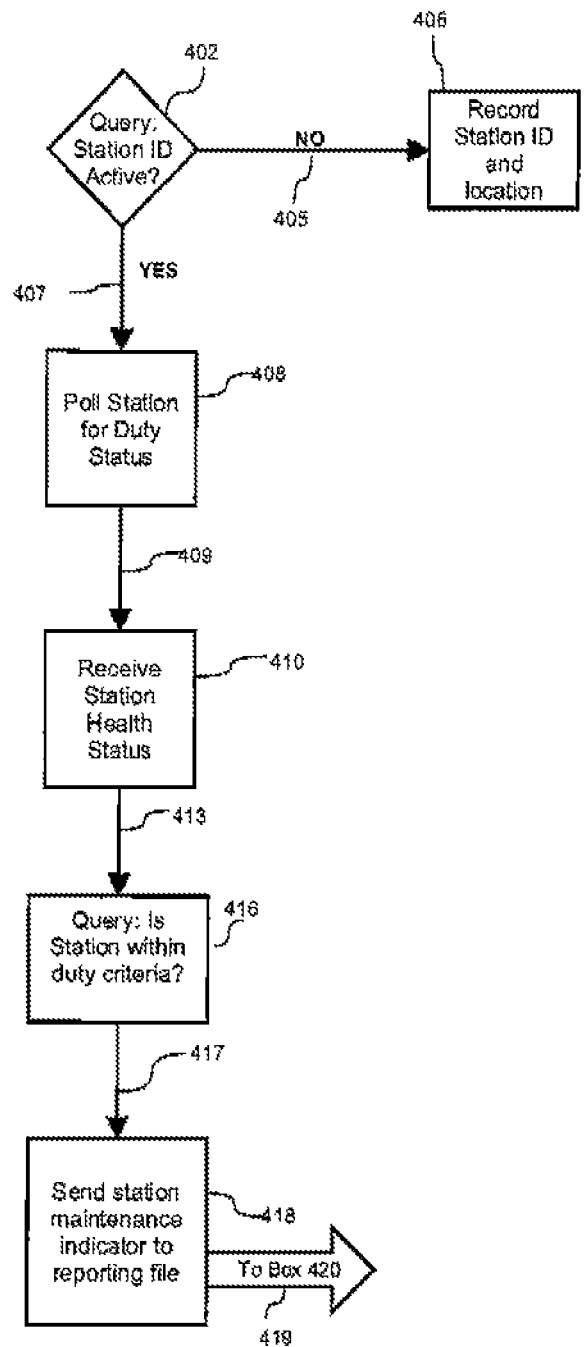
FIG. 19B shows a portion of a block diagram describing an embodiment of a method of using the polling system of the system controller.

FIG. 19B shows a detailed set of routines, and flow chart 400 begins with status check review at box 402. One of the goals of the sensor stations is to limit power usage to prolong on-station time without recharging or battery change. In essence, the process at box 402 is a health check of a sensor station to be polled. In practice, the sensor station controller module transmits a wake up call to a specific sensor identification number, i.e. the sensor station 10.

Active 10 query at box 402 allows for identifying unregistered sensor stations, and then recording such data for future action by sales or maintenance operators. A separate customer management system hosts and accesses a customer activity database and a sensor activity database. Through an application-programming interface (API), which includes processing and memory resources, with the customer management system, the station control module receives the status response from the sensor station, and looks up from a sensor station database table the registration status of the sensor station, for instance to confirm that the station is active and registered to an active customer pest management system. If the station is not registered, a notice is delivered to the administrator that an unregistered station is installed.

If the station 10 is active, at box 408, the communication module of the sensor station then triggers the activation sequence of the sensor station control module, which then prepares a response to the duty status query. At box 410, the duty status inquiry is received by the PCS API, (as at arrow 123 of FIG. 3). The sensor interface module allows for analyzing the duty status response. The response to the status check will confirm that a sensor station is available and active, and may include such data as communication signal strength, battery status, or temperature data, for instance. If a duty status-check query response is received by the station controller, at box 416, the station controller will determine if the response indicates that the sensor station is operating within acceptable duty parameters. If no response is received, or if the sensor station is operating outside acceptable parameters (e.g., low battery), as at arrows 417 and box 418, a maintenance indication is recorded by the station controller. Alternatively, a retry sequence can be implemented to attempt the status inquiry multiple times before a maintenance indication is recorded or delivered.

In some embodiments, the system stores in a database information about sensor and battery maintenance; examples of the stored information include: the type of battery that is used by a particular sensor type, the number of batteries used by a particular sensory type, (according to manufacture specifications) the average time period of elapsed battery use before the battery is recommended to be replaced, and instructions for accessing and replacing a battery on a particular sensor. The system may then access the information in the database and create and send a customized message to a service employee or service contractor that provides useful information about changing a specific battery type when the system has determined that a specific battery type of a specific sensor type needs replacement. In other embodiments, the system includes a battery database which stores unique identifiers for each battery that is actually being used by a customer in sensor stations.

As the "Sensor Health Check" submodule of the system performs health checks, the system over time will receive information about specific batteries employed in sensor stations which are approaching a threshold of decreased battery life and may flag those batteries and place the batteries on a watch list as having a status of functional but nearing the end of battery life. The system may then send the watch list to a service employee or contractor, which may include the location of the battery on a map. The system may then use an algorithm to recommend to an employee or contractor when the system determines that the employee or contractor is within a certain vicinity of the battery such that based on the relative importance of that sensor station as determined by whether that sensor station has been marked by a user of the system as "critical" and the amount of estimated time until the battery is expected to fail and whether the employee or contractor is likely to be within a specified distance of that battery before the battery is expected to fail. In some embodiments, the system may be configured to store the route information of employees or contractors, historical GPS coordinates of employees or contractors while they are on duty, or other information. This information may be used by an algorithm that predicts 1) the time period at which a battery may need to be replaced by using the following data: percentage of estimated battery life remaining, number of times that a sensor station using the battery has failed to respond when polled by the "Health Check" submodule, etc. and 2) the likelihood that an employee or contractor may have another convenient opportunity to change the battery.

In certain embodiments, the system may provide a user interface so that users can flag or tag specific sensor stations as "critical". An example of a "critical" sensor station is a sensor station located 1) in or near a dining area where restaurant customer may view animals that are trapped inside a baiting station or may be more likely to be see a pest such as a rat because the corresponding sensor station functioned sub-optimally due to decreased battery life or 2) in a location that has been the subject of a customer complaint for sub-optimal performance.

In a preferred embodiment, the sensor station will transmit an indicator of sensor 10, firmware version, a voltage reading, as an indicator of battery level, temperature and signal strength. If a repeater router is utilized, the repeater 10 may also be included in the data transmission.

Figure 19C:
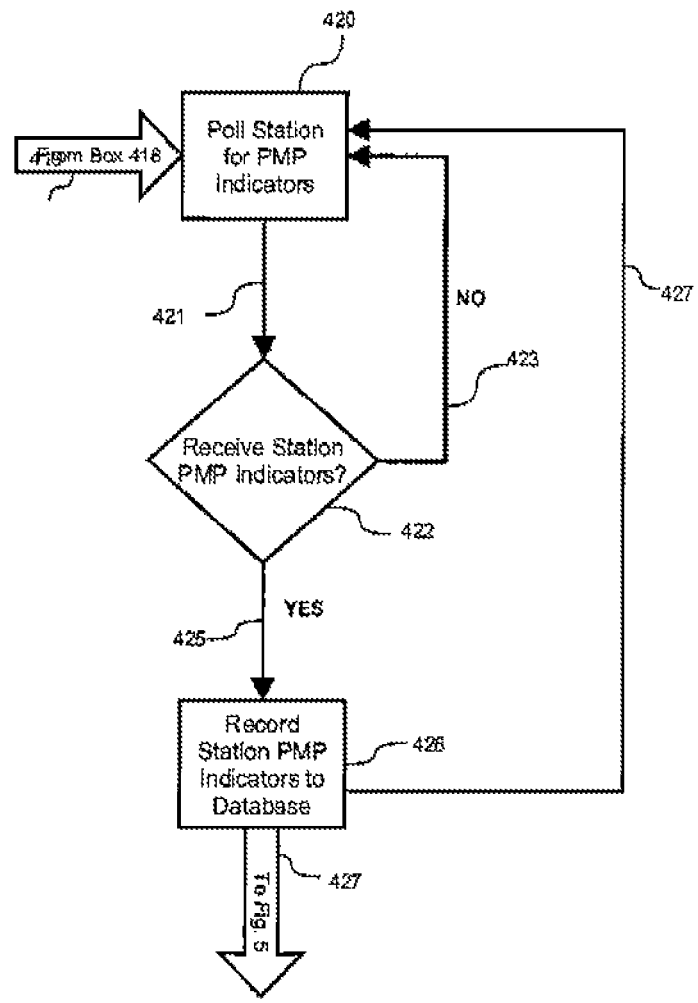
FIG. 19C shows a portion of a block diagram describing an embodiment of a method of using the polling system of the system controller.

When a status inquiry returns an accepted response, as at arrow 419, the station controller transmits a request for pest data, polling the selected sensor station, at box 420, continuing on FIG. 19C.

In another embodiment, the station controller can trigger status checks at predetermined intervals, such as every hour, every 6 hours, every 24 hours, or after a period of days, such as one week. Alternatively, the station controller can be signaled only when new data is available. As shown by the sequence of arrow 421, box 422, and arrow 423, when PCS data is not present, the sensor station can be re-polled at predetermined intervals.

Following arrow 425, when the sensor station control module receives station PCS indicators, those indicator data are recorded in a database by action of the sensor interface module delivering the data to the data routing module (see 136 of FIG. 3) and then to the PCS status database. Subsequent action through the PCS API allows for further processing and activity based on the stored data. Finally, arrow 427 may loop back to box 402 to reinitiate the polling sequence at a predetermined interval.

Figure 20:
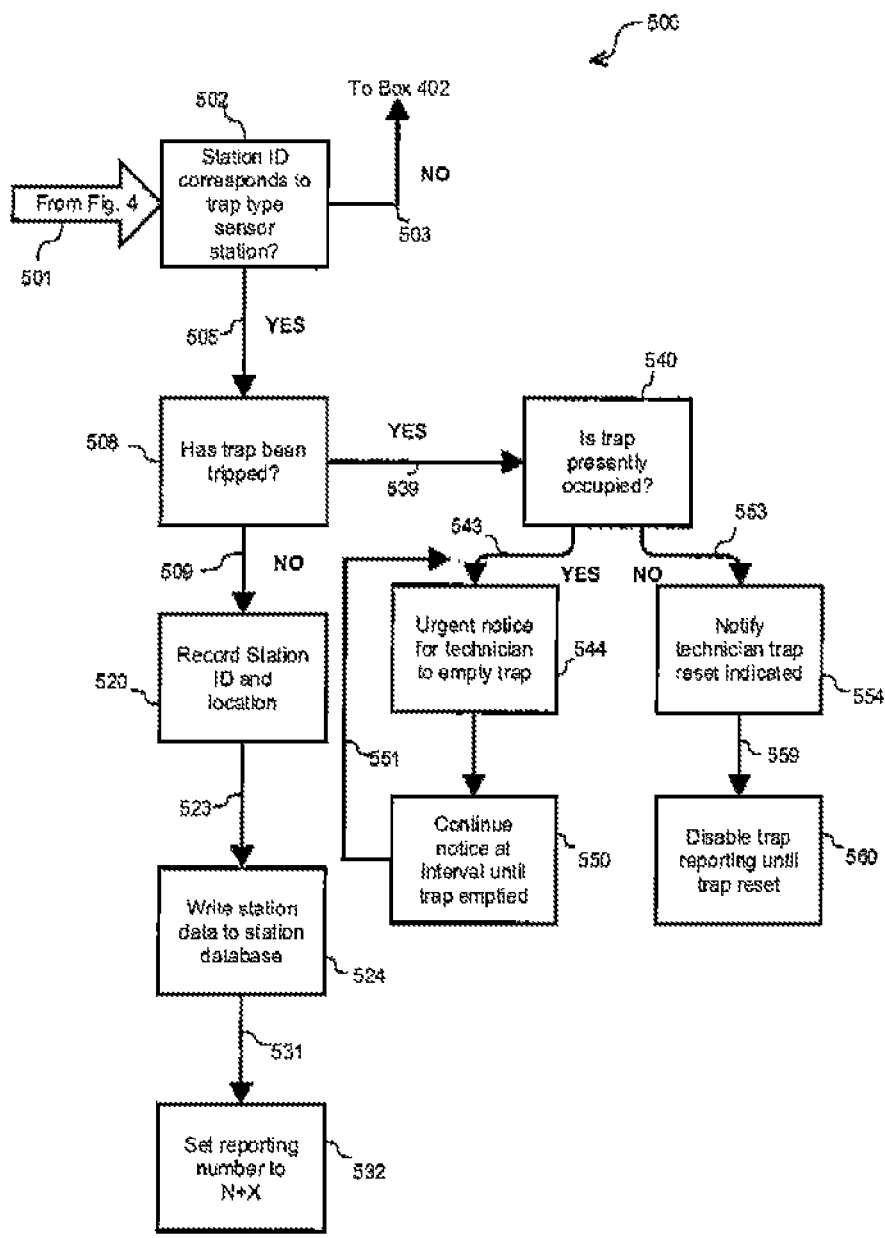
FIG. 20 shows a block diagram of a system for monitoring trap stations, which may be viewed in conjunction with FIG. 19 or FIGS. 19B and 19C.

Continuing now to FIG. 20, a block diagram 500 shows an alternative system that implements pest trap occupancy monitoring. Certain apparatus associated with pest control are designed to trap and hold live animals, such as birds or mammals including mice, rats, squirrel, raccoon and opossum, for instance. Humane treatment of animals and regulatory protocols may require frequent monitoring of traps to remove trapped animals. Block diagram 500 shows a preferred embodiment of a trap monitoring system for use with the disclosed system. From box 426 of FIG. 19, for instance, arrow 501 is followed to box 502.

When data indicates that station PCS indicators, which may be sensor station data, have been recorded in box 426, the sensor station interface module, at 230 determines if the station ID corresponds to a trap type sensor station, as at box 502. If the station is not a pest trap station, arrow 503 is followed to box 402. When the station data affirmatively indicates that the station ID corresponds to a trap type sensor station, arrow 505 is followed to box 508. At box 508, the query is presented as to whether the pest trap corresponding to the sensor station ID has been tripped by a proximity sensor in the sensor station. If the trap has not registered as to having been tripped, arrow 509 is followed and the system is directed to record the station ID and station location at box 520. Following arrow 523, at box 524, the sensor station control module receives station data (i.e., PCS indicators), and those indicator data are recorded in a database file corresponding to the station ID by action of the sensor interface module delivering the data to the data routing module and then to the PCS database. As previously described, subsequent action through the PCS API allows for further processing and activity based on the stored data. Following arrow 531, at box 532, a status review indicator in the form of a reporting number and time stamp are recorded in the sensor station database. Thus, administrators can confirm that traps have been checked at an interval appropriately in keeping with humane and regulatory intervals.

When the station data affirmatively indicates that the trap station has been tripped, arrow 539 is followed to box 540. At box 540, the trap sensor station is queried as to whether the trap is presently occupied. When the sensor station transmits the indication that the trap is occupied. When the trap is occupied arrow 543 is followed to box 544, and an urgent notice is sent requesting a technician visit to empty the trap of its occupant. Following arrow 549 to box 550, a repeated report of an occupied trap delivered at a predetermined interval until the trap emptied and reset. Following transmission of the reminder notice, arrow 551 is followed back to box 540.

If the trap is not occupied, arrow 553 is followed and at box 554, a technician may be notified of the need to reset the sensor station/trap, and the trap reporting is disabled until the trap is reset, as at box 560.

Figure 21:
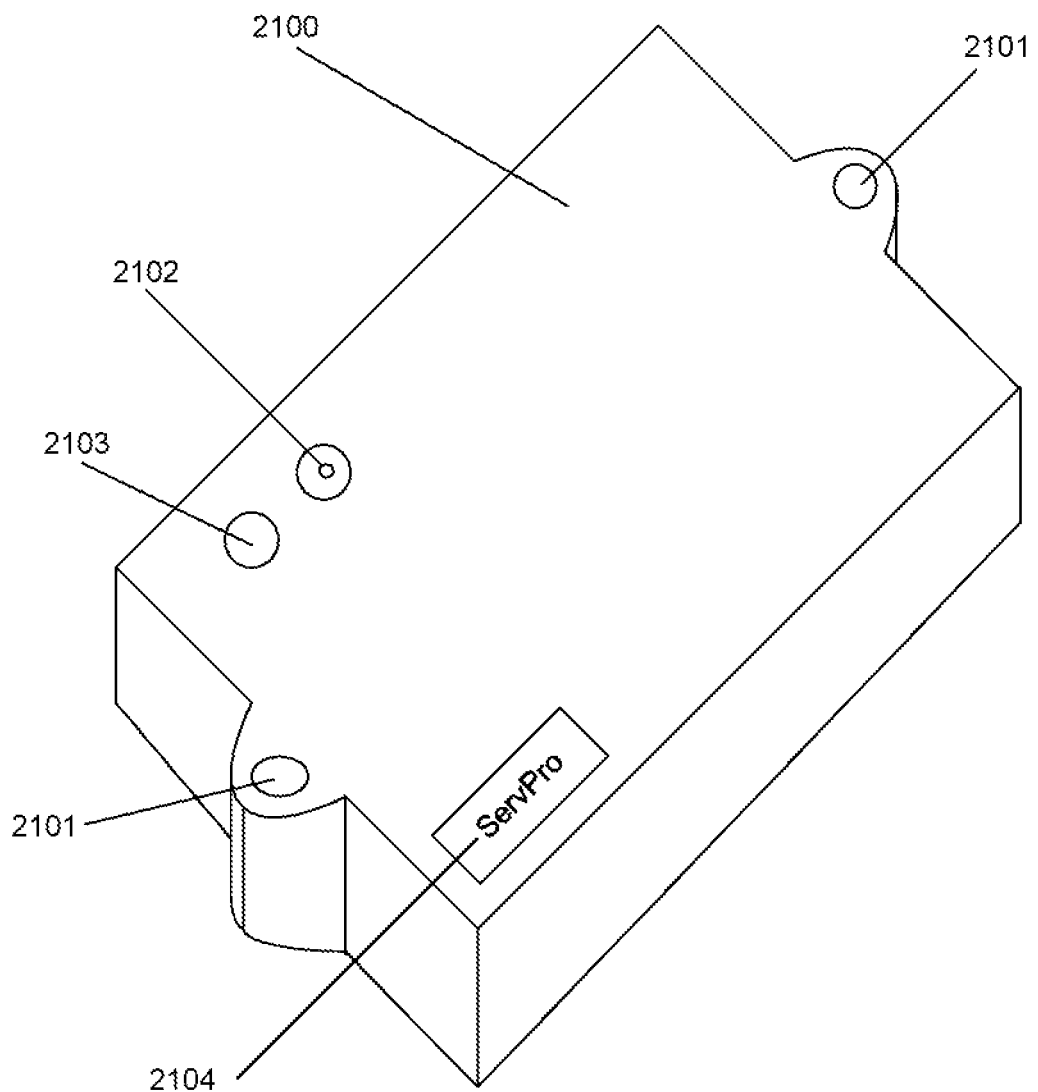
FIG. 21 shows the adaption of a sensor station for utilizing an indicator dark mode.
Figure 22:
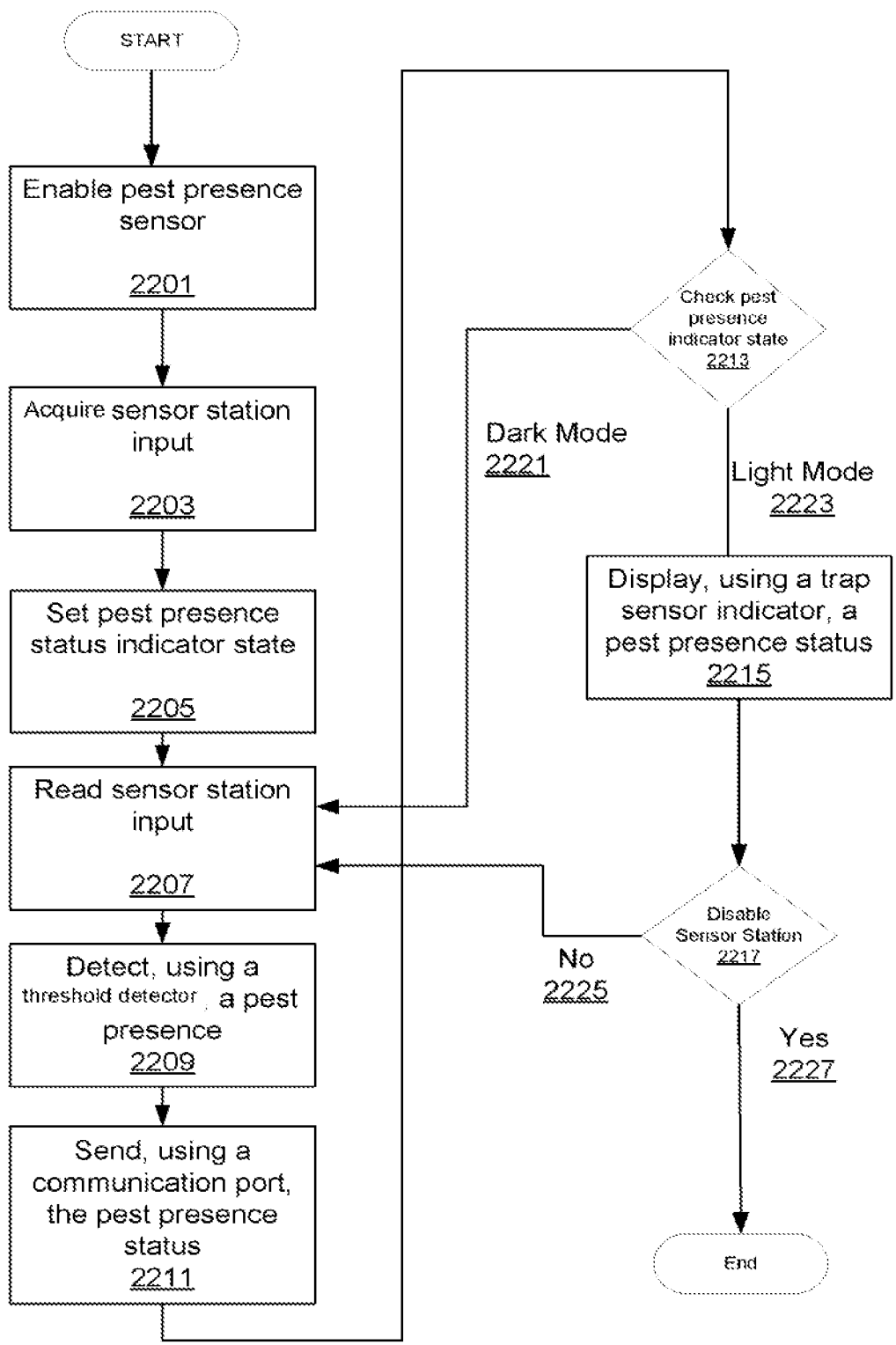
FIG. 22 shows a flow chart for a sensor station invoking an indicator dark mode.

Referring to FIGS. 21 and 22, the following section describes utilization of the device and an attendant method for using the aforementioned status indicator and the computer associated with the status indicator in a "dark mode". Referring to FIG. 21, a sensor station 2000 is depicted. Labels or other objects may be affixed as shown in location 2104. In some embodiments objects for identifying a sensor station may be affixed to the outside, such as in location 2104 or on the inside of the sensor station. Examples of such objects may be barcodes, QR codes, or RFID chips. Apertures 2101 are representative of apertures that may be used for screwing a sensor station to a trap. In some embodiments the sensor station has a mechanical, adhesive, or magnetic mechanism for being affixed to a trap or to an object located in the vicinity of a trap.

The utility of a status indicator 2102, such as an LED light, is for a human user who wants to determine that the sensor station is actively detecting objects or actively transmitting data about the sensor and the quantity and quality of data generated by detecting an object to the computer-based system that monitors a plurality of sensor stations or a repeater that will then transmit the data to a computer-based system that monitors a plurality of sensor stations. The activation of a status indicator that is audible or visible to a human may startle a pest such as a rat and may decrease the efficiency of a bait station with the status indicator at capturing pests. In some embodiments, one or more activation switches 2103 may be used to turn on a "dark mode". When a user has pressed a button switch, the sensor then runs in dark mode. During dark mode, the status indicator 2102, such as an LED, is deactivated but the computer associated with the status indicator continues to store data from the sensor and, in some embodiments, also transmit that data to a computer-based system monitoring a plurality of sensor stations or a repeater that will then relay that data to a computer-based system monitoring a plurality of sensor stations. The status indicator may be configured to signal that the sensor station has been switched into dark mode; a differently-colored status indicator such as a red indicator may emit a signal, or the status indicator which indicates the status of the sensor station may signal status indicator mode by emitting a pair of flashes of light in rapid succession. Or in some embodiments, a button may activate the dark mode and a second button may be used to deactivate the dark mode, but as described previously, in some embodiments, a single button is used to activate and deactivate the dark mode for the sensor indicator. Hence a user may toggle between dark mode on and dark mode off depending on the number of times that the user has pushed the button. Thus the system may be configured so that a human user, such as maintenance person, may physically activate the sensor indicator when the maintenance person is physically at the site of the bait station. The user may then wave objects in front of sensors or perform other tests to determine if the sensor station is working properly, and the user may observe the behavior of the LED light, such as turning on when the user waves their hand in front of a motion sensor. The user may then activate the sensor into dark mode before the user has left the vicinity or the station and after the user has satisfied itself that the sensor is working. When in dark mode the status indicator will not emit light or perform any visible or audible indications, but the computer associated with the sensor will continue to forward data and data records of the sensor to the computer-based system associated with more than one sensor station. In some embodiments, activation of dark mode will set the status indicator into dark mode for a predetermined time interval or a predetermined number of sensor activations. For example, deactivation of dark mode may only last for five minutes in some embodiments, and the user does not need to press the button to reactivate dark mode, but at the expiration of the five minute period, the computer associated with the status indicator will automatically switch the sensor indicator into dark mode.

In some embodiments when a switch 2103 is initially activated, the sensor station sends data to a computer-based system that monitors a plurality of sensor stations, and the data includes information about the sensor station such as a token or other unique identifier. The computer-based system may then store that data and update the records associated with that sensor station as the data and optionally the time when the sensor station was visited by a technician. In some embodiments, when a button is pressed for the initial time, the sensor station also deactivates the dark mode of the sensor station which allows the LED light associated with the sensor station to resume the mode where it emits light when the sensor is activated, alternatively known as "light mode". In other embodiments, the sensor station may be configured so that a single press of a single button deactivates the dark mode. In other embodiments activating a switch of a sensor station may also cause the sensor station to communicate directly with pest control system or indirectly with pest control system such as via a sensor station hub. The communication may signal that the sensor station has been visited by a technician system and performed billable work, that a repair has been made to the sensor station, that the sensor station needs to be replaced, that the sensor station may need to be monitored, that a pest in the trap associated with the sensor station has been removed, or some other communication. Some embodiments of the sensor station may have a plurality of switches such that one switch may be for activating and deactivating dark mode and another switch may be to initiate a communication with the pest control system. Alternatively, a processor of the sensor station may be configured to associate multiple activations of a switch in succession, such as two depressions of a button acting as a switch during a ten second interval, as an indication that the sensor station should send a certain communication to the pest control system. In some embodiments a barcode or QR code affixed to a sensor station may be scanned by a technician with a device running an application in communicative contact with the pest control system. In some embodiments, the sensor station and the bait trap may be a single integrated device; in other embodiments the sensor station is attachable to a bait trap by an adhesive, magnet, physical attachment, or some other mechanism.

Referring to FIG. 22, an overall process and method 2220 for activating the dark mode of a sensor station in accordance with a preferred embodiments of the present invention is shown. In the most preferred embodiments, method is a processor-implemented method used in conjunction with the hardware and software, if any, described in FIG. 21 and in FIG. 3, and FIG. 9-12.

As shown in FIG. 22, the first step is generally to enable pest presence sensor 2201. In some embodiments step 2201 may be accomplished by registering a sensor station with the pest control system. Registration of a sensor station may be accomplished by receiving and storing data representing a sensor station token or identifier. In some embodiments a technician manually inputs the sensor station token or identifier into the pest control system via an application running on a device. In other embodiments a technician activates a switch on the sensor station which instructs the sensor station to send a communication to the pest control system; in other embodiments a technician scans a barcode or unique code associated with the sensor station and the information about the barcode or unique code is received by the pest control system and used to register the sensor station in a database of the pest control system. In some embodiments, when a pest control system has registered a sensor station, the pest control system is configured to communicate with the sensor station and confirm that the sensor station has been registered with the pest control system.

Next, the step "acquire sensor station input" 2203 is performed. Sensor station input may be data from a sensor module, which may include a sensor such as a motion detector and a module. A sensor station may acquire sensor station input as a sensor of a sensor module detects an object, which may include a live animal, and stores the data or transmits sensor data related to the presence of the object. In some embodiments the step of "acquiring sensor station input" may include a computing device such as a pest control system reading data from a number of sensor station or acquiring data from a number of sensor station. Data may be received directly from a sensor station or may be collected and collated at a device such as a sensor station hub before being received.

FIG. 22 is an illustration of a nonlimiting embodiment of a method that may be performed by an apparatus disclosed herein, and some alteration of the order of the steps or addition or deletion of steps are contemplated. For example, in some embodiments the order of step 2205 and step 2203 may be reversed.

In the preferred embodiments, step 2203 is followed by a step 2205, setting pest presence status indicator status. As discussed earlier, a status indicator status may be a dark mode or a light mode; the status may be set by the sensor station using a preconfigured threshold such as a predetermined time, by a user action such as pressing a button that is coupled with the sensor station and communicates with a circuit board or processor of the sensor station, by the computing device that is remotely located and is communicatively connected to the sensor station via a network. A status indicator may be a light emitting device, such as an LED, or sound emitting device.

Next, in step 2209 (detect, using a threshold detector, a pest presence), the sensor station or a pest control system that has a computing device may detect the presence of a pest by identifying that the sensor, which may belong to a sensor module of a sensor station, has measured data beyond a threshold. In one example, a threshold detector may determine that a change in temperature has exceeded an allowed threshold. The threshold detector may be a physical object that contains a programmed threshold for a sensor and a mechanism to determine when a sensor module has detected a pest. In some embodiments, the threshold detector may be configured to determine whether a sensor module has detected a pest or a false positive, or at least the likelihood that the sensor station has detected a false positive. In some embodiments, step 2009 does not require a threshold detector. A threshold detector, in some embodiments, may be a module, a circuit, or a processor which is configured to record a certain number of sensor station activations, such as the activation of a motion detector 3 times, and then perform an action, such as transmitting data that informs a computer-based pest control system that a single pest has been detected, that three pests has been detected, or that a single pest is most likely detected but the sensor module of the sensor station was activated three times.

Next, a step of "sending, using a communication port, the pest presence status" 2211 may be performed in the method of FIG. 22. A sensor station may then send data representing pest presence status, such as at least one pest has been detected, or at least one pest is presumed to have been detected, or the number of activations of a sensor module of a sensor station during a certain interval, or the lack of any detections during a predetermined interval. In some embodiments a sensor station or a computer-based system monitoring a number of sensor station may set the interval as the time between the last time that a sensor module was activated or data from a sensor module was transmitted from the sensor station, which may be accomplished by resetting a counter for tracking sensor module activations for the purpose of tracking recent sensor module activations versus a sum total of all sensor module activations since the sensor station was enabled.

Next, a sensor station, a component of a pest control system, or a pest control system checks the pest presence indicator state (step 2213). In some embodiments this may be accomplished by a sensor station, a component of a pest control system, or a pest control system determining whether the pest present indicator state has been most recently set to dark mode status 2221 or light mode status 2223. As shown by the line for dark mode 2221, if the pest present indicator state is determined to be in dark mode, then the next step of the method of FIG. 22 is to read sensor station input 2207 and not perform step 2215 of "displaying, using a trap sensor indicator, a pest presence status". A trap sensor indicator, as previously disclosed may be a light emitting device such as an LED, a touch screen, a video screen, a sound emitting device, or any device that is configured to indicate to a human being that a sensor station is actively recording data or sending data. As stated in this specification, during dark mode, the sensor station continues to actively record data or send data without a visible or audible signal that may interfere with the capture of pests by possibly causing a pest to detect the signal and then choosing to avoid the trap. If the "check pest present indicator state" step 2213 results in a determination that the sensor station is set to a light mode state, then the next step is step 2215 in which a trap sensor indicator will display a a pest presence status. In some embodiments, the act of "displaying" is replaced with the act of emitting, such as emitting a sound. A technician may choose to set a sensor station to light mode when the technician is in the vicinity of the trap or the sensor station and desires to confirm that the sensor module of the sensor station is functioning properly. (For purposes of this disclosure, any reference to sensor module may also include a sensor that is not a part of a module). Following step 2215 may be the step of disabling a sensor station (as shown by "YES 2227") or the step of suppressing the step of "disable sensor station", as shown by "No" 2225, which is followed by the step of returning to the step of read sensor station input 2207 (as shown by the arrow pointing from step 2217 to step 2207.

Figure 23A:
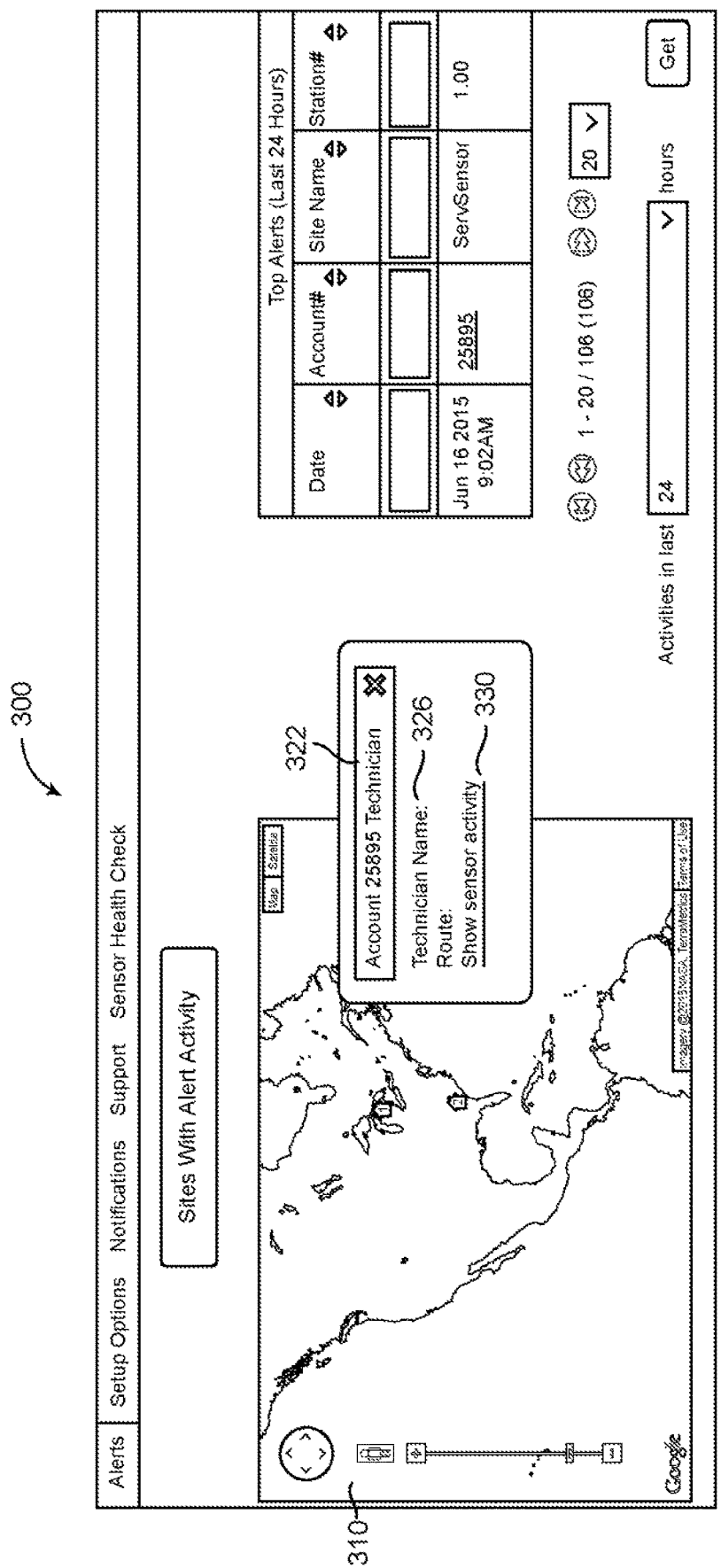
FIG. 23A illustrates an embodiment of a system screens that a customer navigates while using the system.
Figure 23B:
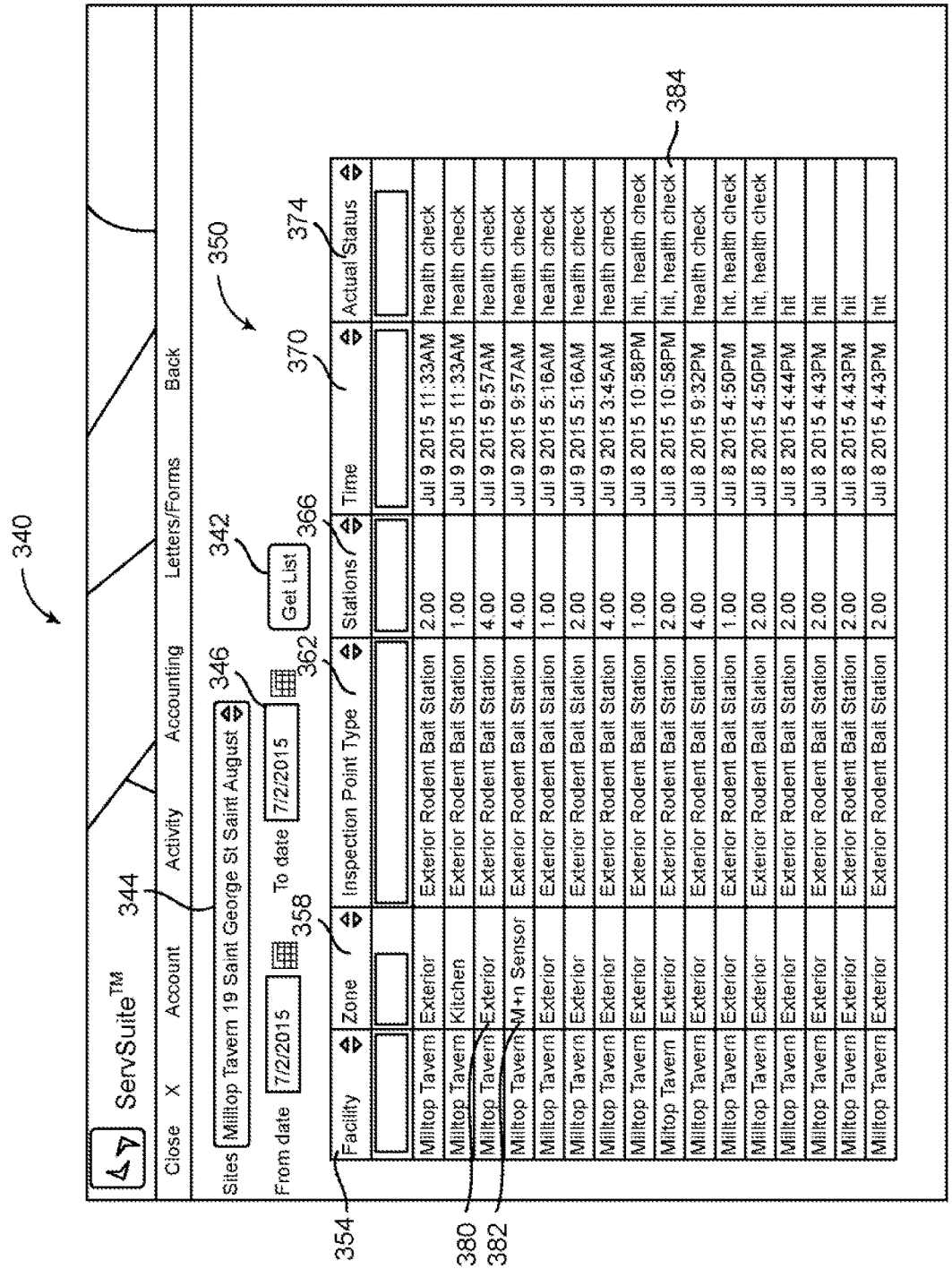
FIG. 23B illustrates an embodiment of a system screen that a customer navigates while using the system.

FIG. 23 depicts a screenshot of an implementation of a pest control system that may be used to perform a method for a user to monitor activity on each of selectable sensor stations through the system. FIG. 23A shows the initial page 300 of the "Alerts" submodule. As described in FIGS. 5 and 6, this page depicts a map that shows each of the user's sensor station installations as sites 310. For purposes of this disclosure, sensor station installations are the geographic location where one or more sensor stations are installed. A sensor station site is the exact position of a particular sensor station. The two sensor station installations in this figure are labeled as 314 and 318. Selecting one of the two sensor station installations initiates a dialog box 320 related to that installation. The dialog box identifies the customer account number 322, as well as the technician name 326 and route identification associated with that particular installations. The dialog box also contains a selectable icon 330 titled "Show sensor activity," that directs the user to a sensor activity table, depicted in FIG. 238.

After selecting the sensor activity icon, the system directs the user to a page containing a table showing all sensor activity within a particular date range 340, as shown in FIG. 238. The user can also select the particular site 344 for which data is sought, as well as a date range 346 for the data. After selecting "Get List" 342, a table 350 showing all applicable data is generated.

The sensor activity table contains six columns of information. The Facility column 354 displays the facility name that was selected as the site. The Zone column 358 displays in which zone or site of the particular facility each sensor station is located. Each facility is categorized into a number of zones, and the sensor stations may be preferably grouped according to the zone in which they are located. For certain facilities, zones could be as simple as "Interior" and "Exterior," but many facilities will have more detailed zone names, as depicted at 380. The Inspection Point Type column 362 displays which type of station is associated with each row. Such station types could be a bait station, but could also be motion sensors or other types of sensors as selected by the user 382. The Station #column 366 displays the station identification number associated with each instance of system activity. Each station in a facility is given a unique identification number 366, thus the unique identification number displayed at 366 will indicate the particular sensor station where the activity was registered. The Time column 370 displays the particular time of each sensor station activity. The Activity Status column 374 displays the particular type of activity that caused the activity alert for the particular sensor station. The activity will commonly be a simple sensor station health check, but can also be for a hit on pest activity, or a combination of factors, as shown at 384.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Since certain changes may be made in the above system without departing from the scope of the invention herein involved, it is intended that all matter contained in the above descriptions and examples or shown in the accompanying drawings shall be interpreted as illustrative and not in a limiting sense. Also, all citations referred herein are expressly incorporated herein by reference. All terms not specifically defined herein are considered to be defined according to Webster's New Twentieth Century Dictionary Unabridged, Second Edition. If a term is not defined in the Webster's New Twentieth Century Dictionary, then the McGraw-Hili Dictionary of Scientific and Technical Terms 6$^{th}$ Edition should be used. The disclosures of all of the citations provided are being expressly incorporated herein by reference. As used in the present specification and in the appended claims, the term "a number of" or similar language may include any positive number including one to infinity; zero not being a number, but the absence of a number. The disclosed invention advances the state of the art and its many advantages include those described and claimed.

The invention claimed is:

1. A pest control system to monitor a plurality of pest control stations from a mobile electronic device, comprising:
   a network of a plurality of sensor stations, wherein a sensor station is associated with each of the pest control stations, wherein each sensor station has an infrared detector for detecting infrared emissions from an animal, and wirelessly transmits a plurality of station data including a station ID, an infrared detector indication when the infrared detector senses the animal, and at least one duty parameter selected from the group of a communication signal strength and a battery status indication;
a sensor station hub in wireless communication with the plurality of sensor stations and capable of receiving the plurality of station data from each of the sensor stations, wherein the sensor station hub transmits a plurality of hub data;
a remote computer in communication with the sensor station hub and the mobile electronic device, wherein the remote computer receives the plurality of hub data, and the remote computer having an interface configured to:
a) receive, store, and process the plurality of station data, and display a portion of the processed station data in the interface and on the mobile electronic device;
b) generate a sensor maintenance notice when the at least one duty parameter is outside a predetermined acceptable duty parameter; and
c) generate an alert message in response to the sensor maintenance notice or in response to receiving a predetermined number of infrared detector indications within a predefined detector indication time interval from a single sensor station, and transmit the alert message to the mobile electronic device.

2. The pest control system of claim 1, wherein the interface permits a user to adjust at least one of the predetermined number of infrared detector indications and the predefined detector indication time interval.

3. The pest control system of claim 1, wherein the interface includes a notification schedule to control when the alert messages are transmitted to the mobile electronic device.

4. The pest control system of claim 1, wherein the remote computer transmits a status check data request to any of the plurality of sensor stations prompting the sensor station to transmit the at least one duty parameter to the sensor station hub and the remote computer.

5. The pest control system of claim 4, wherein the status check data request is automatically transmitted at a predetermined status check interval.

6. The pest control system of claim 4, wherein the interface generates a failed check sensor maintenance notice if data is not received in response to the status check data request, and generates a failed check alert message.

7. The pest control system of claim 1, wherein a GPS coordinate of the sensor station is transmitted to the remote computer, and a location of the sensor station is displayed on a map in the interface.

8. The pest control system of claim 1, wherein the remote computer monitors the location of the mobile electronic device and identifies sensor stations within a predetermined service vicinity associated with the alert message, and the interface generates and transmits a convenient service alert message to the mobile device.

9. A pest control system to monitor a plurality of pest control stations from a mobile electronic device, comprising:
a network of a plurality of sensor stations, wherein a sensor station is associated with each of the pest control stations, wherein each sensor station has an infrared detector for detecting infrared emissions from an animal, and wirelessly transmits a plurality of station data including a station ID, an infrared detector indication when the infrared detector senses the animal, and at least one duty parameter selected from the group of a communication signal strength and a battery status indication;
a sensor station hub in wireless communication with the plurality of sensor stations and capable of receiving the plurality of station data from each of the sensor stations, wherein the sensor station hub transmits a plurality of hub data;
a remote computer in communication with the sensor station hub and the mobile electronic device, wherein the remote computer receives the plurality of hub data, transmit a status check data request to any of the plurality of sensor stations prompting the sensor station to transmit the at least one duty parameter to the sensor station hub and the remote computer, and the remote computer having an interface configured to:
a) receive, store, and process the plurality of station data, and display a portion of the processed station data on the mobile electronic device;
b) generate a sensor maintenance notice when the at least one duty parameter is outside a predetermined acceptable duty parameter; and
c) generate an alert message in response to the sensor maintenance notice or in response to receiving a predetermined number of infrared detector indications within a predefined detector indication time interval from a single sensor station, and transmit the alert message to the mobile electronic device.

10. The pest control system of claim 9, wherein the predetermined status check interval is adjustable via the interface.

11. The pest control system of claim 9, wherein remote computer automatically transmits the status check data request at a predetermined status check interval.

12. The pest control system of claim 9, wherein at least one of the predetermined number of infrared detector indications and the predefined detector indication time interval is adjustable via the interface permits.

13. The pest control system of claim 9, wherein the interface includes a notification schedule to control when the alert messages are transmitted to the mobile electronic device.

14. The pest control system of claim 9, wherein the interface generates a failed check sensor maintenance notice if data is not received in response to the status check data request, and generates a failed check alert message.

15. The pest control system of claim 9, wherein a GPS coordinate of the sensor station is transmitted to the remote computer, and a location of the sensor station is displayed on a map in the interface.

16. The pest control system of claim 9, wherein the remote computer monitors the location of the mobile electronic device and identifies sensor stations within a predetermined service vicinity associated with the alert message, and the interface generates and transmits a convenient service alert message to the mobile device.

17. A pest control system to monitor a plurality of pest control stations from a mobile electronic device, comprising:
a network of a plurality of sensor stations, wherein a sensor station is associated with each of the pest control stations, wherein each sensor station has a pest presence sensor for detecting an animal in the pest control station, and wirelessly transmits a plurality of station data including a station ID, a pest presence indication when the pest presence sensor senses the animal, and at least one duty parameter selected from the group of a communication signal strength and a battery status indication;

a sensor station hub in wireless communication with the plurality of sensor stations and capable of receiving the plurality of station data from each of the sensor stations, wherein the sensor station hub transmits a plurality of hub data;

a remote computer in communication with the sensor station hub and the mobile electronic device, wherein the remote computer receives the plurality of hub data, transmit a status check data request to any of the plurality of sensor stations prompting the sensor station to transmit the at least one duty parameter to the sensor station hub and the remote computer, and the remote computer having an interface configured to:

a) receive, store, and process the plurality of station data, and display a portion of the processed station data on the mobile electronic device;

b) generate a sensor maintenance notice when the at least one duty parameter is outside a predetermined acceptable duty parameter; and c) generate an alert message in response to the sensor maintenance notice or in response to receiving a predetermined number of pest presence indications within a predefined detector indication time interval from a single sensor station, and transmit the alert message to the mobile electronic device.

18. The pest control system of claim 17, wherein the predetermined status check interval is adjustable via the interface.

19. The pest control system of claim 17, wherein remote computer automatically transmits the status check data request at a predetermined status check interval.

20. The pest control system of claim 17, wherein at least one of the predetermined number of pest presence indications and the predefined detector indication time interval is adjustable via the interface permits.

* * * * *